US010400055B2

(12) United States Patent
Griesgraber et al.

(10) Patent No.: US 10,400,055 B2
(45) Date of Patent: Sep. 3, 2019

(54) POLYMERIC MATERIAL AND METHODS OF MAKING USING CONTROLLED RADICAL INITIATORS

(71) Applicant: 3M INNOVATIVE PROPERTIES COMPANY, St. Paul, MN (US)

(72) Inventors: George W. Griesgraber, Eagan, MN (US); Stephen B. Roscoe, Woodbury, MN (US); Hae-Seung Harry Lee, Woodbury, MN (US); Serkan Yurt, St. Paul, MN (US); Joon Chatterjee, Gaithersburg, MD (US); Duane D. Fansler, Dresser, WI (US); Stefan H. Gryska, Woodbury, MN (US); Babu N. Gaddam, Woodbury, MN (US); Kevin M. Lewandowski, Inver Grove Heights, MN (US); John L. Battiste, Northfield, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 16/314,760

(22) PCT Filed: Jun. 27, 2017

(86) PCT No.: PCT/US2017/039368
§ 371 (c)(1),
(2) Date: Jan. 2, 2019

(87) PCT Pub. No.: WO2018/013330
PCT Pub. Date: Jan. 18, 2018

(65) Prior Publication Data
US 2019/0153142 A1 May 23, 2019

Related U.S. Application Data

(60) Provisional application No. 62/479,547, filed on Mar. 31, 2017, provisional application No. 62/360,788, filed on Jul. 11, 2016.

(51) Int. Cl.
| | | |
|---|---|---|
| *C08F 2/50* | (2006.01) | |
| *C08F 2/48* | (2006.01) | |
| *C08G 61/04* | (2006.01) | |
| *C08F 297/02* | (2006.01) | |
| *C08F 220/10* | (2006.01) | |
| *C08F 293/00* | (2006.01) | |
| *C08F 220/14* | (2006.01) | |
| *C08F 220/18* | (2006.01) | |
| *C08F 220/28* | (2006.01) | |

(52) U.S. Cl.
CPC ............ *C08F 297/026* (2013.01); *C08F 2/48* (2013.01); *C08F 2/50* (2013.01); *C08F 220/10* (2013.01); *C08F 293/005* (2013.01); *C08F 297/023* (2013.01); *C08F 220/14* (2013.01); *C08F 2220/1825* (2013.01); *C08F 2220/1858* (2013.01); *C08F 2220/281* (2013.01); *C08F 2438/03* (2013.01)

(58) Field of Classification Search
CPC .................. C08F 297/026; C08F 297/023; C08F 220/10; C08F 220/14; C08F 2/50; C08F 2/48; C08F 2/38; C08F 293/005; C08F 2438/03; C08F 2220/1825; C08F 2220/281; C08F 2220/1858
USPC ........... 522/55, 49, 6, 1, 71, 189, 184; 520/1
See application file for complete search history.

(56) References Cited

U.S. PATENT DOCUMENTS

| | | |
|---|---|---|
| 2,067,494 A | 1/1937 | Lichty |
| 2,716,633 A | 8/1955 | Engelhardt |
| RE24,906 E | 12/1960 | Ulrich |
| 3,239,478 A | 3/1966 | Harlan, Jr. |
| 3,382,218 A | 5/1968 | Ayad |
| 3,406,141 A | 10/1968 | Bain |
| 4,013,638 A | 3/1977 | D'Amico |
| 4,089,857 A | 5/1978 | Engler |
| 4,181,752 A | 1/1980 | Martens |
| 4,554,325 A | 11/1985 | Schmidt |
| 4,678,846 A | 7/1987 | Weitemeyer |
| 4,798,852 A | 1/1989 | Zimmerman |
| 4,812,541 A | 3/1989 | Mallya |
| 4,908,229 A | 3/1990 | Kissel |
| 5,122,567 A | 6/1992 | Spada |

(Continued)

FOREIGN PATENT DOCUMENTS

| | | |
|---|---|---|
| EP | 0286376 | 10/1988 |
| EP | 0349270 | 1/1990 |

(Continued)

OTHER PUBLICATIONS

Bussels, "Multiblock Copolymers Synthesized by Miniemulsion Polymerization Using Multifunctional RAFT Agents", Macromolecules, Dec. 14, 2004, vol. 37, No. 25, pp. 9299-9301.

(Continued)

*Primary Examiner* — Jessica Whiteley
(74) *Attorney, Agent, or Firm* — Jean A. Lown

(57) ABSTRACT

Controlled radical initiators, reaction mixtures containing the controlled radical initiators and various ethylenically unsaturated monomers, and polymeric materials formed from the reaction mixtures are provided. The controlled radical initiators are bis-dithiocarbamate or bis-dithiocarbonate compounds with a single carbon atom between the two dithiocarbamate or dithiocarbonate groups. Polymeric materials such as homopolymers, random copolymers, and block copolymers can be prepared using the controlled radical initiators.

15 Claims, 2 Drawing Sheets

(56) References Cited

U.S. PATENT DOCUMENTS

| | | | |
|---|---|---|---|
| 5,274,063 | A | 12/1993 | Matsumoto |
| 5,726,249 | A | 3/1998 | Barsotti |
| 5,804,301 | A | 9/1998 | Curatolo |
| 5,804,657 | A | 9/1998 | St. Clair |
| 5,907,024 | A | 5/1999 | Ohrbom |
| 5,948,866 | A | 9/1999 | Takeda |
| 6,153,705 | A | 11/2000 | Corpart |
| 6,747,104 | B1 | 6/2004 | Wendland |
| 6,841,637 | B2 | 1/2005 | Lewandowski |
| 6,911,510 | B2 | 6/2005 | Lewandowski |
| 7,714,075 | B1 | 5/2010 | Le |
| 2004/0106732 | A1 | 6/2004 | Tsuji |
| 2013/0165606 | A1 | 6/2013 | Prenzel |
| 2014/0288242 | A1 | 9/2014 | Prenzel |
| 2014/0329971 | A1 | 11/2014 | Prenzel |

FOREIGN PATENT DOCUMENTS

| | | |
|---|---|---|
| JP | 56125471 | 10/1981 |
| JP | H10-30078 | 2/1998 |
| WO | 2000/039233 | 7/2000 |
| WO | 2006/023143 | 3/2006 |
| WO | 2011/119363 | 9/2011 |
| WO | 2018/118905 | 6/2018 |

OTHER PUBLICATIONS

Destarac, "Madix Technology: From Innovative Concepts to Industrialization", Polymer Preprints, 2008, vol. 49, No. 2, pp. 179-180.

Holsboer, "Synthesis of O-Methyl Thioformate", Recueil, 1972, vol. 91, pp. 1371-1372.

Kuriyama, "Living Radical Polymerization of Methyl Methacrylate With a Tetrafunctional Photoiniferter: Synthesis of a Star Polymer", Polymer Journal, 1984, vol. 16, No. 6, pp. 511-514.

Moad, "RAFT Polymerization—Then and Now", Controlled Radical Polymerization: Mechanisms; Tsarevsky, et al.; ACS Symposium Series; American Chemical Society: Washington DC, 2015; pp. 211-246.

O'Reilly, "Mild and Facile Synthesis of Multi-functional RAFT Chain Transfer Agents", Polymers, 2009, vol. 1, pp. 3-15.

Otsu, "Role of Initiator-transfer Agent-terminator (Iniferter) in Radical Polymerizations: Polymer Design by Organic Disulfides as Iniferters", Macromolecular Rapid Communications, Feb. 16, 1982, vol. 3, pp. 127-132.

Otsu, "Living Mono- and Biradical Polymerizations in Homogeneous System Synthesis of AB and ABA Type Block Copolymers", Polymer Bulletin, 1984, vol. 11, pp. 135-142.

Taton, "Macromolecular Design by Interchange of Xanthates: Background, Design, Scope and Applications", Handbook of RAFT Polymerization, ed. Barner-Kowollik, 2008, pp. 373-421.

International Search Report for PCT International Application No. PCT/US2017/039368 dated Sep. 21, 2017, 5 pages.

POLYMERIC MATERIAL AND METHODS OF MAKING USING CONTROLLED RADICAL INITIATORS

CROSS REFERENCE TO RELATED APPLICATIONS

This application is a national stage filing under 35 U.S.C. 371 of PCT/US2017/039368, filed Jun. 27, 2017, which claims the benefit of U.S. Provisional Application Nos. 62/479547, filed Mar. 31, 2017 and 62/360788, filed Jul. 11, 2016, the disclosures of which are incorporated by reference in their entireties herein.

TECHNICAL FIELD

Controlled radical initiators, compositions containing the controlled radical initiators, and polymeric materials formed using the controlled radical initiators are provided.

BACKGROUND

The performance characteristics of polymers are determined not only by their composition but also by their molecular architecture. For copolymers, various properties such as melt viscosity, glass transition temperature, and modulus are often a function of the distribution of the different monomeric units along the polymeric chain. Conventional radical polymerization methods have limited utility in synthesizing polymers with precise architectural and structural characteristics.

Living controlled radical polymerization methods have been developed that allow the preparation of polymers with well-defined molecular weight, polydispersity, topology, composition, and microstructure. These methods are based on the use of special polymerization mediators, which temporarily and reversibly transform propagating radicals into dormant and/or stable species. The reversible transformations are typically either accomplished by reversible deactivation or by reversible chain transfer. Some of the methods that involve living controlled radical polymerization through reversible transformations include iniferter methods, nitroxide mediated polymerization (NMP) methods, atom transfer polymerization (ATRP) methods, and reversible addition-fragmentation (RAFT) methods.

The terms "iniferter" and "photoiniferters" refer to molecules that can act as an initiator, transfer agent, and terminator. Various iniferters were discussed in Otsu et al., Makromol. Chem., Rapid Commun., 3, 127-132 (1982). The compound p-xylene bis(N,N-diethyldithiocarbamate) (XDC) has been used to form various acrylic-based block copolymers such as those described in European Patent Applications 0286376 A2 (Otsu et al.) and 0349270 A2 (Mahfuza et al.).

SUMMARY

Controlled radical initiators, reaction mixtures containing the controlled radical initiators plus various ethylenically unsaturated monomers, and polymeric materials formed from the reaction mixtures are provided. The controlled radical initiators are bis-dithiocarbamate or bis-dithiocarbonate compounds with a single carbon atom between the two dithiocarbamate or dithiocarbonate groups. Polymeric materials such as homopolymers, random copolymers, and block copolymers can be prepared using the controlled radical initiators.

In a first aspect, a polymeric material of Formula (I) is provided.

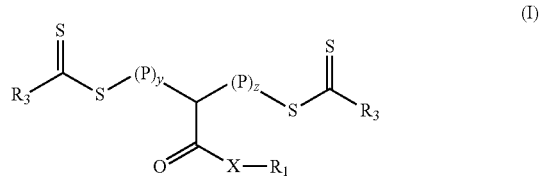

In Formula (I), group $R_1$ is hydrogen, alkyl, fluorinated alkyl, aryl, aralkyl, or substituted aryl (e.g., an aryl substituted with at least one alkyl and/or alkoxy). Group X is oxy or —$NR_2$— where group $R_2$ is hydrogen, alkyl, fluorinated alkyl, aryl, aralkyl, or substituted aryl (e.g., an aryl substituted with at least one alkyl and/or alkoxy). Group $R_3$ is an alkoxy, fluorinated alkoxy, or —$N(R_4)_2$. Each $R_4$ is an alkyl or fluorinated alkyl, or two adjacent $R_4$ groups are combined together with the nitrogen to which they are both attached to form a first heterocyclic ring having 1 to 3 heteroatoms selected from nitrogen, oxygen, and sulfur, the first heterocyclic ring being saturated or unsaturated and optionally fused to one or more second rings that are carbocyclic or heterocyclic. Each P is a polymeric block that includes a polymerized product of a monomer composition containing at least one monomer having a single ethylenically unsaturated group, y is an integer equal to at least 1 (e.g., in a range of 1 to 10, in a range of 1 to 5, or in a range of 1 to 3), and z is an integer in a range of 0 to y. $(P)_y$ means that there are y polymer blocks and $(P)_z$ means that there are z polymeric blocks. In many embodiments z is equal to y. Typically, the polymeric material is not crosslinked.

In some embodiments of the polymeric material of Formula (I), the group $R_3$ is equal to —$N(R_4)_2$ and the polymeric material is of Formula (I-5).

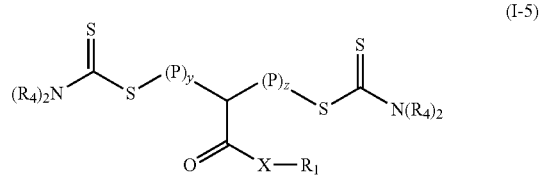

In Formula (I-5), $R_1$, $R_4$, X, P, y, and z are the same as in Formula (I). In many embodiments z is equal to y. Typically, the polymeric material is not crosslinked.

In some other embodiments of the polymeric material of Formula (I), the group X is equal to —$NR_2$— and the polymeric material is of Formula (I-6).

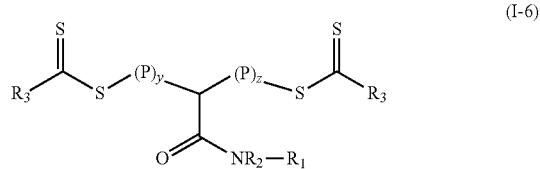

In Formula (I-6), $R_1$, $R_2$, $R_3$, P, y, and z are the same as in Formula (I). In many embodiments z is equal to y. Typically, the polymeric material is not crosslinked.

In some still other embodiments of the polymeric material of Formula (I), the group $R_1$ is equal to $R_6$ and the polymeric material is of Formula (I-7).

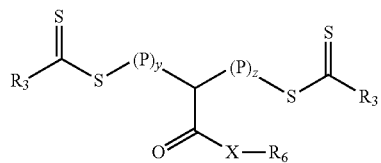
(I-7)

In Formula (I-7), $R_3$, P, X, y, and z are the same as in Formula (I). Group $R_6$ is a fluorinated alkyl. In many of these embodiments, y is equal to z. Typically, the polymeric material is not crosslinked.

In yet other embodiments of the polymeric material of Formula (I), the polymeric material is of Formula (I-4).

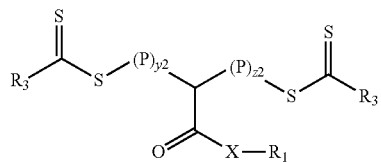
(I-4)

In Formula (I-4), groups $R_1$, $R_3$, X, and P are the same as in Formula (I). The variable y2 is an integer equal to at least 2 (e.g., in a range of 2 to 10 or in a range of 2 to 5) and the variable z2 is an integer in a range of 0 to y2 (e.g., in a range of 0 to 10, in a range of 2 to 10, or in a range of 2 to 5). $(P)_{y2}$ means that there are y2 polymer blocks and $(P)_{z2}$ means that there are z2 polymeric blocks.

In a second aspect, a first reaction mixture is provided. The first reaction mixture includes a) a photoinitiator and b) a first monomer composition containing at least one monomer having a single ethylenically unsaturated group. The initiator is of Formula (V)

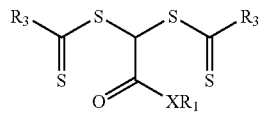
(V)

wherein group $R_1$ is hydrogen, alkyl, fluorinated alkyl, aryl, aralkyl, or substituted aryl (e.g., an aryl substituted with at least one alkyl and/or alkoxy). Group X is oxy or —$NR_2$— where $R_2$ is hydrogen, alkyl, fluorinated alkyl, aryl, aralkyl, or substituted aryl (e.g., an aryl substituted with at least one alkyl and/or alkoxy). Group $R_3$ is an alkoxy, fluorinated alkoxy, or —$N(R_4)_2$. Each $R_4$ is an alkyl or fluorinated alkyl, or two adjacent $R_4$ groups are combined together with the nitrogen to which they are both attached to form a first heterocyclic ring having 1 to 3 heteroatoms selected from nitrogen, oxygen, and sulfur, the first heterocyclic ring being saturated or unsaturated and optionally fused to one or more second rings that are carbocyclic or heterocyclic.

In some embodiments of the first reaction mixture, the photoinitiator of Formula (V) is of Formula (V-2) where X is equal to —$NR_2$—.

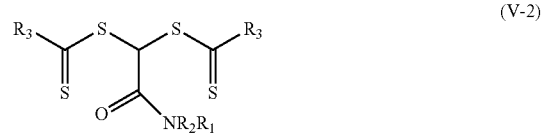
(V-2)

In Formula (V-2), groups $R_1$, $R_2$, and $R_3$ is the same as in Formula (V).

In some embodiments of the first reaction mixture, $R_3$ in Formula (V) is equal to —$N(R_4)_2$. That is, the initiator of Formula (V) is of Formula (V-3).

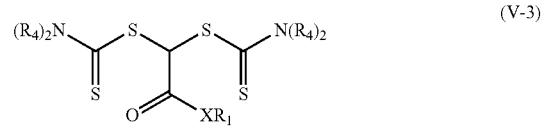
(V-3)

In Formula (V-3), groups $R_1$, $R_4$, and X are the same as in Formula (V).

In some other embodiments of the first reaction mixture, group $R_1$ in the initiator of Formula (V) is equal to $R_6$ and the initiator is of Formula (V-9).

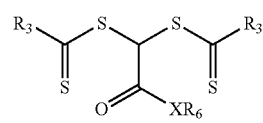
(V-9)

In Formula (V-9), groups $R_3$ and X are the same as in Formula (V). Group $R_6$ is a fluorinated alkyl.

In a third aspect, a second reaction mixture is provided. The second reaction mixture includes a) a polymeric material of Formula (II)

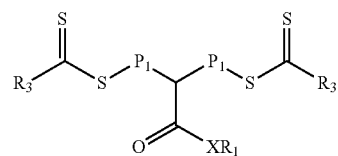
(II)

and b) a second monomer composition comprising at least one monomer having a single ethylenically unsaturated group, wherein the second monomer composition is different than a first monomer composition used to form a polymeric block $P_1$ in the polymeric material of Formula (II). In Formula (II), group $R_1$ is hydrogen, alkyl, fluorinated alkyl, aryl, aralkyl, or substituted aryl (e.g., an aryl substituted with at least one alkyl and/or alkoxy). Group X is oxy or —$NR_2$— where $R_2$ is hydrogen, alkyl, fluorinated alkyl, aryl, aralkyl, or substituted aryl (e.g., an aryl substituted with at least one alkyl and/or alkoxy). Group $R_3$ is an alkoxy, fluorinated alkoxy, or —$N(R_4)_2$. Each $R_4$ is an alkyl or fluorinated alkyl, or two adjacent $R_4$ groups are combined together with the nitrogen to which they are both attached to form a first heterocyclic ring having 1 to 3 heteroatoms selected from nitrogen, oxygen, and sulfur, the first heterocyclic ring being saturated or unsaturated and optionally fused to one or more second rings that are carbocyclic or heterocyclic. $P_1$ is the first polymeric block, the first polymeric block being a polymerized product of the first monomer composition comprising at least one monomer having a single ethylenically unsaturated group.

In some embodiments of the second reaction mixture, group $R_3$ in the polymeric material of Formula (II) is equal to $-N(R_4)_2$. That is, the polymeric material is of Formula (II-1).

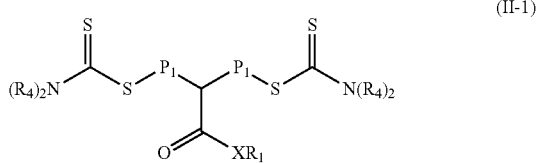

In Formula (II-1), groups X, $R_1$, $R_4$, and $P_1$ are the same as in Formula (II).

In a fourth aspect, a third reaction mixture is provided. The third reaction mixture includes a) a polymeric material of Formula (III)

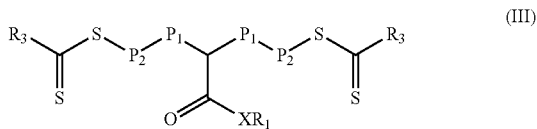

and b) a third monomer composition comprising at least one monomer having a single ethylenically unsaturated group, wherein the third monomer composition is different than a second monomer composition used to form a polymeric block $P_2$ in Formula (III). In Formula (III), group $R_1$ is hydrogen, alkyl, fluorinated alkyl, aryl, aralkyl, or substituted aryl (e.g., an aryl substituted with at least one alkyl and/or alkoxy). Group X is oxy or $-NR_2-$ where $R_2$ is hydrogen, alkyl, fluorinated alkyl, aryl, aralkyl, or substituted aryl (e.g., an aryl substituted with at least one alkyl and/or alkoxy). Group $R_3$ is an alkoxy, fluorinated alkoxy, or $-N(R_4)_2$. Each $R_4$ is an alkyl or fluorinated alkyl, or two adjacent $R_4$ groups are combined together with the nitrogen to which they are both attached to form a first heterocyclic ring having 1 to 3 heteroatoms selected from nitrogen, oxygen, and sulfur, the first heterocyclic ring being saturated or unsaturated and optionally fused to one or more second rings that are carbocyclic or heterocyclic. $P_1$ is a first polymeric block, the first polymeric block being a polymerized product of a first monomer composition comprising at least one monomer having a single ethylenically unsaturated group. Each $P_2$ is a second polymeric block different from the first polymeric block $P_1$, the second polymeric block $P_2$ being a polymerized product of a second monomer composition comprising at least one monomer having a single ethylenically unsaturated group.

In a fifth aspect, a first method of making a polymeric material is provided. The first method includes providing an initiator of Formula (V).

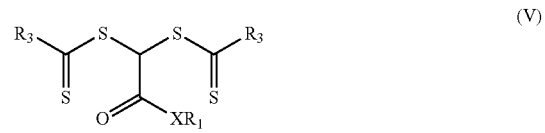

In Formula (V), $R_1$ is hydrogen, alkyl, fluorinated alkyl, aryl, aralkyl, or substituted aryl (e.g., an aryl substituted with at least one alkyl and/or alkoxy). Group X is oxy or $-NR_2-$ where $R_2$ is hydrogen, alkyl, fluorinated alkyl, aryl, aralkyl, or substituted aryl (e.g., an aryl substituted with at least one alkyl and/or alkoxy). Group $R_3$ is an alkoxy, fluorinated alkoxy, or $-N(R_4)_2$. Each $R_4$ is an alkyl or fluorinated alkyl, or two adjacent $R_4$ groups are combined together with the nitrogen to which they are both attached to form a first heterocyclic ring having 1 to 3 heteroatoms selected from nitrogen, oxygen, and sulfur, the first heterocyclic ring being saturated or unsaturated and optionally fused to one or more second rings that are carbocyclic or heterocyclic. The first method further includes preparing a first reaction mixture containing the initiator of Formula (V) and a first monomer composition containing at least one monomer having a single ethylenically unsaturated group. The first method still further includes forming a first polymeric material of Formula (II) from the first reaction mixture.

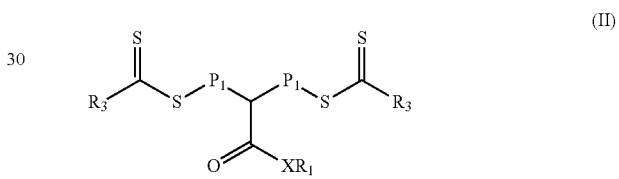

In Formula (II), $P_1$ is a first polymeric block, the first polymeric block being a polymerized product of the first monomer composition. $R_1$, $R_3$, and X are the same as in Formula (V).

In some embodiments of the first method, group X in the initiator is equal to $-NR_2-$. That is, the initiator is of Formula (V-2)

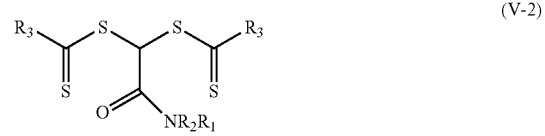

and the first polymeric material is of Formula (II-2).

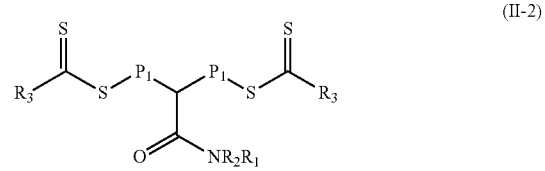

Groups $P_1$, $R_1$, $R_2$, and $R_3$ are the same as defined in Formulas (II) and (V).

In other embodiments of the first method, group $R_3$ in the initiator is equal to $-N(R_4)_2$. That is, the initiator is of Formula (V-3)

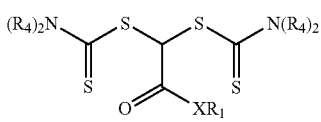

(V-3)

and the first polymeric material is of Formula (II-1).

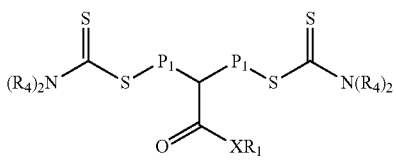

(II-1)

Groups $P_1$, X, $R_1$, and $R_4$ are the same as defined in Formulas (II) and (V).

In still other embodiments of the first method, the group $R_1$ of the initiator of Formula (V) is equal to $R_6$ where $R_6$ is a fluorinated alkyl. That is, the photoinitiator of Formula (V) is of Formula (V-9)

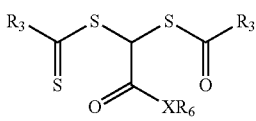

(V-9)

and the first polymeric material is of Formula (II-3).

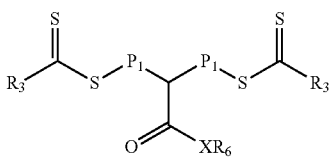

(II-3)

Groups $P_1$, X, and $R_3$ are the same as defined in Formulas (II) and (V).

In a sixth aspect, a second method of making a polymeric material is provided. The second method includes providing a polymeric material of Formula (II).

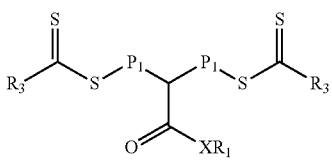

(II)

In Formula (II), $R_1$ is hydrogen, alkyl, fluorinated alkyl, aryl, aralkyl, or substituted aryl (e.g., an aryl substituted with at least one alkyl and/or alkoxy). Group X is oxy or —$NR_2$— where $R_2$ is hydrogen, alkyl, fluorinated alkyl, aryl, aralkyl, or substituted aryl (e.g., an aryl substituted with at least one alkyl and/or alkoxy). Group $R_3$ is an alkoxy, fluorinated alkoxy, or —$N(R_4)_2$. Each $R_4$ is an alkyl or fluorinated alkyl, or two adjacent $R_4$ groups are combined together with the nitrogen to which they are both attached to form a first heterocyclic ring having 1 to 3 heteroatoms selected from nitrogen, oxygen, and sulfur, the first heterocyclic ring being saturated or unsaturated and optionally fused to one or more second rings that are carbocyclic or heterocyclic. $P_1$ is a first polymeric block, the first polymeric block being a polymerized product of a first monomer composition. The second method further includes preparing a second reaction mixture containing the polymer of Formula (II) and a second monomer composition containing at least one monomer having a single ethylenically unsaturated group, wherein the second monomer composition is different than the first monomer composition. The method still further includes forming a polymeric material of Formula (III) from the second reaction mixture.

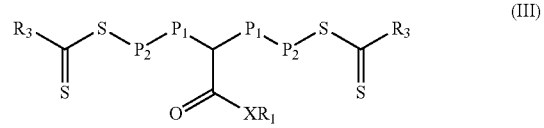

(III)

In Formula (III), $P_2$ is a second polymeric block, the second polymeric block being a polymerized product of the second monomer composition. $R_1$, $R_2$, $R_3$, $P_1$, and X are the same as in Formula (II).

In a seventh aspect, a compound of Formula (V-9) is provided.

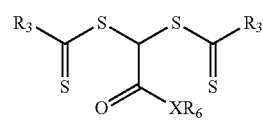

(V-9)

In Formula (V-9), $R_6$ is a fluorinated alkyl. Group X is oxy or —$NR_2$— where $R_2$ is hydrogen, alkyl, fluorinated alkyl, aryl, aralkyl, or substituted aryl (e.g., an aryl substituted with at least one alkyl and/or alkoxy). Group $R_3$ is an alkoxy, fluorinated alkoxy, or —$N(R_4)_2$. Each $R_4$ is an alkyl or fluorinated alkyl, or two adjacent $R_4$ groups are combined together with the nitrogen to which they are both attached to form a first heterocyclic ring having 1 to 3 heteroatoms selected from nitrogen, oxygen, and sulfur, the first heterocyclic ring being saturated or unsaturated and optionally fused to one or more second rings that are carbocyclic or heterocyclic.

DETAILED DESCRIPTION

Figure 1:
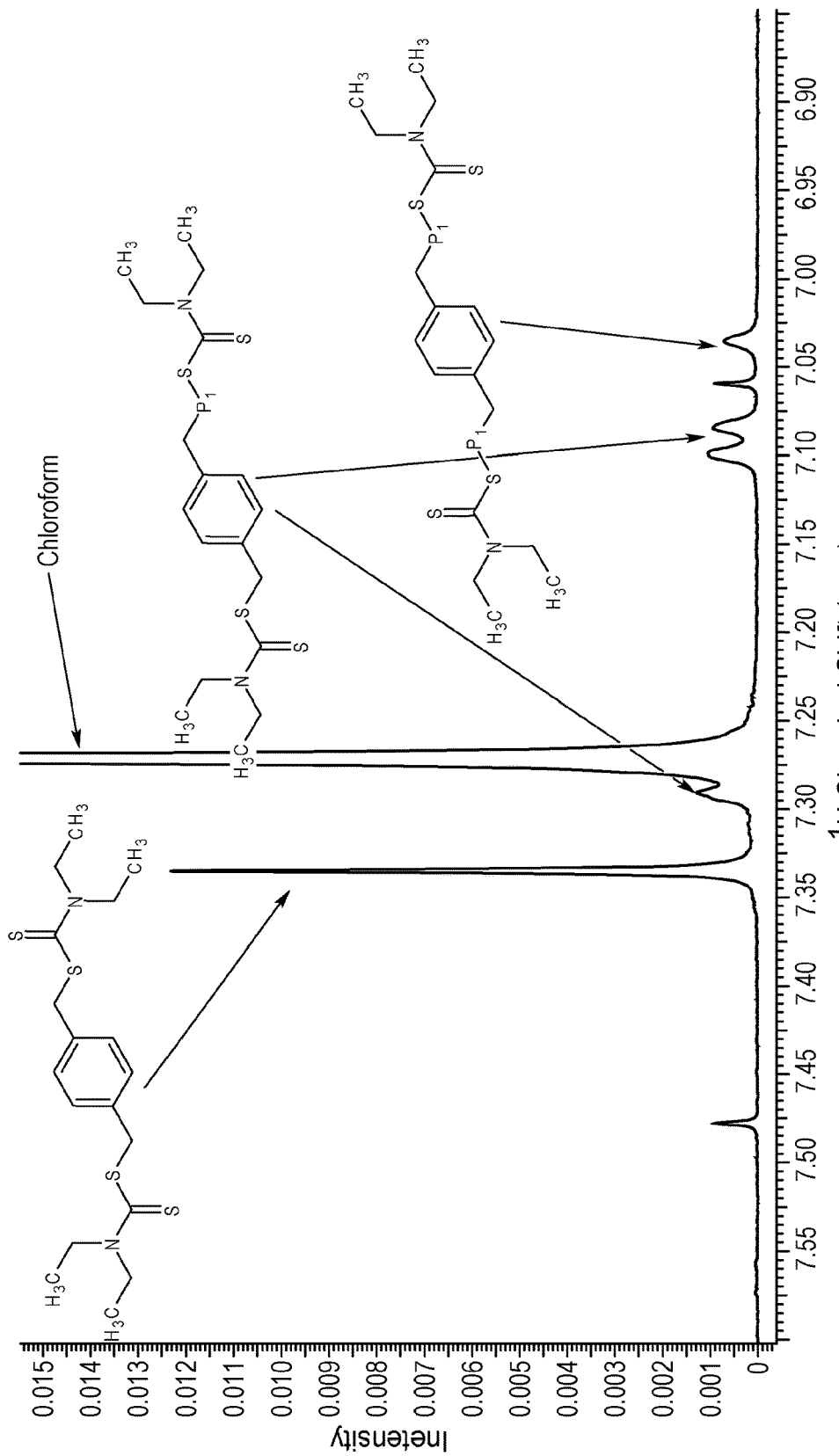
FIG. 1 shows the aromatic region of the $^1$H NMR spectrum for Comparative Example G after 93 percent conversion (i.e., polymerization) of the monomer.

Controlled radical initiators, reaction mixtures containing the controlled radical initiators plus various ethylenically unsaturated monomers, and polymeric materials formed from the reaction mixtures are provided. The controlled radical initiators are bis-dithiocarbamate or bis-dithiocarbonate compounds with a single carbon atom between the two dithiocarbamate or dithiocarbonate groups. The controlled radical initiator compounds can be referred to as iniferters because they can function as a controlled radical initiator, transfer agent, and terminator. The controlled radical initiators can be referred to as photoinitiators or photoiniferters because the controlled radical polymerization reaction typically is photolytically induced. Polymeric materials such as homopolymers, random copolymers, and block copolymers having well controlled architectures can be formed using these photoinitiator compounds.

The terms "a", "an", and "the" are used interchangeably with "at least one" to mean one or more of the elements being described.

The term "and/or" means either or both. For example "A and/or B" means only A, only B, or both A and B.

The terms "polymer" and "polymeric material" are used interchangeably and refer to materials formed by reacting one or more monomers. The terms include homopolymers, copolymers, terpolymers, or the like. Likewise, the terms "polymerize" and "polymerizing" refer to the process of making a polymeric material that can be a homopolymer, copolymer, terpolymer, or the like.

The term "alkyl" refers to a monovalent group that is a radical of an alkane. The alkyl group can have 1 to 32 carbon atoms, 1 to 20 carbon atoms, 1 to 12 carbon atoms, or 1 to 6 carbon atoms. The alkyl can be linear, branched, cyclic, or a combination thereof. A linear alkyl has at least one carbon atom while a cyclic or branched alkyl has at least 3 carbon atoms. In some embodiments, if there are greater than 12 carbon atoms, the alkyl is branched.

The term "fluorinated alkyl" refers to an alkyl group substituted with at least one fluorine atom (i.e., at least one hydrogen atom is replaced with a fluorine atom). If all of the hydrogen atoms are replaced with fluorine atoms, the fluorinated alkyl is a "perfluoroalkyl".

The term "alkoxy" refers to a monovalent group of formula —OR$^a$ where R$^a$ is an alkyl as defined above.

The term "fluorinated alkoxy" refers to an alkoxy group substituted with at least one fluorine atom.

The term "aryl" refers to a monovalent group that is a radical of an aromatic carbocyclic compound. The aryl group has at least one aromatic carbocyclic ring and can have 1 to 5 optional rings that are connected to or fused to the aromatic carbocyclic ring. The additional rings can be aromatic, aliphatic, or a combination thereof The aryl group usually has 5 to 20 carbon atoms.

The term "substituted aryl" refers to an aryl group substituted with at least one alkyl group, substituted with at least one alkoxy group, or substituted with at least one alkyl group plus at least one alkoxy group. The substituted aryl group contains 6 to 40 carbon atoms. The substituted aryl group often contains an aryl group having 5 to 20 carbon atoms and an alkyl group and/or alkoxy group each having 1 to 20 carbon atoms.

The term "aralkyl" refers to an alkyl group substituted with at least one aryl group. The aralkyl group contains 6 to 40 carbon atoms. The aralkyl group often contains an alkyl group having 1 to 20 carbon atoms and an aryl group having 5 to 20 carbon atoms.

The term "(meth)acryloyl" refers to a group of formula $CH_2=CHR^b$—(CO)— where $R^b$ is hydrogen or methyl and the group —(CO)— refers to a carbonyl group.

The term "heterocyclic ring" refers to a ring structure having at least 1 heteroatom selected from oxygen, nitrogen, or sulfur, wherein the ring structure is saturated or unsaturated. The heterocyclic ring typically has 5 to 7 ring atoms and 1 to 3 heteroatoms. The heterocyclic ring can optionally be fused to one or more second rings that are carbocyclic or heterocyclic and that can be saturated or unsaturated. Any of the rings can optionally be substituted with an alkyl group.

The terms "in a range of" or "in the range of" are used interchangeably to refer to all values within the range plus the endpoints of the range.

A polymeric material of Formula (I) is provided.

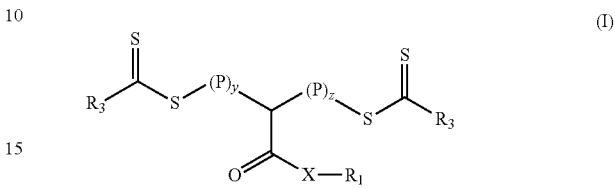

In Formula (I), group $R_1$ is hydrogen, alkyl, fluorinated alkyl, aryl, aralkyl, or substituted aryl. Group X is oxy or —NR$_2$— where $R_2$ is hydrogen, alkyl, fluorinated alkyl, aryl, aralkyl, or substituted aryl. Group $R_3$ is an alkoxy, fluorinated alkoxy, or —N(R$_4$)$_2$. Each $R_4$ is an alkyl or fluorinated alkyl, or two adjacent $R_4$ groups are combined together with the nitrogen to which they are both attached to form a first heterocyclic ring having 1 to 3 heteroatoms selected from nitrogen, oxygen, and sulfur, the first heterocyclic ring being saturated or unsaturated and optionally fused to one or more second rings that are carbocyclic or heterocyclic. Each P is a polymeric block that includes a polymerized product of a monomer composition containing at least one monomer having a single ethylenically unsaturated group, y is an integer equal to at least 1 (e.g., in a range of 1 to 10, in a range of 1 to 5, or an a range of 1 to 3), and z is an integer in a range of 0 to y. In Formula (I), (P)$_y$ means that there are y polymer blocks and (P)$_z$ means that there are z polymeric blocks. The size and the compositions of the various polymeric blocks can vary. In many embodiments of Formula (I), the polymeric material is not crosslinked.

Group $R_1$ in Formula (I) can be hydrogen, alkyl, fluorinated alkyl, aryl, aralkyl, or substituted aryl. Suitable alkyl and fluorinated alkyl groups typically have at least 1 carbon atom, at least 2 carbon atoms, at least 3 carbon atoms, or at least 4 carbon atoms and can have up to 32 carbon atoms, up to 20 carbon atoms, up to 18 carbon atoms, up to 16 carbon atoms, up to 12 carbon atoms, or up to 10 carbon atoms. Some example alkyl and fluorinated alkyl groups have 1 to 20 carbon atoms, 1 to 10 carbon atoms, 2 to 10 carbon atoms, 1 to 6 carbon atoms, 2 to 6 carbon atoms, or 1 to 4 carbon atoms. The fluorinated alkyl groups can have one to all of the hydrogen atoms replaced with fluorine atoms. In some example fluorinated alkyl groups, all of the hydrogen atoms are replaced with fluorine and the fluorinated alkyl is a perfluoroalkyl. Suitable aryl groups often have 5 to 20 carbon atoms or 6 to 10 carbon atoms. In some embodiments, the aryl is phenyl. Suitable aralkyl and substituted aryl groups often have 6 to 40 carbon atoms, 7 to 20 carbon atoms, or 7 to 10 carbon atoms. Some example substituted aryl groups are phenyl substituted with an alkyl, an alkoxy, or both with each alkyl or alkoxy group having 1 to 10 carbon atoms, 1 to 6 carbon atoms, or 1 to 4 carbon atoms. Some example aralkyl group have an alkyl group with 1 to 10 carbon atoms, 1 to 6 carbon atoms, or 1 to 4 carbon atoms that is substituted with phenyl. In many embodiments, $R_1$ is an alkyl or fluorinated alkyl.

Group X in Formula (I) is either oxy or —NR$_2$— where $R_2$ can be hydrogen, alkyl, fluorinated alkyl, aryl, aralkyl, or substituted aryl. Suitable alkyl, fluorinated alkyl, aryl, aralkyl, and substituted aryl $R_2$ groups are the same as those described above for group $R_1$. In some embodiments, $R_2$ is hydrogen, alkyl, or fluorinated alkyl. In other embodiments, $R_2$ is hydrogen or alkyl. In still other embodiments, $R_2$ is hydrogen. The polymeric material of Formula (I) has a pendant group —(CO)—O—$R_1$ or —(CO)—$NR_2$—$R_1$. The pendant group can be selected, if desired, to be similar or identical to pendant groups of the monomeric units in the polymeric block P.

In some embodiments of Formula (I), group $R_3$ is an alkoxy or fluorinated alkoxy. Suitable alkoxy and fluorinated alkoxy groups typically have at least 1 carbon atom, at least 2 carbon atoms, at least 3 carbon atoms, or at least 4 carbon atoms and can have up to 20 carbon atoms, up to 18 carbon atoms, up to 16 carbon atoms, up to 12 carbon atoms, or up to 10 carbon atoms. Some example alkoxy and fluorinated alkoxy groups have 1 to 20 carbon atoms, 1 to 10 carbon atoms, 2 to 10 carbon atoms, 1 to 6 carbon atoms, 2 to 6 carbon atoms, or 1 to 4 carbon atoms. The fluorinated alkoxy groups can have one to all of the hydrogen atoms replaced with fluorine atoms. In some embodiments, all of the hydrogen atoms are replaced with fluorine atoms.

In other embodiments of Formula (I), group $R_3$ is of formula —$N(R_4)_2$. Each $R_4$ is an alkyl or fluorinated alkyl, or two adjacent $R_4$ groups are combined together with the nitrogen to which they are both attached to form a first heterocyclic ring having 1 to 3 heteroatoms selected from nitrogen, oxygen, and sulfur, the first heterocyclic ring being saturated or unsaturated and optionally fused to one or more second rings that are carbocyclic or heterocyclic. Suitable alkyl and fluorinated alkyl groups typically have at least 1 carbon atom, at least 2 carbon atoms, at least 3 carbon atoms, or at least 4 carbon atoms and can have up to 20 carbon atoms, up to 18 carbon atoms, up to 16 carbon atoms, up to 12 carbon atoms, or up to 10 carbon atoms. Some example alkyl and fluorinated alkyl groups have 1 to 20 carbon atoms, 1 to 10 carbon atoms, 2 to 10 carbon atoms, 1 to 6 carbon atoms, 2 to 6 carbon atoms, or 1 to 4 carbon atoms. The fluorinated alkyl groups can have one to all of the hydrogen atoms replaced with fluorine atoms. When the formula —$N(R_4)_2$ forms a heterocyclic ring, the heterocyclic ring typically has a first ring structure with 5 to 7 ring members or 5 to 6 ring members and with 1 to 3 heteroatoms or 1 to 2 heteroatoms in the ring. If there is one heteroatom in the first ring structure, the heteroatom is nitrogen. If there are two or three heteroatoms in the first ring structure, one heteroatom is nitrogen and any additional heteroatom is selected from nitrogen, oxygen, and sulfur. The first ring structure optionally can be fused to additional ring structures. The additional ring structures can be heterocyclic or carbocyclic. The first ring structure or any additional ring structures can be saturated or unsaturated (e.g., partially or fully unsaturated). If there is an additional heterocyclic ring structure, it typically has 5 or 6 ring members and 1 or 2 heteroatoms selected from nitrogen, oxygen, and sulfur. The additional carbocyclic ring is often benzene. In some embodiments, the additional ring is a benzene ring fused to the heterocyclic ring. In many embodiments, the heterocyclic ring has a single ring structure with 5 or 6 ring members and with either 1 or 2 heteroatoms in the ring. Any of the rings can be optionally substituted with an alkyl group. Examples of heterocyclic rings include, but are not limited to, morpholino, thiomorpholino, pyrrolidinyl, piperidinyl, homo-piperidinyl, indolyl, carbazolyl, imidazolyl, and pyrazolyl.

In some specific embodiments of Formula (I), $R_3$ is an alkoxy group or a group of formula —$N(R_4)_2$ where each $R_4$ is an alkyl.

Each polymeric block P in Formula (I) is the polymerized product of a monomer composition containing at least one monomer having a single ethylenically unsaturated group. Any monomer having a single ethylenically unsaturated group can be used based on the desired properties of the resulting polymeric material. In many embodiments, all of the monomers in the first monomer composition have a single ethylenically unsaturated group. In some embodiments all of the monomers used to form any polymeric block P have a single (meth)acryloyl group. In other embodiments, all of the monomers used to form any polymeric block P have a single ethylenically unsaturated group that is not a (meth)acryloyl group. In still other embodiments, all of the monomers used to form any polymeric block P have a single ethylenically unsaturated group and some, but not all, of the ethylenically unsaturated groups are (meth)acryloyl groups.

Suitable monomers with a single (meth)acryloyl group include, but are not limited to, alkyl (meth)acrylates, fluorinated alkyl (meth)acrylates, aryl (meth)acrylates, aralkyl (meth)acrylates, substituted aryl (meth)acrylates, (meth) acrylic acid, (meth)acrylamide, N-alkyl (meth)acrylamide, N,N-dialkyl (meth)acrylamide, N-alkylaminoalkyl (meth) acrylate, N,N-dialkylaminoalkyl (meth)acrylate, N-alkylaminoalkyl (meth)acrylamide, N,N-dialkylaminoalkyl (meth)acrylamide, hydroxy-substituted alkyl (meth)acrylates, hydroxy-substituted alkyl (meth)acrylamides, alkoxylated alkyl (meth)acrylate, acid-substituted alkyl (meth) acrylates, acid-substituted alkyl (meth)acrylamides, glycidyl-containing (meth)acrylates, aminosulfonyl-containing (meth)acrylates, cationic monomers such as N,N,N-trialkylaminoalkyl (meth)acrylate, zwitterionic monomers (e.g., 2-(N-3-sulfopropyl-N,N-dimethylammonium)ethyl (meth)acrylate), and mixtures thereof.

Suitable monomers with a single ethylenically unsaturated group that is not a (meth)acryloyl group include, but are not limited to, N-vinylpyrrolidone, N-vinylcaprolactam, vinyl acetate, vinyl methyl ether, styrene, isoprene, butadiene, vinyl dimethylazlactone (VDM), isopropenyl dimethylazlactone (IDM), vinyl oxazole, and the like. A plurality of different monomers with a single ethylenically unsaturated group that is not a (meth)acryloyl group can be included in the monomer composition for any polymeric block.

In some embodiments, the monomer composition contains a mixture of a) one or more first monomers that have a single (meth)acryloyl group and b) one or more second monomers that have a single ethylenically unsaturated group that is not a (meth)acryloyl group. For example, the monomer compositions contain 1 to 99 weight percent of the first monomer and 99 to 1 weight percent of the second monomer. In some examples, the monomer composition contains 10 to 99 weight percent of the first monomer and 1 to 90 weight percent of the second monomer or 10 to 99 weight percent of the second monomer and 1 to 90 weight percent of the first monomer, 20 to 99 weight percent of the first monomer and 1 to 80 weight percent of the second monomer or 20 to 99 weight percent of the second monomer and 1 to 80 weight percent of the first monomer, 30 to 99 weight percent of the first monomer and 1 to 70 weight percent of the second monomer or 1 to 70 weight percent of the second monomer and 30 to 99 weight percent of the first monomer, 40 to 99 weight percent of the first monomer and 1 to 60 weight percent of the second monomer or 40 to 99 weight percent of the second monomer and 1 to 60 weight percent of the first monomer, 50 to 99 weight percent of the first monomer and 1 to 50 weight percent of the second monomer or 50 to 99 weight percent of the second monomer and 1 to 50 weight percent of the first monomer, 60 to 99 weight percent of the first monomer and 1 to 40 weight percent of the second monomer or 60 to 99 weight percent of the second monomer and 1 to 40 weight percent of the first monomer, 70 to 99 weight percent of the first monomer and 1 to 30 weight percent of the second monomer or 70 to 99 weight percent of the second monomer and 1 to 30 weight percent of the first monomer, 80 to 99 weight percent of the first monomer and 1 to 20 weight percent of the second monomer or 80 to 99 weight percent of the second monomer and 1 to 20 weight percent of the first monomer, 90 to 99 weight percent of the first monomer and 1 to 10 weight percent of the second monomer or 90 to 99 weight percent of the second monomer and 1 to 10 weight percent of the first monomer, or 95 to 99 weight percent of the first monomer and 1 to 5 weight percent of the second monomer or 95 to 99 weight percent of the second monomer and 1 to 5 weight percent of the first monomer. In these monomer compositions, there can be a single first monomer or a plurality of first monomers. Likewise, there can be a single second monomer or a plurality of second monomers. The monomer composition typically does not contain monomers having more than one ethylenically unsaturated group.

In Formula (I), (P)$_y$ means that there are y polymer blocks and (P)z means that there are z polymeric blocks. The variable y is an integer equal to at least 1 (e.g., in a range of 1 to 10, in a range of 1 to 5, in a range of 1 to 3, or in a range of 1 to 2) and the variable z is an integer in a range of 0 to y. If the variable y is equal to 1, the variable z is equal to 0 or 1. If z is equal to 0, then the resulting polymeric material has a mono-directional polymeric chain. That is, there is a polymeric chain only on one side of the divalent group —C[(CO)—XR$_1$]H— in Formula (I). If z is equal to 1, then the resulting polymeric material has a bi-directional polymeric chain. That is, there is a polymeric chain on both sides of the divalent group —C[(CO)—XR$_1$]H— in Formula (I).

In some embodiments, the polymeric material formed in the early stages of polymerization of the monomer composition results in the formation of a polymeric chain growing on one but not on both sides of the divalent group —C[(CO)—XR$_1$]H— in Formula (I). That is, the reaction product is predominately a polymeric material having y equal to 1 and z equal to 0. As polymerization proceeds, the reaction product includes a mixture of a first polymeric material having y equal to 1 and z equal to 0 (i.e., this first polymeric material can be referred to as a "mono-directional polymeric material") and a second polymeric material having y equal to 1 and z equal to 1 (i.e., this second polymeric material can be referred to as a "bi-directional polymeric material"). As the extent of polymerization (i.e., conversion of the monomer composition) increases, the percentage of the polymeric material that is bi-directional typically increases. When the conversion is at least 90 percent, the amount of bi-directional polymeric material is often at least 80 weight percent, at least 90 weight percent, or at least 95 weight percent based on the total weight of polymeric material (i.e., the mono-directional plus bi-directional polymeric material).

In some embodiments of the polymeric material of Formula (I), the group R$_3$ is equal to —N(R$_4$)$_2$ and the polymeric material is of Formula (I-5).

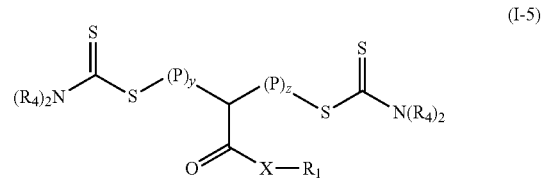

(I-5)

In Formula (I-5), R$_1$, R$_4$, X, P, y, and z are the same as in Formula (I). In many embodiments, z is equal to y.

In some other embodiments of the polymeric material of Formula (I), the group X is equal to —NR$_2$— and the polymeric material is of Formula (I-6).

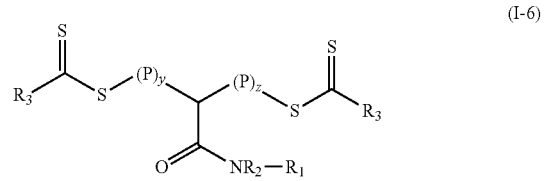

(I-6)

In Formula (I-6), R$_1$, R$_2$, R$_3$, P, y, and z are the same as in Formula (I). In many of these embodiments, y is equal to z.

In some still other embodiments of the polymeric material of Formula (I), the group R$_1$ is equal to R$_6$ and the polymeric material is of Formula (I-7).

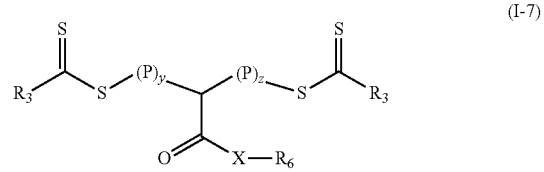

(I-7)

In Formula (I-7), X, R$_3$, P, y, and z are the same as in Formula (I). Group R$_6$ is a fluorinated alkyl. In many of these embodiments, y is equal to z.

In still other embodiments of the polymeric material of Formula (I), the variable y is equal to at least 2 and the polymeric material is of Formula (I-4).

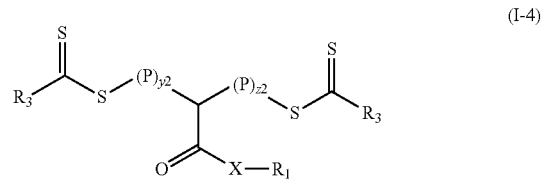

(I-4)

In Formula (I-4), groups X, R$_1$, R$_3$, and P are the same as in Formula (I). The variable y2 is an integer equal to at least 2 (e.g., in a range of 2 to 10 or in a range of 2 to 5) and the variable z2 is an integer in a range of 0 to y2 (e.g., in a range of 0 to 10, in a range of 2 to 10, or in a range of 2 to 5). In many embodiments of Formula (I-4), y2 is equal to z2.

In some embodiments of Formula (I), y is equal to 1 and z is an integer in a range of 0 to 1. The resulting polymeric material is of Formula (I-1).

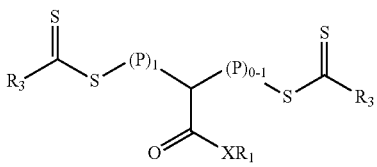
(I-1)

In Formula (I-1), $(P)_1$ means that there is one polymeric block (y is equal to 1 in Formula (I)) and $(P)_{0-1}$ means that there are 0 to 1 polymeric blocks (z is 0 to 1 in Formula (I)). In many embodiments of Formula (I-1), both y and z in Formula (I) are equal to 1 and the polymeric material of Formula (II).

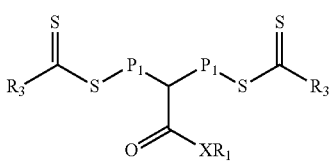
(II)

In Formula (II), $P_1$ refers to a first polymeric block. The first polymeric block $P_1$ is a polymerized product of a first monomer composition containing at least one monomer having a single ethylenically unsaturated group. $P_1$ can be a homopolymer or a copolymer. If $P_1$ is a copolymer, it is typically a random copolymer. Groups $R_1$, $R_3$, and X are the same as defined for Formula (I). The polymeric material of Formula (II) can be considered as having a single polymeric block $P_1$ and the polymeric block has a pendant group —(CO)—$XR_1$. That is, there is a divalent group of formula —C[(CO)—$XR_1$]H— between two monomeric units within polymeric block $P_1$.

In some particular embodiments, the polymeric material of Formula (II) is of Formula (II-1).

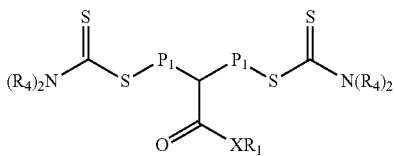
(II-1)

In Formula (II-1), $R_1$, $R_4$, and X are defined as in Formula (I) and $P_1$ is defined as in Formula (II).

In other particular embodiments of Formula (II), the polymeric material is of Formula (II-2).

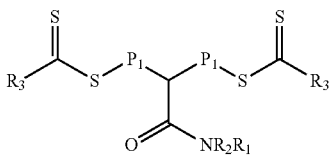
(II-2)

In Formula (II-2), $R_1$, $R_2$, and $R_3$ are defined as in Formula (I) and $P_1$ is defined as in Formula (II).

In still other particular embodiments of Formula (II), the polymeric material is of Formula (II-3).

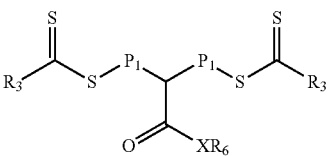
(II-3)

In Formula (II-1), $R_3$, and X are defined as in Formula (I), $P_1$ is defined as in Formula (II), and $R_6$ is a fluorinated alkyl.

In yet other embodiments of Formula (I), y is equal to 2 and z is an integer in a range of 0 to 2. The resulting polymeric material is of Formula (I-2).

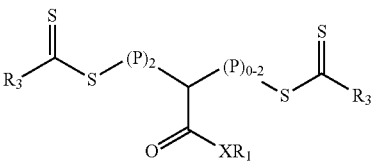
(I-2)

In Formula (I-2), $(P)_2$ means that there are two polymeric blocks (y is equal to 2 in Formula (I)) and $(P)_{0-2}$ means that there are 0, 1 or 2 polymeric blocks (z is an integer in a range of 0 to 2 in Formula (I)). In many embodiments of Formula (I-2), both y and z in Formula (I) are equal to 2 and the polymeric material of Formula (III).

(III)

In Formula (III), $P_1$ is a first polymeric block that is a polymerized product of a first monomer composition containing at least one monomer having a single ethylenically unsaturated group. $P_2$ is a second polymeric block that is a polymerized product of a second monomer composition containing at least one monomer having a single ethylenically unsaturated group. The composition of the second polymeric block $P_2$ is different than the composition of the first polymeric block $P_1$. That is, first monomer composition is different than second monomer composition. Groups $R_1$, $R_3$, and X are the same as defined for Formula (I). Each block $P_1$ and $P_2$ can be a homopolymer or a copolymer. If either block is a copolymer, it is typically a random copolymer. The polymeric material of Formula (III) can be referred to as a triblock with two $P_2$ blocks separated by a $P_1$ block having a pendant group —(CO)—$XR_1$. That is, there is a divalent group of formula —C[(CO)—$XR_1$]H— between two monomeric units within polymeric block $P_1$.

In some particular embodiments of Formula (III), $R_3$ is equal to —$N(R_4)_2$ and the polymeric material is of Formula (III-1).

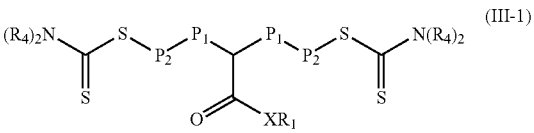
(III-1)

Groups X, $R_1$, and $R_4$ are as defined in Formula (I) and groups $P_1$ and $P_2$ are defined as in Formula (III).

In other particular embodiments of Formula (III), X is equal to —$NR_2$— and the polymeric material is of Formula (III-2).

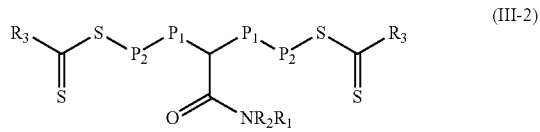

(III-2)

Groups $R_1$, $R_2$, and $R_3$ are as defined in Formula (I) and groups $P_1$ and $P_2$ are defined as in Formula (III).

In still other particular embodiments of Formula (III), $R_1$ is equal to $R_6$, which is a fluorinated alkyl, and the polymeric material is of Formula (III-3).

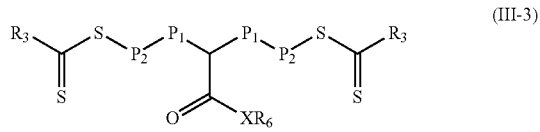

(III-3)

Groups X and $R_3$ are as defined in Formula (I) and groups $P_1$ and $P_2$ are defined as in Formula (III).

In still other embodiments of Formula (I), y is equal to 3 and z is an integer in a range of 0 to 3. The resulting polymeric material is of Formula (I-3).

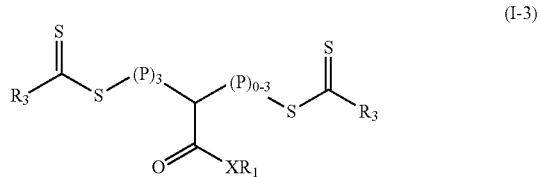

(I-3)

In Formula (I-3), $(P)_3$ means that there are three polymeric blocks (y is equal to 3 in Formula (I)) and $(P)_{0-3}$ means that there are 0, 1, 2 or 3 polymeric blocks (z is an integer in a range of 0 to 3 in Formula (I)). In many embodiments of Formula (I-3), both y and z in Formula (I) are equal to 3 and the polymeric material of Formula (IV).

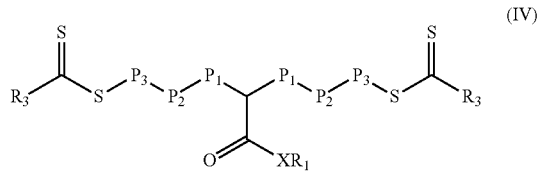

(IV)

In Formula (IV), $P_1$ is a first polymeric block that is a polymerized product of a first monomer composition containing at least one monomer having a single ethylenically unsaturated group. $P_2$ is a second polymeric block that is a polymerized product of a second monomer composition containing at least one monomer having a single ethylenically unsaturated group. $P_3$ is a third polymeric block that is a polymerized product of a third monomer composition containing at least one monomer having a single ethylenically unsaturated group. The composition of the second polymeric block $P_2$ is different than the composition of the first polymeric block $P_1$ and different than the composition of the third polymeric block $P_3$. Stated differently, second monomer composition is different than both first monomer composition and third monomer composition; first monomer composition can be the same as or different than third monomer composition. The composition of the first polymeric block $P_1$ can be the same or different than the composition of the third polymeric block $P_3$. Groups $R_1$, $R_3$, and X are the same as defined for Formula (I). Each block $P_1$, $P_2$, and $P_3$ can be a homopolymer or a copolymer. If any block is a copolymer, it is typically a random copolymer. The polymeric material of Formula (IV) can be referred to as a pentablock with two $P_3$ blocks plus two $P_2$ blocks separated by a $P_1$ block having a pendant group —(CO)—$XR_1$. That is, there is a divalent group of formula —C[(CO)—$XR_1$]H— between two monomeric units within polymeric block $P_1$.

Each polymeric block (e.g., P, $P_1$, $P_2$, or $P_3$) can have any desired molecular weight. The molecular weight of each block (even if given the same designation such as $P_1$, $P_2$, or $P_3$) can be the same or different than any other polymeric block. In some embodiments, the weight average molecular weight of any polymeric block is at least 1,000 Daltons, at least 2,000 Daltons, at least 5,000 Daltons, at least 10,000 Daltons, at least 20,000 Daltons, at least 50,000 Daltons, or at least 100,000 Daltons. The weight average molecular weight of any polymeric block can be up to 1 million Daltons or even higher, up to 750,000 Daltons, up to 500,000 Daltons, up to 200,000 Daltons, or up to 100,000 Daltons.

The polymeric materials of Formulas (I) (including those of Formula (I-1) to (I-3) and (II) to (IV)) are prepared by reacting a monomer composition containing at least one monomer having a single ethylenically unsaturated group in the presence of both a photoinitiator of Formula (V)

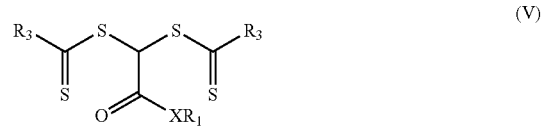

(V)

and actinic radiation (e.g., typically actinic radiation in the ultraviolet region of the electromagnetic spectrum). In Formula (V), groups $R_1$, $R_3$, and X are the same as described for Formula (I) above.

The compounds of Formula (V) can be formed using any suitable method. One such method is shown in Reaction Scheme A.

Reaction Scheme A

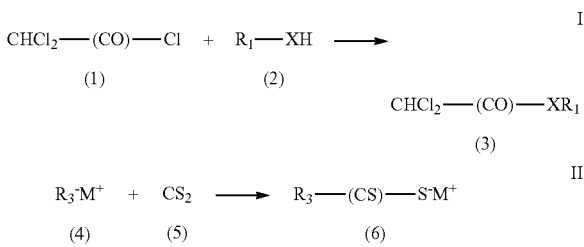

-continued

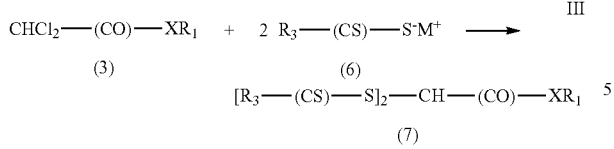

In this reaction scheme, dichloroacetyl chloride (compound (1)) is reacted (Reaction I) with a compound of formula $R_1$—XH (compound (2)), which is an alcohol ($R_1$—OH) or an amine ($R_1$—$NR_2H$). Reaction I often is conducted in the presence of a base such as, for example, trimethylamine and a catalyst such as, for example, pyridine or dimethylaminopyridine. Any organic solvent that is present is usually an aprotic solvent such as methylene chloride or tetrahydrofuran. The product of Reaction I is compound (3) of formula $CHCl_2$—(CO)—$XR_1$. Compound (3) is reacted (Reaction III) with compound (6), which can be formed by the reaction (Reaction II) of a compound of formula $R_3^-M^+$ (compound (4)) with carbon disulfide (5). Compound (4) is a salt of an alkoxide or of an amine where $M^+$ is usually an alkali metal ion, a tetralkyl ammonium ion, a trialkyl ammonium ion, or a dialkyl ammonium ion. The reaction (Reaction III) of compound (3) with compound (6) is typically conducted at temperatures between about 0° C. and about 80° C. in the presence of an organic solvent such as acetone, acetonitrile, or an alcohol.

In some examples of Reaction Scheme A, commercially available compounds of formula $CHCl_2$—(CO)—$XR_1$, which is compound (3), are reacted with commercially available compounds of formula $R_3$—(CS)—$S^-M^+$, which is compound (6). Examples of compound (3) include, but are not limited to, methyl dichloroacetate, ethyl dichloroacetate, and butyl dichloroacetate. Examples of compound (6) include, but are not limited to, sodium diethyldithiocarbamate trihydrate and various xanthate salts such as potassium ethyl xanthate, sodium ethyl xanthate, potassium isopropyl xanthate, sodium isopropyl xanthate, and potassium amyl xanthate.

In some embodiments of the photoinitiator of Formula (V) (i.e., Compound (7) in Reaction Scheme A), X is an oxy group and the photoinitiator is of Formula (V-1).

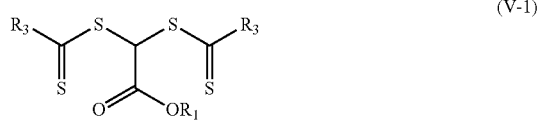

In other embodiments, X is a —$NR_2$— group and the photoinitiator is of Formula (V-2).

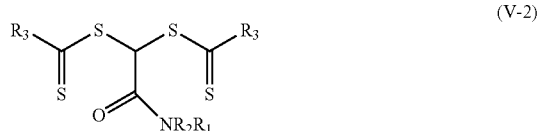

The group $R_3$ in some embodiments of the photoinitiators of Formula (V) is of formula —$N(R_4)_2$ where $R_4$ is the same as defined above for Formula (I). These photoinitiators are of Formula (V-3) and are bis-dithiocarbamate compounds having a single carbon atom between the two dithiocarbamate groups.

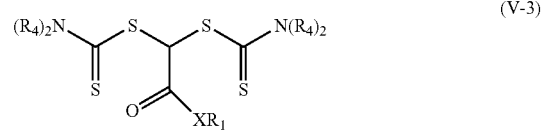

Specific examples are of Formula (V-4) and (V-5) where the value of X is either oxy and —$NR_2$— respectively.

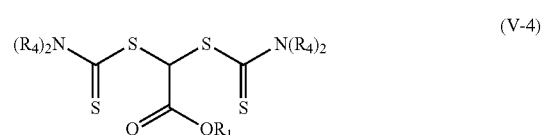

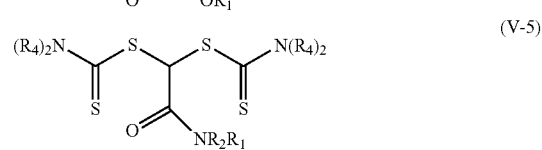

In some specific examples of compounds of Formula (V-4), each $R_4$ is alkyl, and $R_1$ is an alkyl or fluorinated alkyl. In some more specific examples, each $R_4$ is alkyl and $R_1$ is an alkyl. Specific examples include, but are not limited to, methyl 2,2-bis(diethylcarbamothioylsulfanyl)acetate, 2-ethylhexyl 2,2-bis(diethylcarbamothioylsulfanyl)acetate, octyl 2,2-bis(diethylcarbamothioylsulfanyl)acetate, methyl 2,2-bis(dimethylcarbamothioylsulfanypacetate, and methyl 2,2-bis(pyrrolidine-l-carbothioylsulfanyl)acetate.

In some specific examples of compounds of Formula (V-5), each $R_4$ is an alkyl, $R_1$ is an alkyl or fluorinated alkyl, and $R_2$ is hydrogen, alkyl, or fluorinated alkyl. In some more specific examples, each $R_4$ is alkyl and $R_2$ is hydrogen or alkyl. A specific example includes, but is not limited to, 2,2-bis(dimethylcarbamothioylsulfanyl)-N,N-dimethylacetamide.

The groups $R_3$ in some embodiments of the photoinitiators of Formulas (V) are alkoxy or fluorinated alkoxy groups of formula —$OR_5$. That is, the photoinitiators are of Formula (V-6) where $R_5$ is an alkyl or fluorinated alkyl. These photoinitiators are bis-dithiocarbonate compounds having a single carbon atom between the two dithiocarbonate groups.

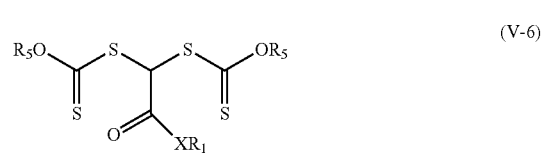

Specific examples are of Formula (V-7) and (V-8) where the value of X is either oxy and —$NR_2$— respectively.

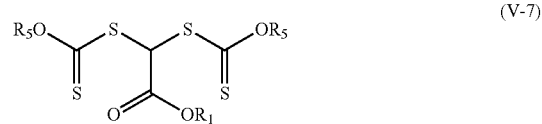

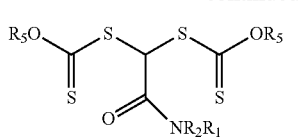

(V-8)

In some specific examples of compounds of Formula (V-7), group —$OR_5$ is an alkoxy and $R_1$ is an alkyl, or fluorinated alkyl. Specific examples of compounds of Formula (V-3) include, but are not limited to, methyl 2,2-bis(isopropoxycarbothioylsulfanypacetate, ethyl 2,2-bis(isopropoxycarbothioylsulfanyl)acetate, tert-butyl 2,2-bis(isopropoxycarbothioylsulfanyl)acetate, 2-ethylhexyl 2,2-bis(isopropoxycarbothioylsulfanyl)acetate, and 2,2,3,3,4,4,4-heptafluorobutyl 2,2-bis(isopropoxycarbothioylsulfanyl)acetate.

In some specific examples of compounds of Formula (V-8), group —$OR_5$ is alkoxy, $R_1$ is an alkyl or fluorinated alkyl, and $R_2$ is hydrogen, alkyl, or fluorinated alkyl. In some more specific embodiments, group —$OR_5$ is alkoxy, $R_1$ is alkyl, and $R_2$ is hydrogen, or alkyl. Specific examples of compounds of Formula (V-8) include, but are not limited to, N,N-dibutyl-2,2-bis(isopropoxycarbothioylsulfanyl)acetamide.

Some compounds of Formula (V) are of Formula (V-9).

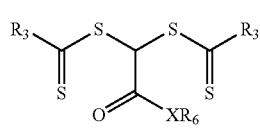

(V-9)

In Formula (V-9), group $R_6$ is a fluorinated alkyl. Groups X and $R_3$ as the same as described above for compounds of Formulas (V) and (I).

Group $R_6$ in Formula (V-9) is a fluorinated alkyl that typically contains 1 to 20 carbon atoms. For example, the fluorinated alkyl can have at least 1 carbon atom, at least 2 carbon atoms, at least 3 carbon atoms, or at least 4 carbon atoms and can have up to 20 carbon atoms, up to 18 carbon atoms, up to 16 carbon atoms, up to 12 carbon atoms, or up to 10 carbon atoms. Some example alkyl and fluorinated alkyl groups have 1 to 20 carbon atoms, 1 to 10 carbon atoms, 2 to 10 carbon atoms, 1 to 6 carbon atoms, 2 to 6 carbon atoms, or 1 to 4 carbon atoms. The fluorinated alkyl groups can have 1 to all of the hydrogen atoms replaced with fluorine atoms. In some example fluorinated alkyl groups, all of the hydrogen atoms are replaced with fluorine or all of the hydrogen atoms except those on the carbon atom immediately adjacent to the X group are replaced with fluorine.

In some specific compounds of Formula (V-9), $R_6$ is a fluorinated alkyl, X is oxy or a group of formula —$NR_2$— where $R_2$ is hydrogen, alkyl, or fluorinated alkyl. $R_3$ is an alkoxy, fluorinated alkoxy, or a group of formula —$N(R_4)_2$ where $R_4$ is alkyl or fluorinated alkyl. In some even more specific compounds of Formula (V-9), $R_6$ is a fluorinated alkyl, X is oxy, and $R_3$ is an alkoxy. A specific example includes, but is not limited to, 2,2,3,3,4,4,4-heptafluorobutyl 2,2-bis(isopropoxycarbothioylsulfanyl)acetate.

The photoinitiator of Formula (V) (including those of Formula (V-1) to (V-9)) is mixed with a monomer composition to form a reaction mixture that is used to form the polymeric materials of Formula (I) (more specifically, the polymeric material is of Formula (II)). While not wishing to be bound by theory, it is believed that polymerization occurs as shown in Reaction Scheme B.

Reaction Scheme B

IV

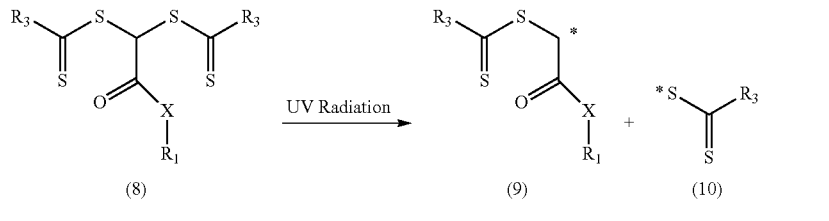

V

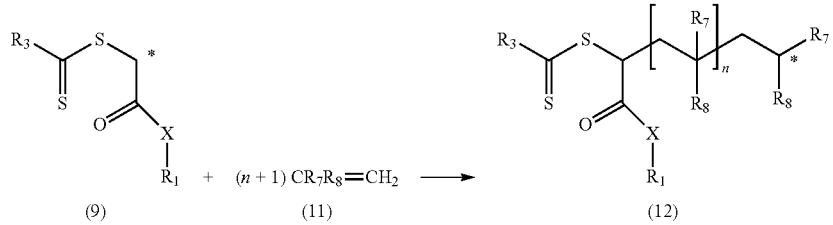

VI

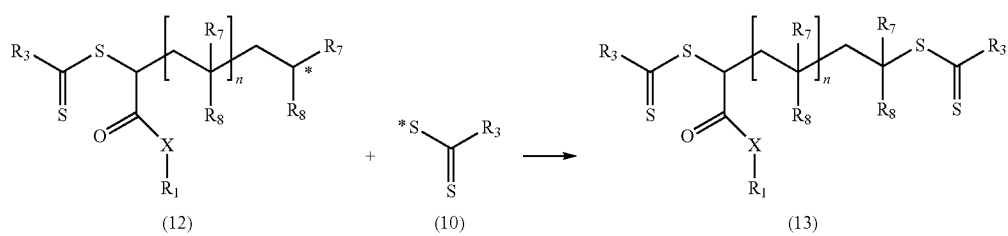

VII
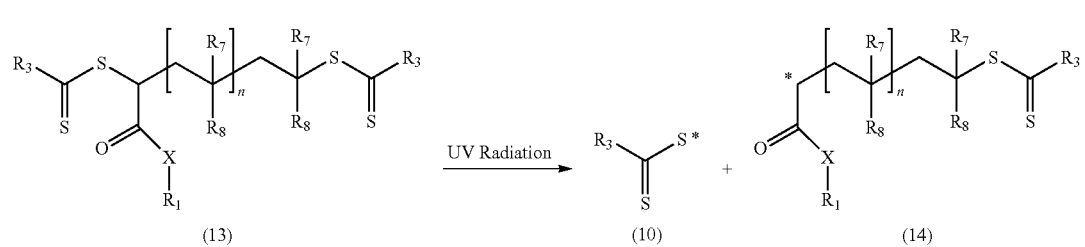
VIII
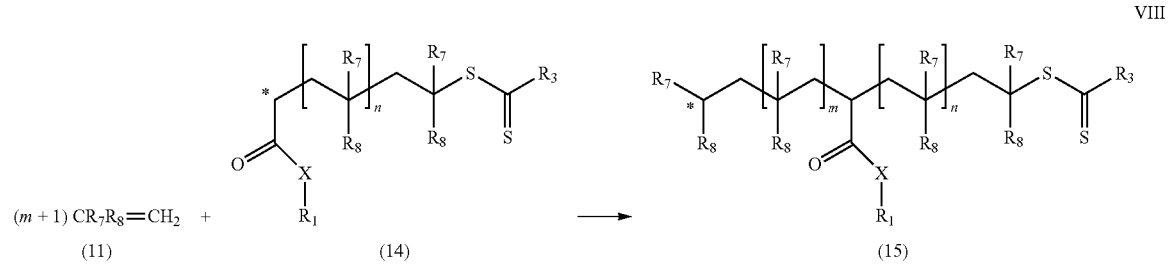
IX
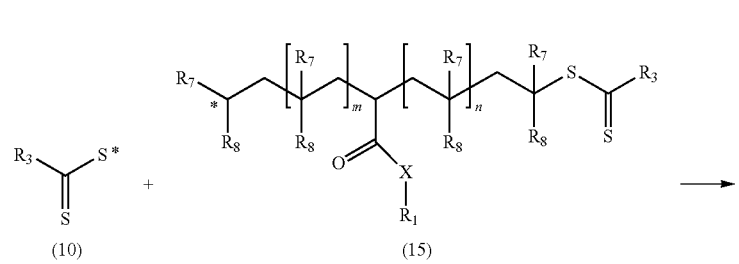
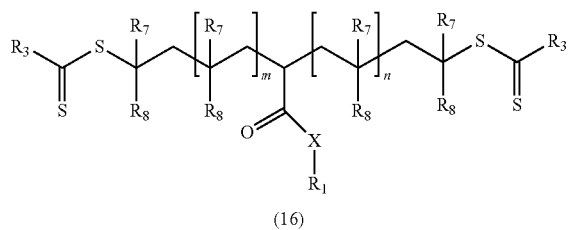
X
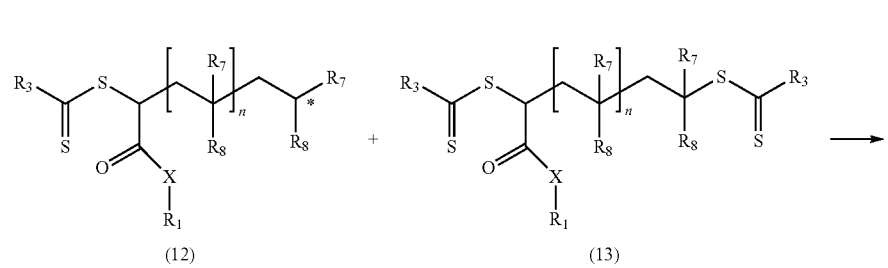
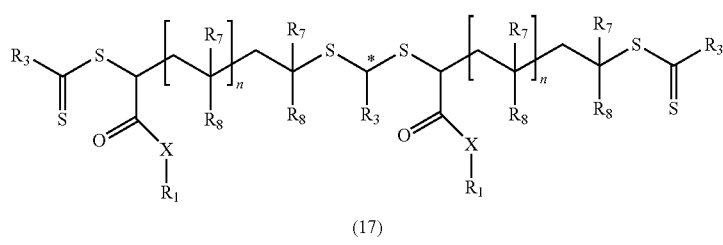

-continued

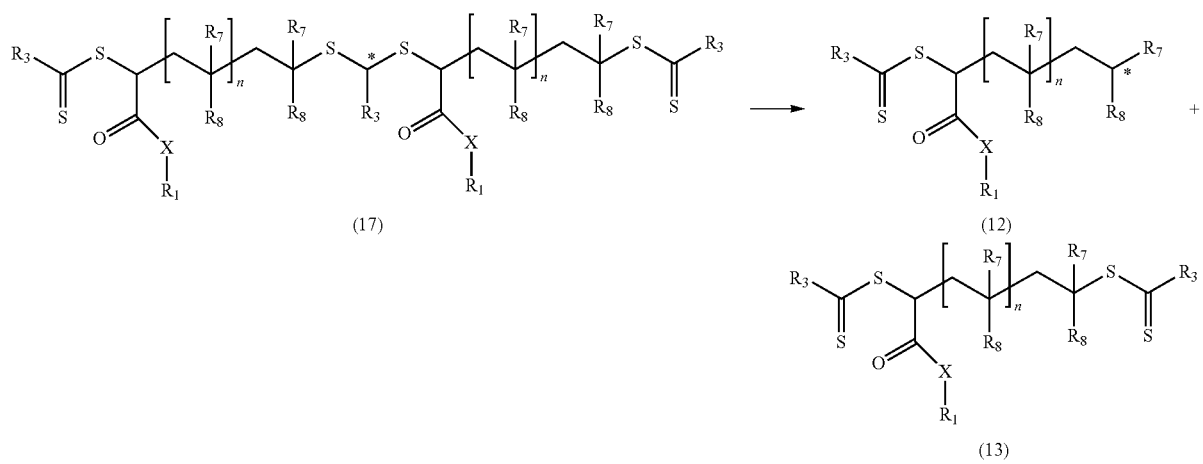

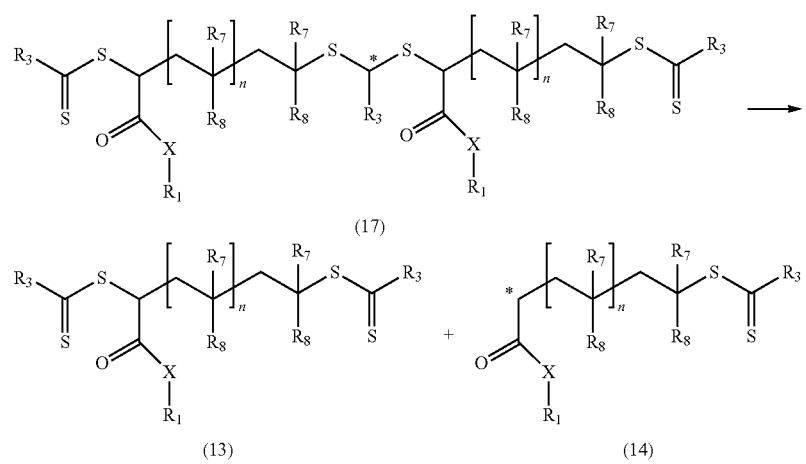

In Reaction Scheme B, the photoinitator of Formula (V), which is shown as compound (8), undergoes photolysis of one of the C—S bonds when exposed to actinic radiation (e.g., ultraviolet radiation) (Reaction IV). Two different radicals, the radical (9) and the radical (10), are formed in Reaction IV. In Reaction V, radical (9) reacts with ethylenically unsaturated monomers (compound (11)). The monomers polymerize and radical (12) is formed. The radical (12) can combine with a radical (10) and the polymerization reaction is terminated. The resulting polymeric material of Reaction VI is compound (13). Compound (13) is a polymeric material of Formula (I) where the variable z is equal to 0 and the variable y is equal to 1. Compound (13) can undergo photolysis at one of the C—S bonds in the presence of actinic radiation (e.g., ultraviolet radiation). Photolysis can result in the generation of radical (10) and radical (14) as shown in Reaction VII. In Reaction VIII, radical (14) reacts with ethylenically unsaturated monomers (compound 11). The monomers polymerize and radical (15) is formed. The radical (15) can combine with radical (10) and the polymerization reaction is terminated. The resulting polymeric material formed in Reaction IX is compound (16). Compound (16) is a polymeric material of Formula (I) where the variables z and y are both equal to 1. While exposure to actinic radiation (e.g., ultraviolet radiation) continues, photolysis of compound (16) can occur and additional monomeric units can be added. When exposure to actinic radiation (e.g., ultraviolet radiation) is terminated, no further photolysis of compound (16) can occur and no additional monomeric units can be added.

Additionally, the dithiocarbamate or dithiocarbonate chain end may be directly transferred between polymeric chains in an addition-fragmentation process. In Reaction (X), for example, radical (12) combines with another molecule of compound (13) to generate radical (17). In Reaction XI, radical (17) undergoes homolysis of a carbon-sulfur bond to regenerate radical (12) and compound (13). In Reaction (XII), radical (17) undergoes homolysis on the opposite side of the dithiocarbamate or dithiocarbonate group to generate compound (13) and radical (14), a net transfer of the dithiocarbamate or dithiocarbonate group.

In Reaction Scheme B, compound (11) is a monomer having a single ethylenically unsaturated group. If the ethylenically unsaturated group is a (meth)acryloyl group, $R_7$ is hydrogen or methyl and $R_8$ includes a group —(CO)—X—$R_9$ where X is oxy or —$NR_2$— and where $R_9$ is the remainder of the (meth)acryloyl-containing monomer (i.e., $R_9$ is the portion of the monomer that is not a (meth)acryloyl group). That is, the monomer is of formula $H_2C=CR^b$—(CO)—X—$R_9$. Group $R^b$ is hydrogen or methyl and group $R_9$ is the remainder, for example, of any monomer described herein having a (meth)acryloyl group.

Polymeric materials having one or more polymeric blocks of Formula (I) can be formed by mixing a photoinitiator of Formula (V) with a first monomer composition and exposing the resulting first reaction mixture to actinic radiation (e.g., ultraviolet light). The actinic radiation exposure causes the photolysis of the photoinitiator and permits controlled radical polymerization of the first monomer composition to form a first polymeric block $P_1$ that includes the carbon atom in the photoinitiator having a pendant —(CO)—X—$R_1$ group. When exposure to actinic radiation is terminated, the first polymerization reaction ceases. The product of the first polymerization is a polymeric material of Formula (I-1). In many embodiments, the polymeric material of Formula (I-1) is of Formula (II). The length of the polymeric chains $P_1$ on either size of the pendant —(CO)—X—$R_1$ group in Formula (II) can be the same or different.

A second monomer composition can be added to the product of the first reaction mixture to form a second reaction mixture. That is, the second reaction mixture contains a polymeric material of Formula (I-1) and a second monomer composition. The second monomer composition is typically different than the first monomer composition. Upon exposure of the second reaction mixture to actinic radiation, photolysis occurs again releasing the radical of formula $R_3$—(CS)—S*. The second monomer composition can polymerize to form a second polymeric block at one or both ends of the polymeric material of Formula (I-1). In many embodiments, a second polymeric block $P_2$ is attached to both end of the polymeric block $P_1$ in the polymeric material of Formula (II). When exposure to actinic radiation is terminated, the second polymerization reaction ceases. The length of the two polymeric chains $P_2$ can be the same or different. The product of the second polymerization is the polymeric material of Formula (I-2), which is often of Formula (III).

This process can be repeated as many times as desired to add more polymeric blocks. If repeated an additional time, the third reaction mixture contains a third monomer composition and the polymeric material of Formula (I-2). The polymeric material Formula (I-3) is formed. In many embodiments, the polymeric material of Formula (I-3) is of Formula (IV). The length of the resulting two polymeric chains $P_3$ can be the same or different.

The photoinitiators of Formula (V) having a single carbon atom between the two dithiocarbamate or dithiocarbonate groups can be used advantageously to prepare various polymeric materials. Compared with other known photoinitiators having more than one carbon atom between the two dithiocarbamate or dithiocarbonate groups (e.g., p-xylenebis (N,N-diethyldithiocarbamate) (XDC) or 2-(2-ethoxycarbothioylsulfanylacetyl)oxyethyl 2-ethoxycarbothioylsulfanylacetate), the photoinitiators of Formula (V) tend to build molecular weight in a more controlled manner as a function of conversion. This can result in better control over the viscosity of the reaction mixture and can result in better architectural control over the polymeric material that is formed.

Stated differently, under certain circumstances more polymeric chains start to grow upon exposure to actinic radiation (e.g., ultraviolet light) when the reaction mixture contains a photoinitiator of Formula (V) rather than a known photoinitiator such as, for example, p-xylenebis(N,N-diethyldithiocarbamate) (XDC) and 2-(2-ethoxycarbothioylsulfanylacetyl)oxyethyl 2-ethoxycarbothioylsulfanylacetate. Reaction mixtures that include the photoinitiators of Formula (V) tend to have a fairly large number of polymeric chains growing in the early stages of polymerization and the molecular weights of these polymeric chains tends to be relatively small. Nuclear Magnetic Resonance (NMR) studies have shown that the photoinitiators of Formula (V) tend to be quickly consumed and tend to initiate polymeric chain growth early in the polymerization reaction. The viscosity of the reaction mixtures does not rapidly increase at the beginning of the polymerization process. Most of the polymeric chains are formed in the early stages of polymerization and continue to increase in molecular weight over time. The molecular weight of the resulting polymeric material can be predicted and controlled.

In contrast, reaction mixtures that include either of the known photoinitiators (p-xylenebis(N,N-diethyldithiocarbamate) (XDC) or 2-(2-ethoxycarbothioylsulfanylacetyl) oxyethyl 2-ethoxycarbothioylsulfanylacetate) tend to have relatively few polymeric chains growing in the early stages of polymerization and the molecular weights of these polymeric chains tend to be relatively large, particularly under conditions of low light intensity. This behavior can be explained by NMR studies, which show that these photoinitiators are not efficiently cleaved and tend to remain unreacted for extended periods of time. This can lead to rapid and significant viscosity increases for the reaction mixtures at the beginning of the polymerization process. Over time, as more polymeric chains start to grow, the average molecular weight decreases. The molecular weight of the resulting polymeric material can be difficult to predict and/or control. Furthermore, the rate of secondary xanthate cleavage to produce polymeric chains growing in both directions is greatly retarded compared to photoinitiators of Formula (V). This further prohibits precise control over polymeric architecture such as various block copolymers.

The monomer compositions that are used to form the various polymeric materials of Formula (I) include at least one monomer having a single ethylenically unsaturated group. In many embodiments, the monomers have a single (meth)acryloyl group. Examples of monomers having a single ethylenically unsaturated group include, but are not limited to, alkyl (meth)acrylates, fluorinated alkyl (meth) acrylates, aryl (meth)acrylates, aralkyl (meth)acrylates, substituted aryl (meth)acrylates, (meth)acrylic acid, (meth)acrylamide, N-alkyl (meth)acrylamide, N,N-dialkyl (meth)acrylamide, N-alkylaminoalkyl (meth)acrylate, N,N-dialkylaminoalky (meth)acrylate, N-alkylaminoalkyl (meth) acrylamide, N,N-dialkylaminoalky (meth)acrylamide, hydroxy-substituted alkyl (meth)acrylates, hydroxy-substituted alkyl (meth)acrylamides, alkoxylated alkyl (meth) acrylate, acid-substituted alkyl (meth)acrylates, acid-substituted alkyl (meth)acrylamides, glycidyl-containing (meth) acrylates, aminosulfonyl-containing (meth)acrylates, and mixtures thereof In many embodiments, the monomer compositions do not include any monomers having more than one ethylenically unsaturated group.

Exemplary alkyl (meth)acrylates include, but are not limited to, methyl (meth)acrylate, ethyl (meth)acrylate, n-propyl (meth)acrylate, isopropyl (meth)acrylate, n-butyl (meth)acrylate, isobutyl (meth)acrylate, n-pentyl (meth) acrylate, 2-methylbutyl (meth)acrylate, n-hexyl (meth)acrylate, cyclohexyl (meth)acrylate, 4-methyl-2-pentyl (meth) acrylate, 2-ethylhexyl (meth)acrylate, 2-methylhexyl (meth) acrylate, n-octyl (meth)acrylate, isooctyl (meth)acrylate, 2-octyl (meth)acrylate, isononyl (meth)acrylate, isoamyl (meth)acrylate, isobornyl (meth)acrylate, n-decyl (meth) acrylate, isodecyl (meth)acrylate, 2-propylheptyl (meth) acrylate, isotridecyl (meth)acrylate, isostearyl (meth)acrylate, octadecyl (meth)acrylate, 2-octyldecyl (meth)acrylate, dodecyl (meth)acrylate, lauryl (meth)acrylate, and heptadecanyl (meth)acrylate. Some exemplary branched alkyl (meth)acrylates are (meth)acrylic acid esters of Guerbet alcohols having 12 to 32 carbon atoms as described in PCT Patent Application Publication WO 2011/119363 (Clapper et al.).

Exemplary fluorinated (meth)acrylates include, but are not limited to, trifluoromethyl (meth)acrylate, 2,2,2-trifluoroethyl (meth)acrylate, 2,2,3,3,3-pentafluoropropyl (meth)acrylate, 2,2,3,3,4,4,4-heptafluorobutyl (meth)acrylate, 2,2,3,3,4,4,5,5,5-nonafluoropentyl (meth)acrylate, 2,2,3,3,4,4,5,5,6,6,6-undecafluorohexyl (meth)acrylate, 2,2,3,3,4,4,5,5,6,6,7,7,7-tridecafluoroheptyl (meth)acrylate, 2,2,3,3,4,4,5,5,6,6,7,7,8,8,8-pentadecafluoro octyl (meth)acrylate, 3,3,4,4,5,5,6,6,7,7,8,8,8-tridecafluoro octyl (meth)acrylate, 2,2,3,3,4,4,5,5,6,6,7,7,8,8,9,9,10,10,10-nonadecafluorodecyl (meth)acrylate, 3,3,4,4,5,5,6,6,7,7,8,8,9,9,10,10,10-heptadecafluorodecyl (meth)acrylate, 2-trifluoromethyl-3,3,3-trifluoropropyl (meth)acrylate, 3-trifluoromethyl-4,4,4-trifluorobutyl (meth)acrylate, 1-methyl-2,2,3,3,3-pentafluoropropyl (meth)acrylate, 1-methyl-2,2,3,3,4,4,4-heptafluorobutyl (meth)acrylate, 2,2,3,3,4,4-hexafluorocyclobutyl (meth)acrylate, 2,2,3,3,4,4,5,5-octafluorocyclopentyl (meth)acrylate, 2,2,3,3,4,4,5,5,6,6-decafluorocyclohexyl (meth)acrylate, 2,2,3,3,4,4,5,5,6,6,7,7-dodecafluorocycloheptyl (meth)acrylate, 2,2,3,3,4,4,5,5,6,6,7,7,8,8-tetradecafluorocyclooctyl (meth)acrylate, 2-trifluoromethylcyclobutyl (meth)acrylate, 3-trifluoromethyl cyclobutyl (meth)acrylate, 2-trifluoromethyl cyclopentyl (meth)acrylate, 3-trifluoromethyl cyclopentyl (meth)acrylate, 2-trifluoromethyl cyclohexyl (meth)acrylate, 3-trifluoromethyl cyclohexyl (meth)acrylate, 4-trifluoromethyl cyclohexyl (meth)acrylate, 2-trifluoromethyl cycloheptyl (meth)acrylate, 3-trifluoromethyl cycloheptyl (meth)acrylate, and 4-trifluoromethylcycloheptyl (meth)acrylate. Other fluorinated monomers have a perfluoroether group such as poly(hexafluoropropylene oxide) group of formula Rf-Q-O—(CO)—$CR^b$=$CH_2$ where $R^b$ is hydrogen or methyl, Q is a divalent linking group, and Rf is $C_3F_7O(CF(CF_3)CF_2O)_aCF(CF_3)$— where a is in a range of 1 to 50, in a range of 1 to 30, in a range of 1 to 10, or in a range of 1 to 5. Examples include, but are not limited to, $C_3F_7O(CF(CF_3)CF_2O)_aCF(CF_3)CH_2OC(O)CH$=$CH_2$, $C_3F_7O(CF(CF_3)CF_2O)_aCF(CF_3)CH_2OC(O)C(CH_3)$=$CH_2$, $C_3F_7O(CF(CF_3)CF_2O)_aCF(CF_3)CH_2OCH_2C(O)CH$=$CH_2$, $C_3F_7O(CF(CF_3)CF_2O)_aCF(CF_3)CH_2OCH_2CH_2OC(O)C(CH_3)$=$CH_2$, $C_3F_7O(CF(CF_3)CF_2O)_aCF(CF_3)C(O)NHCH_2CH_2OC(O)CH$=$CH_2$, and $C_3F_7O(CF(CF_3)CF_2O)_aCF(CF_3)C(O)NHCH_2CH_2OC(O)C(CH_3)$=$CH_2$, wherein a may be from 1 to 150.

Example aryl (meth)acrylates, aralkyl (meth)acrylates, and substituted aryl (meth)acrylates include, but are not limited to, phenyl (meth)acrylate, 2-biphenylhexyl (meth)acrylate, and benzyl (meth)acrylate.

Example N-alkyl (meth)acrylamides and N,N-dialkyl (meth)acrylamides include, but are not limited to, N-methyl (meth)acrylamide, N-ethyl (meth)acrylamide, N-isopropyl (meth)acrylamide, N-tert-octyl (meth)acrylamide, N-octyl (meth)acrylamide, N,N-dimethyl (meth)acrylamide, N,N-diethyl (meth)acrylamide, N,N-dipropyl (meth)acrylamide, and N,N-dibutyl (meth)acrylamide.

Example N-alkylaminoalkyl (meth)acrylates and N,N-dialkylaminoalkyl (meth)acrylates include, but are not limited to, N-methyl aminoethyl (meth)acrylate, N,N-dimethyl aminoethyl (meth)acrylate, N-methylaminopropyl (meth)acrylate, N,N-dimethylaminopropyl (meth)acrylate, N-diethylaminoethyl (meth)acrylate, N,N-diethylaminoethyl (meth)acrylate, N-ethylaminopropyl (meth)acrylate, N,N-diethylaminopropyl (meth)acrylate, and N-morpholino (meth)acrylate.

Example N-alkylaminoalkyl (meth)acrylamides and N,N-dialkylaminoalkyl (meth)acrylamide include, but are not limited to, N-methylaminoethyl (meth)acrylamide, N,N-dimethylaminoethyl (meth)acrylamide, N-methylaminopropyl (meth)acrylamide, N,N-dimethylaminopropyl (meth)acrylamide, N-ethylaminoethyl (meth)acrylamide, N,N-diethylaminoethyl (meth)acrylamide, N-ethylaminopropyl (meth)acrylamide, and N,N-diethylaminopropyl (meth)acrylamide.

Example hydroxy-substituted alkyl (meth)acrylates and hydroxy-substituted alkyl (meth)acrylamides include, but are not limited to, 2-hydroxyethyl (meth)acrylate, 2-hydroxypropyl (meth)acrylate, 3-hydroxypropyl (meth)acrylate, 4-hydroxybutyl (meth)acrylate, 2-hydroxyethyl (meth)acrylamide, and 3-hydroxypropyl (meth)acrylamide.

Example alkoxylated alkyl (meth)acrylates include, but are not limited to, ethoxyethoxyethyl (meth)acrylate, 2-methoxyethyl (meth)acrylate, 2-ethoxyethyl (meth)acrylate, and poly(alkylene oxide) (meth)acrylates such as poly(ethylene oxide) (meth)acrylates and poly(propylene oxide) (meth)acrylates. The poly(alkylene oxide) acrylates are often referred to as poly(alkylene glycol) (meth)acrylates. These monomers can have any suitable end group such as a hydroxyl group or an alkoxy group. For example, when the end group is a methoxy group, the monomer can be referred to as methoxy poly(ethylene glycol) (meth)acrylate.

Example acid-substituted alkyl (meth)acrylates, and acid-substituted alkyl (meth)acrylamides include, but are not limited to, β-carboxyethyl acrylate, 2-(meth)acrylamidoethanesulfonic acid, and 2-(meth)acrylamido-2-methylpropane sulfonic acid.

Example glycidyl-containing (meth)acrylates include, but are not limited to, glycidyl (meth)acrylate, 4-hydroxybutyl (meth)acrylate glycidyl ether, and 3,4-epoxycyclohexylmethyl (meth)acrylate.

Example aminosulfonyl-containing (meth)acrylates include, but are not limited to, and N-methyl-perfluorobutyl) sulfonylaminoethyl (meth)acrylate.

In other embodiments, the reaction mixture includes a monomer composition containing a monomer having a single ethylenically unsaturated group that is not a (meth)acryloyl group. Suitable such monomers include, but are not limited to, N-vinylpyrrolidone, N-vinylcaprolactam, vinyl acetate, vinyl methyl ether, vinyl-2-ethylhexanoate, vinyl neodecanoate, styrene, isoprene, butadiene, vinyl dimethylazlactone (VDM), isopropenyl dimethylazlactone (IDM), and vinyl oxazole, and the like.

The reaction mixture usually does not include a monomer with more than one ethylenically unsaturated group (i.e., the reaction mixture is free of monomers having two or more ethylenically unsaturated groups). That is, the polymeric materials formed are linear polymers and are not cross-linked. If a monomer having more than one ethylenically unsaturated group is added, the amount added is typically sufficiently low so that the polymeric material can flow for coating onto a substrate. This amount of monomer having more than one ethylenically unsaturated group tends to result in branching rather than crosslinking.

The polymeric material that is formed can have one or more polymeric blocks and each block can be a homopolymer or a random copolymer. Each polymeric block is formed from a reaction mixture that includes a monomer composition and a photoinitiator of Formula (V). Some example monomer compositions include 50 to 100 weight percent of the first monomer with a single (meth)acryloyl group and 0 to 50 weight percent of the second monomer with a single ethylenically unsaturated group that is not a (meth)acryloyl group. There can be one or more first monomers and one or more second monomers. For example, the monomer composition used to form any of the blocks in the polymeric material of Formulas (I) can contain at least 55 weight percent, at least 60 weight percent, at least 70 weight percent, at least 75 weight percent, at least 80 weight percent, at least 85 weight percent, at least 90 weight percent, at least 95 weight percent, at least 98 weight percent, at least 99 weight percent, or 100 weight percent of the first monomer. Any remaining monomer typically is a second monomer having the ethylenically unsaturated group that is not a (meth)acryloyl group. For example, if the monomer composition contains at least 80 weight percent of the first monomer, the monomer composition contains 80 to 100 weight percent of the first monomer and 0 to 20 weight percent of the second monomer. The weight percent values are based on the total weight of monomers in the monomer composition for any block.

The amount of the photoinitiator impacts the weight average molecular weight of the resulting polymeric block. That is, the weight average molecular weight can be controlled based on the amount of photoinitiator added to the reaction mixture. The amount of photoinitiator is typically in a range of 0.001 to 15 weight percent based on the weight of the monomers in the reaction mixture. That is, the photoinitiator is at least 0.001 weight percent, at least 0.005 weight percent, at least 0.01 weight percent, at least 0.02 weight percent, at least 0.03 weight percent, or at least 0.5 weight percent and can be up to 15 weight percent, up to 12 weight percent, up to 10 weight percent, up to 8 weight percent, up to 6 weight percent, up to 5 weight percent, up to 3 weight percent, up to 2 weight percent, or up to 1 weight percent. This amount of photoinitiator often results in the formation of polymeric blocks having a weight average molecular weight in a range of 1,000 to 3 million Daltons or in the range of 1,000 to 1 million Daltons.

The reaction mixtures typically do not include a transfer agent. Transfer agents are not needed to control the molecular weight of the resulting polymeric material. Rather, the molecular weight can be varied and controlled through selection of the desired amount of the photoinitiator of Formula (V) and of the desired reaction temperature.

Further, the reaction mixtures typically do not include any other initiator other than the photoinitiator of Formula (V). That is, there is no thermal initiator such as an azo initiator, peroxide initiator, redox initiator, or persulfate initiator. No other photoinitiator other than those of Formula (V) are included in the reaction mixtures.

To prepare a polymeric material having a single polymeric block of Formula (II) (with both y and z in Formula (I) being equal to 1), a first monomer composition is mixed with a photoinitiator of Formula (V) to form a first reaction mixture. The first reaction mixture can be neat (i.e., no solvent is present) or can be mixed with a solvent that dissolves both the first monomer composition and the photoinitiator of Formula (V). The solvent can be added, for example, to lower the viscosity of the first reaction mixture. Any solvent that is added is usually selected so that the growing polymeric material is also soluble. In some embodiments, the percent solids in the first reaction mixture is at least 10 weight percent, at least 20 weight percent, at least 30 weight percent, or at least 40 weight percent and up to 100 weight percent, up to 80 weight percent, or up to 60 weight percent. The amount of solvent added is often selected based on the desired viscosity, particularly the viscosity of the final polymerized material. The desired viscosity is usually sufficiently low so that the final polymeric material can be readily removed from the reactor and/or applied to a substrate.

If a solvent is added, the solvent is often an ester (e.g., ethyl acetate, butyl acetate, and ethylene glycol monomethyl ether acetate), an ether (e.g., dimethyl ether, diethyl ether, ethyl propyl ether, dipropyl ether, methyl t-butyl ether, di-t-butyl ether, dimethoxy ethane, 2-methoxyethanol, diethylene glycol dimethyl ether, dioxane, and tetrahydrofuran), acetonitrile, methylene chloride, an aromatic hydrocarbon (e.g., benzene, xylene, and toluene), or a ketone (e.g., acetone, methyl ethyl ketone, cyclopentanone, and cyclohexanone). Mixtures of solvents can be used. Further, one or more solvents can be combined with water, if miscible. Polymerization of the first monomer composition can start at room temperature (e.g., about 20° C. to 25° C.) but can also start, if desired at higher or lower temperatures.

The first reaction mixture is exposed to actinic radiation (e.g., ultraviolet radiation) to activate the photoinitiator of Formula (V) and commence controlled radical polymerization of the first monomer composition. The resulting block $P_1$ can be a homopolymer or a random copolymer having a pendant group —(CO)—$XR_1$ in the polymeric material of Formula (II). The group —(CO)—$XR_1$ is attached to the single carbon in the photoinitiator of Formula (V) that was used to prepare the polymeric material. The polymerization reaction is usually allowed to proceed until at least 80 weight percent, at least 85 weight percent, at least 90 weight percent, at least 95 weight percent, at least 98 weight percent, or at least 99 weight percent of the monomers in the first monomer composition have undergone controlled radical polymerization.

Group $R_1$ and the first monomer composition can be selected so that the presence of the pendant —(CO)—$XR_1$ group is not discernible in the resulting polymeric material of Formula (II). For example, if the first monomer composition includes a monomer of formula $CH_2$=$CR^b$—(CO)—$XR_1$, the presence of the —(CO)—$OR_1$ group from the photoinitiator is not discernible. The groups $R^b$, X, and $R_1$ are the same as defined above.

A polymeric material having three polymeric blocks of Formula (III)

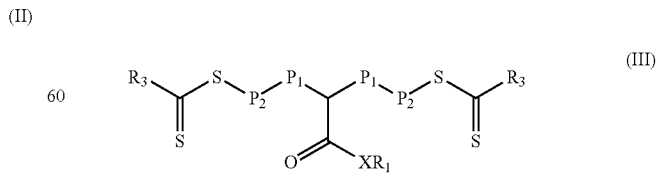

can be formed from the polymeric material of Formula (II). Formula (III) is equal to Formula (I) where both z and y are equal to 2. After 80 weight percent or more (such as at least 90 weight percent) of the first monomer composition has undergone controlled radical polymerization, the polymerization reaction is stopped by terminating exposure to actinic radiation (e.g., ultraviolet radiation). A second reaction mixture is formed by adding a second monomer composition to the reaction product of the first reaction mixture. The second reaction mixture includes a first polymeric material of Formula (II) plus a second monomer composition having at least one monomer with a single ethylenically unsaturated group. It is typically not necessary to add further photoinitiator of Formula (V) to the second reaction mixture.

Any optional solvent that is included in the second reaction mixture is usually selected so that it solubilizes the first polymeric material of Formula (II), the photoinitiator of Formula (V), and the second monomer composition. That is, the second reaction mixture is typically a single phase. In some embodiments, the percent solids in the second reaction mixture is selected to have percent solids equal to at least 10 weight percent, at least 20 weight percent, at least 30 weight percent, or at least 40 weight percent and up to 100 weight percent (i.e., no solvent is added), up to 80 weight percent, or up to 60 weight percent. Suitable solvents are the same as those discussed above for the first reaction mixture. The amount of solvent added is selected based on the desired viscosity, particularly the viscosity of the final polymerized material. The desired viscosity is usually sufficiently low so that the final polymeric material can be readily removed from the reactor and/or applied to a substrate.

The second reaction mixture is exposed to actinic radiation (e.g., ultraviolet radiation) to commence controlled radical polymerization of the second monomer composition. Each of the two resulting $P_2$ blocks can be a homopolymer or a random copolymer. The two $P_2$ blocks are separated by a $P_1$ block having a pendant group —(CO)—$XR_1$ in the polymeric material of Formula (III). The polymerization reaction is usually allowed to proceed until at least 80 weight percent, at least 85 weight percent, at least 90 weight percent, at least 95 weight percent, at least 98 weight percent, or at least 99 weight percent of the monomers in the second monomer composition have undergone controlled radical polymerization. Polymerization of the second monomer composition can occur at room temperature (e.g., about 20° C. to 25° C.) but can also occur, if desired at higher or lower temperatures.

The composition of polymeric block $P_2$ is typically different than the composition of polymeric block $P_1$. In some embodiments, the polymeric blocks $P_1$ and $P_2$ have different glass transition temperatures as measured by Differential Scanning calorimetry. In some embodiments, the difference in the glass transition temperature of polymeric blocks $P_1$ and $P_2$ is at least 40° C., at least 50° C., at least 60° C., at least 70° C., at least 80° C., at least 90° C., or at least 100° C. It is preferable, however, that the polymeric material of Formula (II) is soluble in the second reaction mixture containing the second monomer composition used to form the polymeric material of Formula (III).

In some embodiments, it is desirable to have sharp transitions between the first polymeric block $P_1$ and the second polymeric blocks $P_2$. The transition between two polymeric blocks can be controlled by the percent conversion of the first reaction mixture to the first polymeric block. If the percent conversion is relatively low (e.g., less than 90 percent), then the second reaction mixture will include a mixture of the second monomer composition plus remaining unreacted first monomer composition. That is, some of the monomers from the first monomer composition will be in the second polymeric block $P_2$. To minimize the presence of the first monomer composition in the second polymeric block $P_2$, the percent conversion of the first monomer composition should be maximized. A higher percent conversion must be balanced, however, against a longer reaction time.

A polymeric material having five polymeric blocks of Formula (IV)

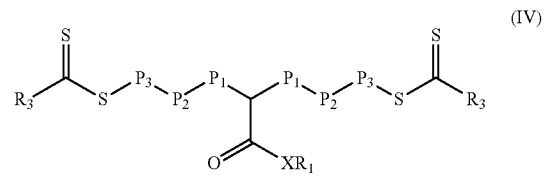

can be formed from the polymeric material of Formula (III). Formula (IV) is equal to Formula (I) where both z and y are equal to 3. After 80 weight percent or more (such as at least 90 weight percent) of the second monomer composition used to form the polymer of Formula (III) has undergone controlled radical polymerization, the polymerization reaction is stopped by terminating exposure to actinic radiation (e.g., ultraviolet radiation). A third reaction mixture is formed by adding a third monomer composition to the reaction product of the second reaction mixture. The third reaction mixture includes a second polymeric material of Formula (III) plus a third monomer composition having at least one monomer with a single ethylenically unsaturated group.

Any optional solvent that is included in the third reaction mixture is usually selected so that it solubilizes the polymeric material of Formula (III), the photoinitator of Formula (V), and the third monomer composition. That is, the third reaction mixture is typically a single phase. In some embodiments, the percent solids in the third reaction mixture is selected to have percent solids equal to at least 10 weight percent, at least 20 weight percent, at least 30 weight percent, or at least 40 weight percent and up to 100 weight percent (i.e., no solvent is added), up to 80 weight percent, or up to 60 weight percent. Suitable solvents are the same as those discussed above for the first reaction mixture. The amount of solvent added is selected based on the desired viscosity, particularly the viscosity of the final polymerized material. The desired viscosity is usually sufficiently low so that the final polymeric material can be readily removed from the reactor and/or applied to a substrate.

The third reaction mixture is exposed to actinic radiation (e.g., ultraviolet radiation) to commence controlled radical polymerization of the third monomer composition. Each of the two resulting $P_3$ blocks can be a homopolymer or a random copolymer. The two $P_3$ blocks are separated by two $P_2$ blocks and a $P_1$ block having a pendant group —(CO)—$XR_1$ in the polymeric material of Formula (IV). The polymerization reaction is usually allowed to proceed until at least 80 weight percent, at least 85 weight percent, at least 90 weight percent, at least 95 weight percent, at least 98 weight percent, or at least 99 weight percent of the monomers in the second monomer composition have undergone controlled radical polymerization. Polymerization of the third monomer composition can occur at room temperature (e.g., about 20° C. to 25° C.) but can also occur, if desired at higher or lower temperatures.

The composition of polymeric block $P_3$ is typically different than the composition of polymeric block $P_2$, the composition of polymeric block $P_2$ is typically different than the composition of polymeric block $P_1$, and the composition of polymeric block $P_3$ can be the same or different than the composition of polymeric block $P_1$. In some embodiments, the polymeric blocks $P_3$ and $P_2$ have different glass transition temperatures and the polymeric blocks $P_2$ and $P_1$ have different glass transition temperatures as measured by Differential Scanning calorimetry. In some embodiments, the difference in the glass transition temperature between the polymeric blocks is at least 40° C., at least 50° C., at least 60° C., at least 70° C., at least 80° C., at least 90° C., or at least 100° C.

Additional polymeric blocks can be added to the polymeric material of Formula (IV) to form polymeric materials of Formula (I) where the number of blocks (y) is greater than 3. Each precursor polymeric material having (y−2) polymeric blocks is added to a monomer composition to form a reaction mixture. The reaction mixture is exposed to actinic radiation to form the polymeric material with two additional polymeric blocks as described above.

Adjacent polymeric blocks typically have different compositions, different glass transition temperatures, and different solubility parameters. Because of these differences, a phase separated morphology may result. This phase separation leads to physical crosslinking within the block copolymer and can, for example, increase the cohesive strength of the polymeric material even in the absence of chemical crosslinks.

The resulting polymeric materials of Formula (I) have dithiocarbamate or dithiocarbonate terminal groups. That is, the terminal group is typically $R_3$—(CS)—S—. If desired, this terminal group can be replaced after the polymeric material has formed using known methods such as those described, for example, in (a) Taton et al., *Handbook of RAFT Polymerization*, Barner-Kowollik, ed., Wiley-VCH: Weinheim, 2008, p. 373, (b) Destarac et al., *Polym. Prepr (Am. Chem. Soc., Div. Polym. Chem.)*, 2008, 49(2), (c) Destarac, *Polymer Preprints*, 2008, 49(2), page 179, and (d) Tsarevsky et al., *In Controlled Radical Polymerization: Mechanisms*, ACS Symposium Series, American Chemical Society, Washington, D.C., 2015, 211-246. Suitable methods include, for example, converting the dithiocarbamate or dithiocarbonate functionality into a thiol end group through reaction with nucleophiles. The polymeric material with the thiol end group can undergo various radical reactions (e.g., radical catalyzed thiol-ene reactions and radical catalyzed thiol-yne reactions), nucleophilic reactions (e.g., thiol-ene Michael addition reactions, thiol-epoxy reactions, thiol-halide reactions, thiol-isocyanate reactions), or sulfur exchange reactions (e.g., thiol-alkanethiosulfonate reactions and thiol-pyridyl disulfide reactions). Other example methods include free-radical reductive cleavage of the dithiocarbamate or dithiocarbonate groups, oxidation with peroxide and ozone, and aminolysis using an amine or ammonia.

If desired, the polymeric materials of Formula (I) can be melt processed. That is, the polymeric materials are usually thermoplastic and can flow upon application of heat (e.g., application of heat below a temperature that would result in the degradation of the polymeric material). The polymeric materials can be heated in an extruder and coated onto a substrate.

Unlike some known methods used to prepare block copolymers, the photoinitiators of Formula (V) can be used to form polymeric blocks with a high acid content. That is, greater than 10 weight percent, greater than 20 weight percent, greater than 30 weight percent, greater than 40 weight percent, greater than 50 weight percent, greater than 60 weight percent, greater than 70 weight percent, greater than 80 weight percent, greater than 90 weight percent, or even 100 weight percent of the monomers in any reaction mixture used to form a polymer block can be an acidic monomer. For example, polymeric blocks can be prepared using (meth)acrylic acid as the only or major component of the monomer composition.

The photoinitiators of Formula (V) undergo photolysis upon exposure to actinic radiation, particularly actinic radiation in the ultraviolet region of the electromagnetic spectrum (e.g., light having wavelengths in a range of 250 to 450 nanometers, in a range of 250 to 405 nanometers, or in a range of 300 to 405 nanometers. Any light source that provides ultraviolet light can be used. In some embodiments, the light source is a light emitting diode having a narrow wavelength distribution around 365 nanometers.

The polymeric material can be used for any desired purpose. In some embodiments, the polymeric material is applied to a substrate and can function as a coating layer or as an adhesive layer depending on the composition of the various polymeric blocks. The polymeric material can be combined with other known components that can be included in adhesive layers and coating layers.

Various embodiments are provided that are polymeric materials, reaction mixtures, methods of making the polymeric materials, or photoinitiators.

Embodiment 1A is a polymeric material of Formula (I).

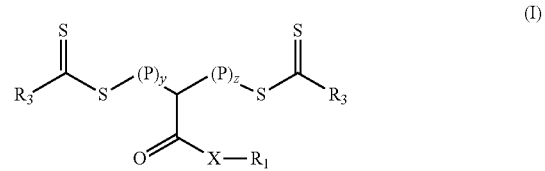

(I)

In Formula (I), group $R_1$ is hydrogen, alkyl, fluorinated alkyl, aryl, aralkyl, or substituted aryl (e.g., an aryl substituted with an alkyl and/or alkoxy). Group X is oxy or —$NR_2$— where group $R_2$ is hydrogen, alkyl, fluorinated alkyl, aryl, aralkyl, or substituted aryl. Group $R_3$ is an alkoxy, fluorinated alkoxy, or —$N(R_4)_2$. Each $R_4$ is an alkyl or fluorinated alkyl, or two adjacent $R_4$ groups are combined together with the nitrogen to which they are both attached to form a first heterocyclic ring having 1 to 3 heteroatoms selected from nitrogen, oxygen, and sulfur, the first heterocyclic ring being saturated or unsaturated and optionally fused to one or more second rings that are carbocyclic or heterocyclic. Each P is a polymeric block that includes a polymerized product of a monomer composition containing at least one monomer having a single ethylenically unsaturated group and y is an integer in a range of 1 to 10 and z is an integer in a range of 0 to y. In Formula (I), $(P)_y$ means that there are y polymer blocks and $(P)_z$ means that there are z polymeric blocks.

Embodiment 2A is the polymeric material of embodiment 1A, wherein the polymeric material is of Formula (I) is of Formula (I-4)

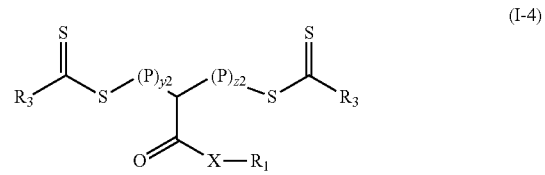

(I-4)

wherein the variable y2 is an integer equal to at least 2 (e.g., in a range of 2 to 10 or in a range of 2 to 5) and the variable z2 is an integer in a range of 0 to y2 (e.g., in a range of 0 to 10, in a range of 2 to 10, or in a range of 2 to 5). In many embodiments, z2 is equal to y2. Groups X, $R_1$, $R_3$, and P are defined as in Formula (I).

Embodiment 3A is the polymeric material of embodiment 1A, wherein the polymeric material is of Formula (I-5).

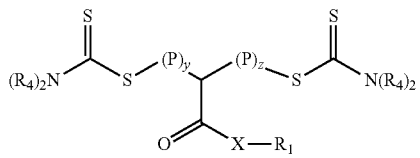

(I-5)

Groups X, $R_1$, $R_4$, and P are the same as defined in Formula (I). The variables z and y are defined as in Formula (I).

Embodiment 4A is the polymeric material of embodiment 1A, wherein the polymeric material of Formula (I) is of Formula (I-6).

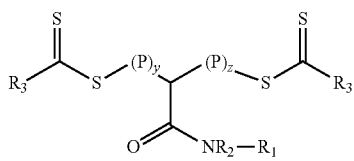

(I-6)

Groups $R_1$, $R_2$, $R_3$, and P are defined as in Formula (I). The variables y and z are defined as in Formula (I).

Embodiment 5A is the polymeric material of embodiment 1A, wherein the polymeric material of Formula (I) is of Formula (I-7).

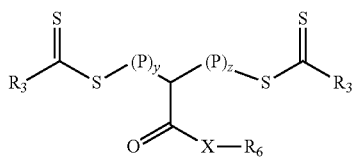

(I-7)

In Formula (I-7), the groups X, $R_3$, and P are as defined for Formula (I). The variables y and z are as defined in Formula (I). Group $R_6$ is a fluorinated alkyl.

Embodiment 6A is the polymeric material of embodiment 1A, wherein the polymeric material of Formula (I) is of Formula (I-1).

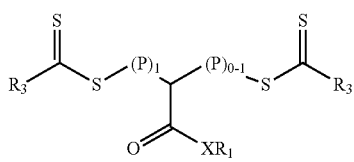

(I-1)

In Formula (I-1), $(P)_1$ means that there is one polymeric block (y is equal to 1 in Formula (I)) and $(P)_{0-1}$ eans that there is 0 to 1 polymeric blocks (z is in a range of 0 to 1 in Formula (I)). Groups $R_1$, $R_3$, X, and P are defined as in Formula (I).

Embodiment 7A is the polymeric material of embodiment 6A, wherein the polymeric material of Formula (I-1) is of Formula (II).

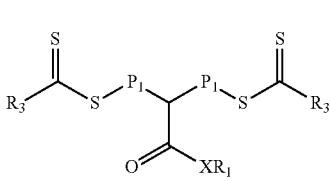

(II)

In Formula (II), $P_1$ is a first polymeric block, the first polymeric block being a polymerized product of a first monomer composition comprising at least one monomer having a single ethylenically unsaturated group. Formula (II) corresponds to Formula (I-1) where $(P)_{0-1}$ is selected to be $(P)_1$. Groups $R_1$, $R_3$, X, and P are defined as in Formula (I).

Embodiment 8A is the polymeric material of embodiment 7A, wherein the polymeric material is of Formula (II) is of Formula (II-1).

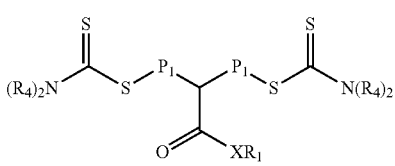

(II-1)

Group $P_1$ is defined as in Formula (II). Groups X, $R_1$, and $R_4$ are defined as in Formula (I).

Embodiment 9A is the polymeric material of embodiment 7A, wherein the polymeric material of Formula (II) is of Formula (II-2).

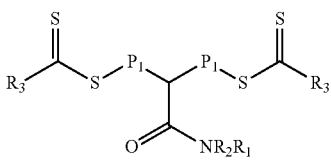

(II-2)

Group $P_1$ is defined as in Formula (II). Groups $R_1$, $R_2$, and $R_3$ are defined as in Formula (I).

Embodiment 10A is the polymeric material of embodiment 7A, wherein the polymeric material of Formula (II) is of Formula (II-3).

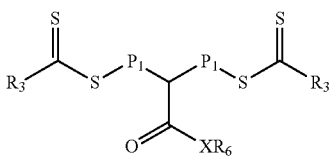

(II-3)

Group $P_1$ is defined as in Formula (II). Groups X and $R_3$ are defined as in Formula (I) and group $R_6$ is a fluorinated alkyl.

Embodiment 11A is the polymeric material of embodiment 1A, wherein the polymeric material of Formula (I) is of Formula (I-2).

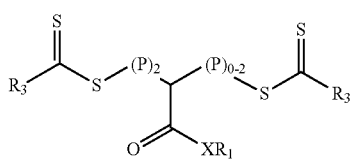

(I-2)

In Formula (I-2), $(P)_2$ means that there are two polymeric blocks P (y is equal to 2 in Formula (I)) and $(P)_{0-2}$ means that there is 0 to 2 polymeric blocks (z is in a range of 0 to 2 in Formula (I)). Groups $R_1$, $R_3$, X, and P are defined as in Formula (I).

Embodiment 12A is the polymeric material of embodiment 11A, wherein the polymeric material of Formula (I-2) is of Formula (III).

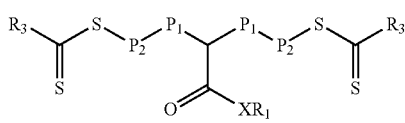

(III)

In Formula (III), $P_1$ is a first polymeric block, the first polymeric block being a polymerized product of a first monomer composition comprising at least one monomer having a single ethylenically unsaturated group. $P_2$ is a second polymeric block different from the first polymeric block and that is a polymerized product of a second monomer composition having at least one monomer having a single ethylenically unsaturated group. Formula (III) corresponds to Formula (I-2) where $(P)_{0-2}$ is selected to be $(P)_2$. Groups $R_1$, $R_3$, X, and P are defined as in Formula (I).

Embodiment 13A is the polymeric material of embodiment 12A, wherein the polymeric material is of Formula (III) is of Formula (III-1).

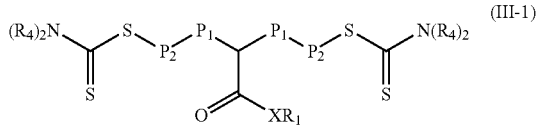

(III-1)

Groups $P_1$ and $P_2$ are defined as in Formula (III). Groups X, $R_1$, and $R_4$ are defined as in Formula (I).

Embodiment 14A is the polymeric material of embodiment 12A, wherein the polymeric material of Formula (III) is of Formula (III-2).

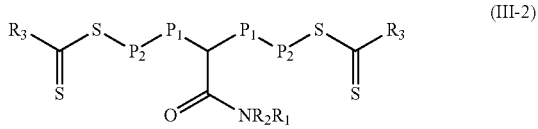

(III-2)

Groups $P_1$ and $P_2$ are defined as in Formula (III). Groups $R_1$, $R_2$, and $R_3$ are defined as in Formula (I).

Embodiment 15A is the polymeric material of embodiment 12A, wherein the polymeric material of Formula (III) is of Formula (III-3).

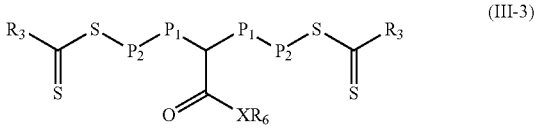

(III-3)

Groups $P_1$ and $P_2$ are defined as in Formula (III). Groups $R_2$, $R_3$, and X are defined as in Formula (I). $R_6$ is a fluorinated alkyl.

Embodiment 16A is the polymeric material of embodiment 1A, wherein the polymeric material of Formula (I) is of Formula (I-3).

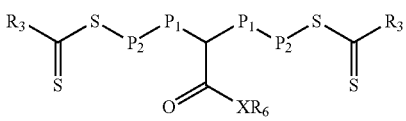

(I-3)

In Formula (I-3), $(P)_3$ means that there are 3 polymeric blocks P (y is equal to 3 in Formula (I)) and $(P)_{0-3}$ means that there is 0 to 3 polymeric blocks (z is in a range of 0 to 2 in Formula (I)). Groups $R_1$, $R_3$, X, and P are defined as in Formula (I).

Embodiment 17A is the polymeric material of embodiment 16A, wherein the polymeric material is of Formula (I-3) is of Formula (IV).

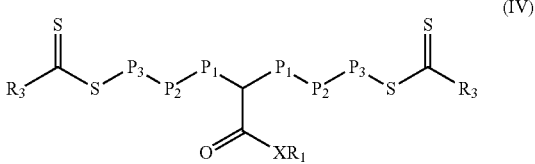

(IV)

In Formula (IV), $P_1$ is a first polymeric block, the first polymeric block being a polymerized product of a first monomer composition comprising at least one monomer having a single ethylenically unsaturated group. $P_2$ is a second polymeric block different than the first polymeric block, the second polymeric block being a polymerized product of a second monomer composition comprising at least one monomer having a single ethylenically unsaturated group. $P_3$ is a third polymeric block different from than the second polymeric block, the third polymeric block being a polymerized product of a third monomer composition comprising at least one monomer having a single ethylenically unsaturated group. Formula (IV) corresponds to Formula (I-3) where $(P)_{0-3}$ is selected to be $(P)_3$. Groups $R_1$, $R_3$, X, and P are defined as in Formula (I).

Embodiment 18A is the polymeric material of any one of embodiments 1A to 4A, 6A to 9A, 11A to 14A, and 16A to 17A, wherein $R_1$ is an alkyl or fluorinated alkyl.

Embodiment 19A is the polymeric material of any one of embodiments 1A to 3A, 5A to 8A, 10A to 13A, and 15A to 17A, wherein X is oxy.

Embodiment 20A is the polymeric material of any one of embodiments 1A to 3A, 5A to 8A, 10A to 13A, and 15A to 17A, wherein X is —NR$_2$—.

Embodiment 21A is the polymeric material of embodiment 20A, wherein R$_2$ is hydrogen, alkyl, or fluorinated alkyl.

Embodiment 22A is the polymeric material of any one of embodiments 1A to 2A, 4A to 7A, 9A to 12A, and 14A to 17A, wherein R$_3$ is alkoxy or fluorinated alkoxy.

Embodiment 23A is the polymeric material of any one of embodiments 1A to 2A, 4A to 7A, 9A to 12A, and 14A to 17A, wherein R$_3$ is —N(R$_4$)$_2$.

Embodiment 24A is the polymeric material of embodiment 23A, wherein R$_4$ is alkyl or fluorinated alkyl.

Embodiment 25A is the polymeric material of embodiment 23A, wherein two adjacent R$_4$ groups are combined together with the nitrogen to which they are both attached to form a first heterocyclic ring having 1 to 3 heteroatoms selected from nitrogen, oxygen, and sulfur, the first heterocyclic ring being saturated or unsaturated and optionally fused to one or more second rings that are carbocyclic or heterocyclic.

Embodiment 26A is the polymeric material of any one of embodiments 1A to 25A, wherein each polymeric block comprises a polymerized product of a monomer composition comprising 50 to 100 weight percent of a first monomer with a single (meth)acrylolyl group and 0 to 50 weight percent of a second monomer having a single ethylenically unsaturated group that is not a (meth)acryloyl group. The weight percent is based on the total weight of monomers in the monomer composition.

Embodiment 27A is the polymeric material of embodiment 26A, wherein the monomer composition comprises 80 to 100 weight percent of the first monomer and 0 to 20 weight percent of the second monomer.

Embodiment 28A is the polymeric material of any one of embodiments 1A to 26A, wherein the polymeric material is not crosslinked.

Embodiment 1B is a first reaction mixture. The first reaction mixture includes a) a photoinitiator and b) a first monomer composition containing at least one monomer having a single ethylenically unsaturated group. The photoinitiator is of Formula (V)

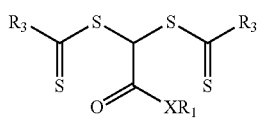
(V)

wherein group R$_1$ is hydrogen, alkyl, fluorinated alkyl, aryl, aralkyl, or substituted aryl. Group X is oxy or —NR$_2$— where R$_2$ is hydrogen, alkyl, fluorinated alkyl, aryl, aralkyl, or substituted aryl. Group R$_3$ is an alkoxy, fluorinated alkoxy, or —N(R$_4$)$_2$. Each R$_4$ is an alkyl or fluorinated alkyl, or two adjacent R$_4$ groups are combined together with the nitrogen to which they are both attached to form a first heterocyclic ring having 1 to 3 heteroatoms selected from nitrogen, oxygen, and sulfur, the first heterocyclic ring being saturated or unsaturated and optionally fused to one or more second rings that are carbocyclic or heterocyclic.

Embodiment 2B is the first reaction mixture of embodiment 1B, wherein the photoinitiator of Formula (V) is of Formula (V-1).

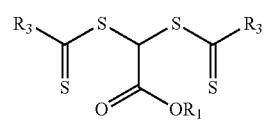
(V-1)

Embodiment 3B is the first reaction mixture of embodiment 1B, wherein the photoinitiator of Formula (V) is of Formula (V-2).

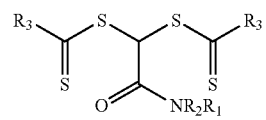
(V-2)

Embodiment 4B is the first reaction mixture of embodiment 1B, wherein the photoinitiator of Formula (V) is of Formula (V-3).

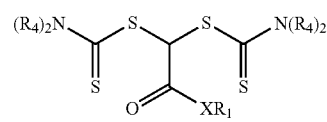
(V-3)

Embodiment 5B is the first reaction mixture of embodiment 4B, wherein the initiator of Formula (V-3) is of Formula (V-4).

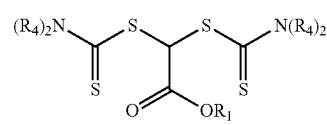
(V-4)

Embodiment 6B is the first reaction mixture of embodiment 4B, wherein the initiator of Formula (V-3) is of Formula (V-5).

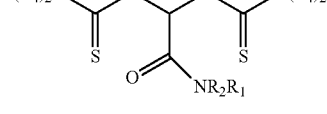
(V-5)

Embodiment 7B is the first reaction mixture of embodiment 1B, wherein the initiator of Formula (V) is of Formula (V-6).

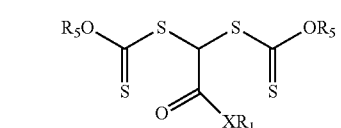
(V-6)

Embodiment 8B is the first reaction mixture of embodiment 7B, wherein the initiator of Formula (V-6) is of Formula (V-7).

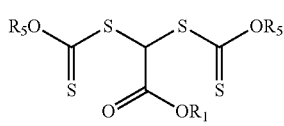
(V-7)

Embodiment 9B is the first reaction mixture of embodiment 7B, wherein the initiator of Formula (V-6) is of Formula (V-8).

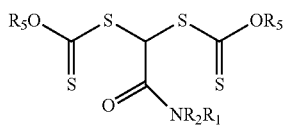
(V-8)

Embodiment 10B is the first reaction mixture of embodiment 1B, wherein the photoinitiator of Formula (V) is of Formula (V-9)

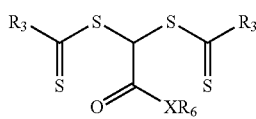
(V-9)

wherein $R_6$ is a fluorinated alkyl (Formula (V-9) is equal to Formula (V) where $R_1$ is a fluorinated alkyl).

Embodiment 11B is the first reaction mixture of any one of embodiments 1B to 10B, wherein the first monomer composition comprises 50 to 100 weight percent of a first monomer with a single (meth)acryloyl group and 0 to 50 weight percent of a second monomer having a single ethylenically unsaturated group that is not a (meth)acryloyl group. The weight percent is based on the total weight of monomers in the monomer composition.

Embodiment 12B is the first reaction mixture of embodiment 11B, wherein the first monomer composition comprises 80 to 100 weight percent of the first monomer and 0 to 20 weight percent of the second monomer.

Embodiment 13B is the first reaction mixture of any one of embodiments 1B to 12B, wherein the first reaction mixture is free of a monomer having more than one ethylenically unsaturated groups.

Embodiment 1C is a second reaction mixture. The second reaction mixture includes a) a polymeric material of Formula (II)

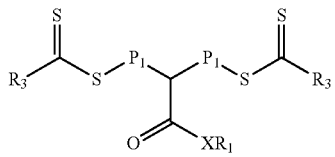
(II)

and b) a second monomer composition comprising at least one monomer having a single ethylenically unsaturated group, wherein the second monomer composition is different than a first monomer composition used to form a first polymeric block $P_1$ in the polymeric material of Formula (II). In Formula (II), group $R_1$ is hydrogen, alkyl, fluorinated alkyl, aryl, aralkyl, or substituted aryl (e.g., an aryl substituted with at least one alkyl and/or alkoxy). Group X is oxy or —$NR_2$— where $R_2$ is hydrogen, alkyl, fluorinated alkyl, aryl, aralkyl, or substituted aryl (e.g., an aryl substituted with at least one alkyl and/or alkoxy). Group $R_3$ is an alkoxy, fluorinated alkoxy, or —$N(R_4)_2$. Each $R_4$ is an alkyl or fluorinated alkyl, or two adjacent $R_4$ groups are combined together with the nitrogen to which they are both attached to form a first heterocyclic ring having 1 to 3 heteroatoms selected from nitrogen, oxygen, and sulfur, the first heterocyclic ring being saturated or unsaturated and optionally fused to one or more second rings that are carbocyclic or heterocyclic. $P_1$ is the first polymeric block, the first polymeric block being a polymerized product of the first monomer composition comprising at least one monomer having a single ethylenically unsaturated group.

Embodiment 2C is the second reaction mixture of embodiment 1C, wherein the polymeric material of Formula (II) is of Formula (II-1).

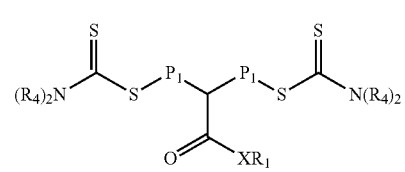
(II-1)

Embodiment 3C is the second reaction mixture of embodiment 1C, wherein the polymeric material of Formula (II) is of Formula (II-2).

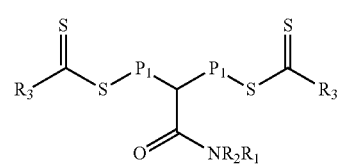
(II-2)

Embodiment 4C is the second reaction mixture of embodiment 1C, wherein the polymeric material of Formula (II) is of Formula (II-3).

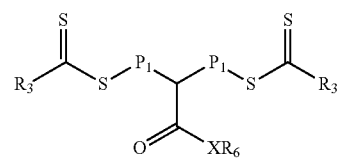
(II-3)

Embodiment 5C is the second reaction mixture of embodiment 1C, 2C, or 4C, wherein X is oxy.

Embodiment 6C is the second reaction mixture of embodiments 1C, 2C, or 4C, wherein X is —$NR_2$—.

Embodiment 7C is the second reaction mixture of embodiment 3C or 4C, wherein $R_2$ is hydrogen, alkyl, or fluorinated alkyl.

Embodiment 8C is the second reaction mixture of any one of embodiments 1C, 3C, or 4C, wherein $R_3$ is alkoxy or fluorinated alkoxy.

Embodiment 9C is the second reaction mixture of any one of embodiments 1C, 3C, or 4C, wherein $R_3$ is —$N(R_4)_2$.

Embodiment 10C is the second reaction mixture of embodiment 9C, wherein $R_4$ is alkyl or fluorinated alkyl.

Embodiment 11C is the second reaction mixture of embodiment 9C wherein two adjacent $R_4$ groups are combined together with the nitrogen to which they are both attached to form a first heterocyclic ring having 1 to 3 heteroatoms selected from nitrogen, oxygen, and sulfur, the first heterocyclic ring being saturated or unsaturated and optionally fused to one or more second rings that are carbocyclic or heterocyclic.

Embodiment 12C is the second reaction mixture of any one of embodiments 1C to 11C, wherein the second monomer composition comprises 50 to 100 weight percent of a first monomer with a single (meth)acryloyl group and 0 to 50 weight percent of a second monomer having a single ethylenically unsaturated group that is not a (meth)acryloyl group. The weight percent is based on the total weight of monomers in the second monomer composition.

Embodiment 13C is the second reaction mixture of embodiment 12C, wherein the second monomer composition comprises 80 to 100 weight percent of the first monomer and 0 to 20 weight percent of the second monomer.

Embodiment 14C is the second reaction mixture of any one of embodiments 1C to 13C, wherein the second reaction mixture is free of a monomer having more than one ethylenically unsaturated groups.

Embodiment 1D is a third reaction mixture. The third reaction mixture includes a) a polymeric material of Formula (III)

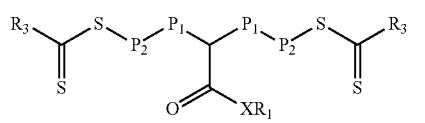

and b) a third monomer composition comprising at least one monomer having a single ethylenically unsaturated group, wherein the third monomer composition is different than a second monomer composition used to form a polymeric block $P_2$ in the polymeric material of Formula (III). In Formula (III), group $R_1$ is hydrogen, alkyl, fluorinated alkyl, aryl, aralkyl, or substituted aryl (e.g., an aryl substituted with at least one alkyl and/or alkoxy). Group X is oxy or —$NR_2$— where $R_2$ is hydrogen, alkyl, fluorinated alkyl, aryl, aralkyl, or substituted aryl (e.g., an aryl substituted with at least one alkyl and/or alkoxy). Group $R_3$ is an alkoxy, fluorinated alkoxy, or —$N(R_4)_2$. Each $R_4$ is an alkyl or fluorinated alkyl, or two adjacent $R_4$ groups are combined together with the nitrogen to which they are both attached to form a first heterocyclic ring having 1 to 3 heteroatoms selected from nitrogen, oxygen, and sulfur, the first heterocyclic ring being saturated or unsaturated and optionally fused to one or more second rings that are carbocyclic or heterocyclic. $P_1$ is a first polymeric block, the first polymeric block being a polymerized product of the first monomer composition comprising at least one monomer having a single ethylenically unsaturated group. Each $P_2$ is a second polymeric block different from the first polymeric block, the second polymeric block being a polymerized product of a second monomer composition comprising at least one monomer having a single ethylenically unsaturated group.

Embodiment 2D is the third reaction mixture of embodiment 1D, wherein the polymeric material of Formula (III) is of Formula (III-1).

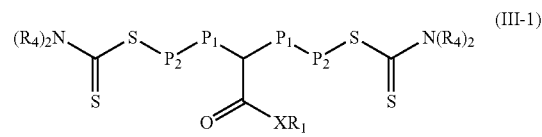

Embodiment 3D is the third reaction mixture of embodiment 1D, wherein the polymeric material of Formula (III) is of Formula (III-2).

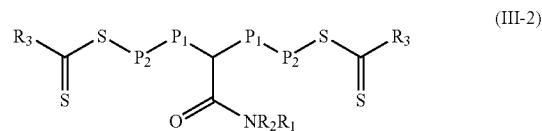

Embodiment 4D is the third reaction mixture of embodiment 1D, wherein the polymeric material of Formula (III) is of Formula (III-3).

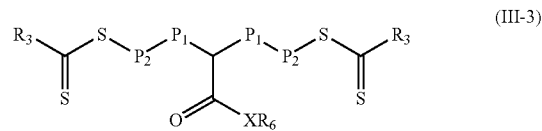

Embodiment 5D is the third reaction mixture of any one of embodiments 1D, 2D, or 4D, wherein X is oxy.

Embodiment 6D is the third reaction mixture of any one of embodiments 1D, 2D, or 4D, wherein X is —$NR_2$—.

Embodiment 7D is the third reaction mixture of embodiment 3D, wherein $R_2$ is hydrogen, alkyl, or fluorinated alkyl.

Embodiment 8D is the third reaction mixture of any one of embodiments 1D, 3D, or 4D, wherein $R_3$ is alkoxy or fluorinated alkoxy.

Embodiment 9D is the third reaction mixture of embodiment 3D or 4D, wherein $R_3$ is —$N(R_4)_2$.

Embodiment 10D is the third reaction mixture of embodiment 9D, wherein $R_4$ is alkyl or fluorinated alkyl.

Embodiment 11D is the third reaction mixture of embodiment 9D wherein two adjacent $R_4$ groups are combined together with the nitrogen to which they are both attached to form a first heterocyclic ring having 1 to 3 heteroatoms selected from nitrogen, oxygen, and sulfur, the first heterocyclic ring being saturated or unsaturated and optionally fused to one or more second rings that are carbocyclic or heterocyclic.

Embodiment 12D is the third reaction mixture of any one of embodiments 1D to 11D, wherein the third monomer composition comprises 50 to 100 weight percent of a first monomer with a single (meth)acryloyl group and 0 to 50 weight percent of a second monomer having a single ethylenically unsaturated group that is not a (meth)acryloyl group. The weight percent is based on the total weight of monomers in the third monomer composition.

Embodiment 13D is the third reaction mixture of embodiment 12D, wherein the third monomer composition comprises 80 to 100 weight percent of the first monomer and 0 to 20 weight percent of the second monomer.

Embodiment 14D is the third reaction mixture of any one of embodiments 1D to 13D, wherein the third reaction mixture is free of a monomer having more than one ethylenically unsaturated groups.

Embodiments 1E is a method of making a polymeric material. The method includes providing an initiator of Formula (V).

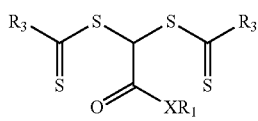
(V)

In Formula (V), $R_1$ is hydrogen, alkyl, fluorinated alkyl, aryl, aralkyl, substituted aryl (e.g., an aryl substituted with an alkyl and/or alkoxy). Group X is oxy or —$NR_2$— where $R_2$ is hydrogen, alkyl, fluorinated alkyl, aryl, aralkyl, or substituted aryl (e.g., an aryl substituted with an alkyl and/or alkoxy). Group $R_3$ is an alkoxy, fluorinated alkoxy, or —$N(R_4)_2$. Each $R_4$ is an alkyl or fluorinated alkyl, or two adjacent $R_4$ groups are combined together with the nitrogen to which they are both attached to form a first heterocyclic ring having 1 to 3 heteroatoms selected from nitrogen, oxygen, and sulfur, the first heterocyclic ring being saturated or unsaturated and optionally fused to one or more second rings that are carbocyclic or heterocyclic. The method further includes preparing a first reaction mixture containing the initiator of Formula (V) and a first monomer composition containing at least one monomer having a single ethylenically unsaturated group. The method still further includes forming a first polymeric material of Formula (II) from the first reaction mixture.

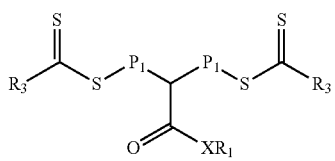
(II)

In Formula (II), $P_1$ is a first polymeric block, the first polymeric block being a polymerized product of the first monomer composition. $R_1$, $R_2$, $R_3$, and X are the same as in Formula (V).

Embodiment 2E is the method of embodiment 1E, wherein the initiator of Formula (V) is of Formula (V-3)

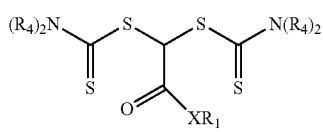
(V-3)

and the first polymeric material of Formula (II) is of Formula (II-1).

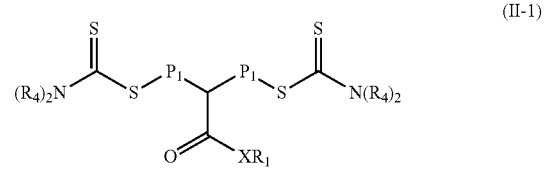
(II-1)

Embodiment 3E is the method of embodiment 1E, wherein the initiator of Formula (V) is of Formula (V-2)

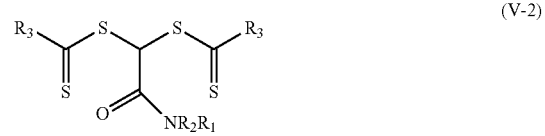
(V-2)

and the first polymeric material of Formula (II) is of Formula (II-2).

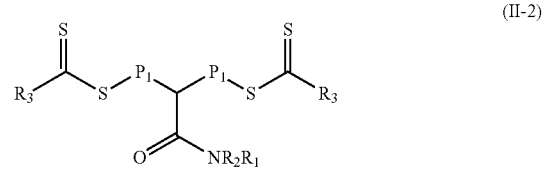
(II-2)

Embodiment 4E is the method of embodiment 1E, wherein the initiator of Formula (V) is of Formula (V-9)

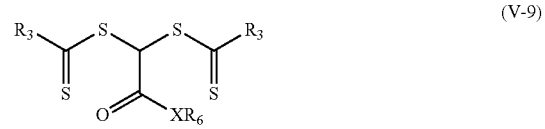
(V-9)

and the first polymeric material of Formula (II) is of Formula (II-3).

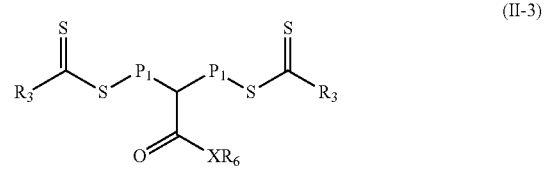
(II-3)

Embodiment 5E is the method of embodiment 1E, further comprising preparing a second reaction mixture comprising the first polymeric material of Formula (II) and a second monomer composition different than the first monomer composition, the second monomer composition comprising at least one monomer having a single ethylenically unsaturated group. The method further comprises forming a second polymeric material of Formula (III)

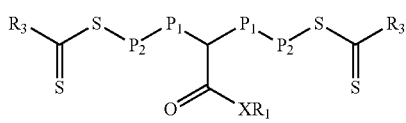
(III)

wherein $P_2$ is a second polymeric block different from the first polymeric block, the second polymeric block being a polymerized product of a second monomer composition comprising at least one monomer having a single ethylenically unsaturated group.

Embodiment 6E is the method of embodiment 5E, wherein the first polymeric material is of Formula (II-1)

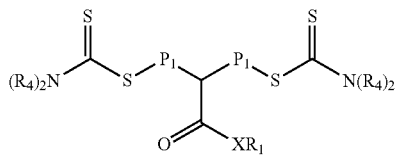
(II-1)

and the second polymeric material is of Formula (III-1).

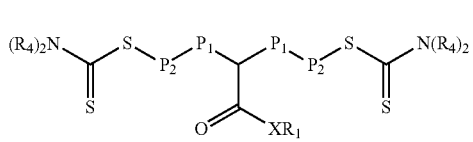
(III-1)

Embodiment 7E is the method of embodiment 5E, wherein the first polymeric material is of Formula (II-2)

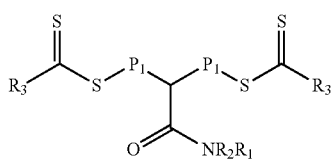
(II-2)

and the second polymeric material is of Formula (III-2).

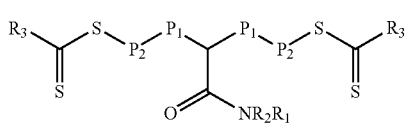
(III-2)

Embodiment 8E is the method of embodiment 5E, wherein the first polymeric material is of Formula (II-3)

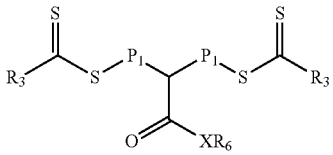
(II-3)

and the second polymeric material is of Formula (III-3).

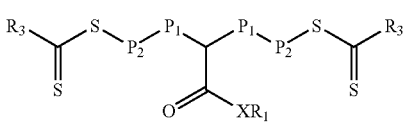
(III-3)

$R_6$ is a fluorinated alkyl.

Embodiment 9E is the method of embodiment 5E, further comprising preparing a third reaction mixture comprising the second polymeric material of Formula (III)

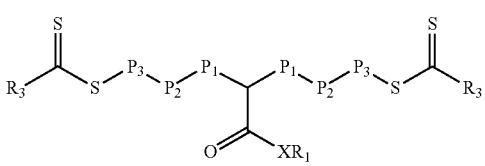
(III)

and a third monomer composition different than the second monomer composition, the third monomer composition comprising at least one monomer having a single ethylenically unsaturated group. The method further comprises forming a third polymeric material of Formula (IV)

(IV)

wherein $P_3$ is a third polymeric block different from than the second polymeric block, the third polymeric block being a polymerized product of a third monomer composition comprising at least one monomer having a single ethylenically unsaturated group.

Embodiment 10E is the method of embodiment 9E, wherein the second polymeric material of Formula (III) is of Formula (III-1)

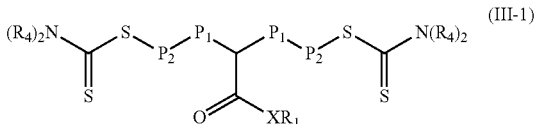
(III-1)

and the third polymeric material of Formula (IV) is of Formula (IV-1).

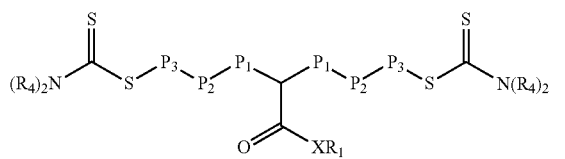

(IV-1)

Embodiment 11E is the method of embodiment 9E, wherein the second polymeric material of Formula (III) is of Formula (III-2)

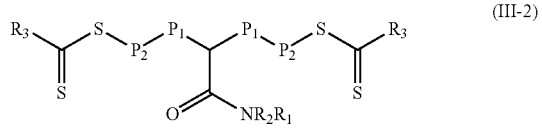

(III-2)

and the third polymeric material of Formula (IV) is of Formula (IV-2).

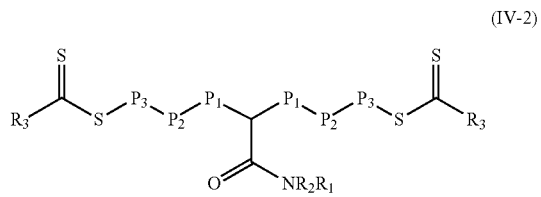

(IV-2)

Embodiment 12E is the method of embodiment 9E, wherein the second polymeric material of Formula (III) is of Formula (III-3)

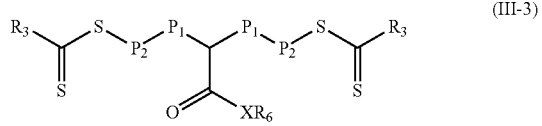

(III-3)

and the third polymeric material of Formula (IV) is of Formula (IV-2).

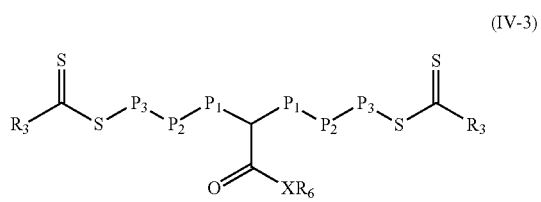

(IV-3)

$R_6$ is a fluorinated alkyl.

Embodiment 13E is the method of embodiment any one of embodiments 1E to 3E, 5E to 7E, and 8E to 11E, wherein $R_1$ is an alkyl or fluorinated alkyl.

Embodiment 14E is the method of any one of embodiments 1E to 2E, 4E to 6E, 8E to 10E and 12E, wherein X is oxy.

Embodiment 15E is the method of any one of embodiments 1E to 2E, 4E to 6E, 8E to 10E and 12E, wherein X is —$NR_2$—.

Embodiment 16E is the method of any one of embodiments 3E, 7E, 11E, and 15E, wherein $R_2$ is hydrogen, alkyl, or fluorinated alkyl.

Embodiment 17E is the method of any one of embodiments 1E, 3E to 5E, 7E to 9E, and 11E to 12E, wherein $R_3$ is alkoxy or fluorinated alkoxy.

Embodiment 18E is the method of any one of embodiments 1E, 3E to 5E, 7E to 9E, and 11E to 12E, wherein $R_3$ is —$N(R_4)_2$.

Embodiment 19E is the method of any one of embodiments 2E, 6E, 10E, and 18E, wherein $R_4$ is alkyl or fluorinated alkyl.

Embodiment 20E is the method of embodiment 19E, wherein two adjacent $R_4$ groups are combined together with the nitrogen to which they are both attached to form a first heterocyclic ring having 1 to 3 heteroatoms selected from nitrogen, oxygen, and sulfur, the first heterocyclic ring being saturated or unsaturated and optionally fused to one or more second rings that are carbocyclic or heterocyclic.

Embodiment 21E is the method of any one of embodiments 1E to 4E, wherein the first monomer composition comprises 50 to 100 weight percent of a first monomer with a single (meth)acryloyl group and 0 to 50 weight percent of a second monomer having a single ethylenically unsaturated group that is not a (meth)acryloyl group. The weight percent is based on the total weight of monomers in the first monomer composition.

Embodiment 22E is the method of embodiment 21E, wherein the first monomer composition comprises 80 to 100 weight percent of the first monomer and 0 to 20 weight percent of the first monomer.

Embodiment 23E is the method of embodiment 5E or 8E, wherein the second monomer composition comprises 50 to 100 weight percent of a first monomer with a single (meth)acryloyl group and 0 to 50 weight percent of a second monomer having a single ethylenically unsaturated group that is not a (meth)acryloyl group. The weight percent is based on the total weight of monomers in the second monomer composition.

Embodiment 24E is the method of embodiment 23E, wherein the second monomer composition comprises 80 to 100 weight percent of the first monomer and 0 to 20 weight percent of the first monomer.

Embodiment 25E is the method of embodiment 9E or 12E, wherein the third monomer composition comprises 50 to 100 weight percent of a first monomer with a single (meth)acryloyl group and 0 to 50 weight percent of a second monomer having a single ethylenically unsaturated group that is not a (meth)acryloyl group. The weight percent is based on the total weight of monomers in the third monomer composition.

Embodiment 26E is the method of embodiment 25E, wherein the third monomer composition comprises 80 to 100 weight percent of the first monomer and 0 to 20 weight percent of the first monomer.

Embodiment 27E is the method of any one of embodiments 1E to 26E, wherein the first monomer composition, the second monomer composition, and the third monomer composition are free of a monomer having more than one ethylenically unsaturated group.

Embodiment 1F is a compound of Formula (V-9).

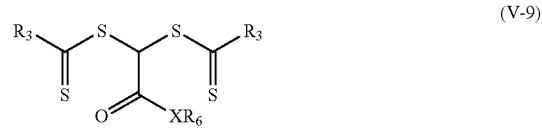

(V-9)

In Formula (V-9), $R_6$ is a fluorinated alkyl. Group X is oxy or —$NR_2$— where $R_2$ is hydrogen, alkyl, fluorinated alkyl, aryl, aralkyl, or substituted aryl (e.g., an aryl substituted with an alkyl and/or alkoxy). Group $R_3$ is an alkoxy, fluorinated alkoxy, or —$N(R_4)_2$. Each $R_4$ is an alkyl or fluorinated alkyl, or two adjacent $R_4$ groups are combined together with the nitrogen to which they are both attached to form a first heterocyclic ring having 1 to 3 heteroatoms selected from nitrogen, oxygen, and sulfur, the first heterocyclic ring being saturated or unsaturated and optionally fused to one or more second rings that are carbocyclic or heterocyclic.

Embodiment 2F is the compound of embodiment 1F, wherein X is oxy.

Embodiment 3F is the compound of embodiment 1F, wherein X is —$NR_2$—.

Embodiment 4F is the compound of embodiment 3F, wherein $R_2$ is hydrogen, alkyl, or fluorinated alkyl.

Embodiment 5F is the compound of any one of embodiments 1F to 4F, wherein $R_3$ is alkoxy or fluorinated alkoxy.

Embodiment 6F is the compound of any one of embodiments 1F to 4F, wherein $R_3$ is —$N(R_4)_2$.

Embodiment 7F is the compound of embodiment 6F, wherein $R_4$ is alkyl or fluorinated alkyl.

Embodiment 8F is the compound of embodiment 6F, wherein two adjacent $R_4$ groups are combined together with the nitrogen to which they are both attached to form a first heterocyclic ring having 1 to 3 heteroatoms selected from nitrogen, oxygen, and sulfur, the first heterocyclic ring being saturated or unsaturated and optionally fused to one or more second rings that are carbocyclic or heterocyclic.

EXAMPLES

Test Method 1: Molecular Weight by Gel Permeation Chromatography (GPC)

Molecular weights and polydispersity were determined at 23° C. by gel permeation chromatography (GPC) using a Waters LC SYSTEM (Waters Corporation, Milford, Mass.) equipped with a Waters Styragel HR 5E THF 300 millimeter (length)×7.8 millimeter I.D. (Inside Diameter) column, in combination with a Waters 2414 REFRACTIVE INDEX DETECTOR. Sample solutions were prepared by mixing 10 milliliters of tetrahydrofuran (THF) to a sample weighing between approximately 50 and 100 milligrams, and mixing for at least 1 hour followed by filtering through a 0.2 micrometer polytetrafluoroethylene syringe filter. The injection volume was 20 microliters and the THF eluent flow rate was 1.0 milliliter/minute. Weight and Number Average Molecular Weights ($M_w$ and $M_n$, g/mole) and polydispersity index, PDI ($M_w/M_n$) were determined relative to a calibration curve with polystyrene standards.

Photoinitiator Example 1: Methyl 2,2-bis(diethylcarbamothioylsulfanyl)acetate

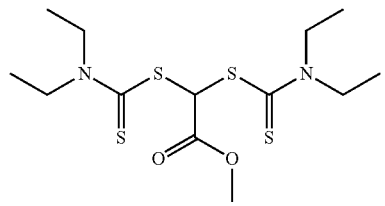 [SMILES: CCN(CC)C(=S)SC(SC(=S)N(CC)CC)C(=O)OC]

A suspension of sodium diethyldithiocarbamate trihydrate (18.9 grams, 84.0 mmol, available from Sigma-Aldrich Corporation, St. Louis, Mo.) in 100 mL of acetone was treated with methyl dichloroacetate (6.00 grams, 42.0 mmol, available from Sigma-Aldrich Corporation) and the reaction mixture was stirred overnight. The reaction mixture was filtered, rinsed with acetone, and the filtrate was concentrated to give a yellow syrup. The syrup was taken up in 100 mL of $CH_2Cl_2$ and washed with water. The organic layer was dried over $Na_2SO_4$, filtered and concentrated under reduced pressure to give 15.4 grams of methyl 2,2-bis(diethylcarbamothioylsulfanyl)acetate as a golden yellow syrup. $^1$H NMR ($CDCl_3$, 500 MHz) δ 6.89 (s, 1H), 3.70 (quartet, J=7.1 Hz, 4H), 3.50 (s, 3H), 3.43 (quartet, J=7.2 Hz, 4H), 1.02 (t, J=7.2 Hz, 6H), 0.97 (t, J=7.1, 6H).

Photoinitiator Example 2: Methyl 2,2-bis(isopropoxycarbothioylsulfanyl)acetate

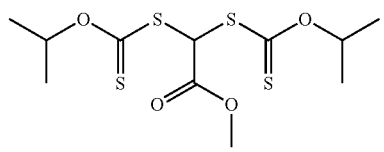 [SMILES: COC(=O)C(SC(=S)OC(C)C)SC(=S)OC(C)C]

A solution of methyl dichloroacetate (7.15 grams, 50.0 mmol) dissolved in 250 mL of acetone was treated with potassium isopropyl xanthate (17.5 grams, 100 mmol, available from TCI America, Portland, Oreg.) and the reaction mixture was stirred overnight. The reaction mixture was filtered through a plug of silica gel, rinsed with acetone, and the filtrate was concentrated to give a brown syrup. Purification by column chromatography ($SiO_2$, 18 volume percent $CH_2Cl_2$/hexanes to 50 volume percent $CH_2Cl_2$/hexanes) gave 11.5 grams of methyl 2,2-bis(isopropoxycarbothioylsulfanyl)acetate as an amber colored syrup. $^1$H NMR ($CDCl_3$, 500 MHz) δ 6.03 (s, 1H), 5.73 (m, 2H), 3.82 (s, 3H), 1.42 (d, J=6.3 Hz, 6H), 1.40 (d, J=6.3, 6H).

Photoinitiator Example 3: 2-Ethylhexyl 2,2-bis(diethylcarbamothioylsulfanyl)acetate

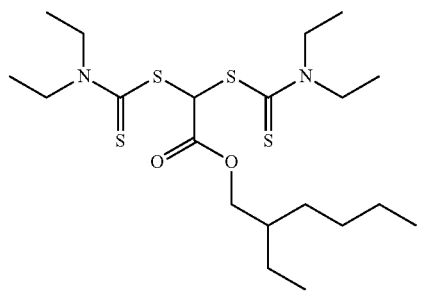 [SMILES: CCCCC(CC)COC(=O)C(SC(=S)N(CC)CC)SC(=S)N(CC)CC]

A stirred solution of 2-ethylhexanol (3.00 grams, 23.0 mmol, available from Sigma-Aldrich Corporation) in 50 mL of $CH_2Cl_2$ was cooled to 0° C. under nitrogen. To the solution were added trimethylamine (4.80 mL, 34.4 mmol) and dimethylaminopyridine (20 mg) followed by the dropwise addition of dichloroacetyl chloride (3.74 grams, 25.4 mmol, available from Thermo Fisher Scientific, Waltham, Mass.). The reaction mixture was allowed to reach ambient temperature while stirring overnight. The reaction mixture was quenched with a saturated solution of NaHCO₃ followed by addition of 50 mL of CH₂Cl₂. The layers were separated and the organic portion was washed with 5 weight percent NaH₂PO₄ (2×) followed by brine. The organic portion was dried over Na₂SO₄, filtered through a small plug of silica gel, and concentrated under reduced pressure to give 5.02 grams of 2-ethylhexyl 2,2-dichloroacetate as a yellow liquid.

The 2-ethylhexyl 2,2-dichloroacetate (5.02 grams, 20.8 mmol) was dissolved in 50 mL of acetone and treated with sodium diethyldithiocarbamate trihydrate (9.37 grams, 41.6 mmol, available from Sigma-Aldrich Corporation) and the mixture was stirred overnight. The reaction mixture was filtered, rinsed with acetone, and the filtrate was concentrated to give a dark brown oil. The oil was taken up in 100 mL of CH₂Cl₂ and washed with brine. The organic layer was dried over Na₂SO₄, filtered and concentrated under reduced pressure. The resulting brown syrup was passed through a small plug of silica gel eluting with 1:1 hexanes/CH₂Cl₂ and concentrated to give 7.17 grams of 2-ethylhexyl 2,2-bis(diethylcarbamothioylsulfanyl)acetate as an orange syrup. $^1$H NMR (CDCl₃, 500 MHz) δ 7.22 (s, 1H), 4.11 (dd, J=5.4, 10.8 Hz, 1H), 4.07 (dd, J=5.9, 10.8 Hz, 1H), 3.98 (quartet, J=7.1 Hz, 4H), 3.72 (quartet, J=7.2 Hz, 4H), 1.61 (m, 1H), 1.40-1.25 m, 8H), 1.31 (t, J=7.2 Hz, 6H), 1.26 (t, J=7.1, 6H), 0.89-0.86 (m, 6H).

Photoinitiator Example 4: 2-Ethylhexyl 2,2-bis(isopropoxycarbothioylsulfanyl)acetate

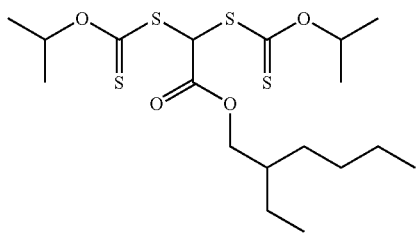 [SMILES: CCCCC(CC)COC(=O)C(SC(=S)OC(C)C)SC(=S)OC(C)C]

A solution of 2-ethylhexyl 2,2-dichloroacetate (7.14 grams, 29.6 mmol) dissolved in 150 mL of acetone was treated with potassium isopropyl xanthate (10.3 grams, 59.3 mmol) and the reaction mixture was stirred overnight. The reaction mixture was filtered, rinsed with acetone, and the filtrate was concentrated to give a brown syrup. Purification by column chromatography (SiO₂, 100 volume percent hexanes to 40 volume percent CH₂Cl₂/hexanes) gave 9.3 grams of 2-ethylhexyl 2,2-bis(isopropoxycarbothioylsulfanyl)acetate as an amber colored liquid. $^1$H NMR (CDCl₃, 500 MHz) δ 6.05 (s, 1H), 5.73 (m, 2H), 4.10 (m, 2H), 1.61 (m, 1H), 1.42 (d, J=6.3 Hz, 6H), 1.40 (d, J=6.3, 6H), 1.37 (m, 2H), 1.34-1.26 (m, 6H), 0.89 (t, J=6.9, 3H), 0.89 (t, J=7.4, 3H).

Photoinitiator Example 5: Octyl 2,2-bis(diethylcarbamothioylsulfanyl)acetate

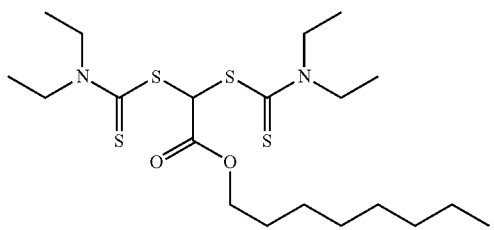 [SMILES: CCCCCCCCOC(=O)C(SC(=S)N(CC)CC)SC(=S)N(CC)CC]

A stirred solution of 1-octanol (3.00 grams, 23.0 mmol, available from Sigma-Aldrich Corporation) in 50 mL of CH₂Cl₂ was cooled to 0° C. under nitrogen. To the solution were added trimethylamine (4.80 mL, 34.4 mmol) and dimethylaminopyridine (20 mg) followed by the dropwise addition of dichloroacetyl chloride (3.74 grams, 25.4 mmol). The reaction mixture was allowed to reach ambient temperature while stirring overnight. The reaction mixture was quenched with a saturated solution of NaHCO₃ followed by addition of 50 mL of CH₂Cl₂. The layers were separated and the organic portion was washed with 5 weight percent NaH₂PO₄ (2×) followed by brine. The organic portion was dried over Na₂SO₄, filtered through a small plug of silica gel, and concentrated under reduced pressure to give 4.79 grams of 1-octyl-2,2-dichloroacetate as a yellow liquid.

The 1-octyl-2,2-dichloroacetate (4.79 grams, 19.6 mmol) was dissolved in 50 mL of acetone and treated with sodium diethyldithiocarbamate trihydrate (8.95 grams, 39.7 mmol, available from Sigma-Aldrich Corporation) and the mixture was stirred overnight. The reaction mixture was filtered, rinsed with acetone, and the filtrate was concentrated to give a dark brown oil. The oil was taken up in 100 mL of CH₂Cl₂ and washed with brine. The organic layer was dried over Na₂SO₄, filtered and concentrated under reduced pressure to give a brown syrup. Chromatography (SiO₂, eluting with a gradient of 25 volume percent CH₂Cl₂/hexanes to 100 volume percent CH₂C₁₂) gave 6.46 grams of octyl 2,2-bis(diethylcarbamothioylsulfanyl)acetate as a yellow syrup. $^1$H NMR (CDCl₃, 500 MHz) δ 7.16 (s, 1H), 4.18 (t, J=6.6 Hz, 2H), 3.98 (m, 4H), 3.72 (quartet, J=7.2 Hz, 4H), 1.66 (m, 2H), 1.36-1.25 (m, 10H), 1.31 (t, J=7.1 Hz, 6H), 1.26 (t, J=7.0, 6H), 0.89-0.86 (t, J=6.9 Hz, 3H).

Photoinitiator Example 6: 2,2,3,3,4,4,4-heptafluorobutyl 2,2-bis(isopropoxycarbothioylsulfanyl)acetate

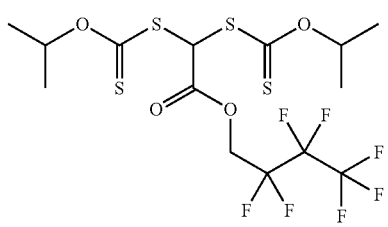 [SMILES: CC(C)OC(=S)SC(SC(=S)OC(C)C)C(=O)OCC(F)(F)C(F)(F)C(F)(F)F]

A stirred solution of 2,2,3,3,4,4,4-heptafluorobutanol (4.60 grams, 23.0 mmol, available from Sigma-Aldrich Corporation) in 50 mL of CH₂Cl₂ was cooled to 0° C. under nitrogen. To the solution were added trimethylamine (4.80 mL, 34.4 mmol) and dimethylaminopyridine (20 mg) followed by the dropwise addition of dichloroacetyl chloride (3.74 grams, 25.4 mmol). The reaction mixture soon turned black and was allowed to reach ambient temperature while stirring overnight. The reaction mixture was quenched with a saturated solution of NaHCO₃ followed by addition of 50 mL of CH₂Cl₂. The layers were separated and the organic portion was washed with 5 weight percent NaH₂PO₄ (2×) followed by brine. The organic portion was dried over Na₂SO₄, filtered through a plug of silica gel, and concentrated under reduced pressure to give 4.08 grams of 2,2,3,3,4,4,4-heptafluorobutyl 2,2-dichloroacetate as a yellow liquid.

A solution of 2,2,3,3,4,4,4-heptafluorobutyl 2,2-dichloroacetate (4.08 grams, 13.1 mmol) dissolved in 50 mL of acetone was treated with potassium isopropyl xanthate (4.57 grams, 26.2 mmol) and the reaction mixture was stirred overnight. The reaction mixture was filtered, rinsed with acetone, and the filtrate was concentrated to give an orange oil. Purification by column chromatography (SiO$_2$, 10 volume percent CH$_2$Cl$_2$/hexanes to 40 volume percent CH$_2$Cl$_2$/hexanes) gave 4.40 grams of 2,2,3,3,4,4,4-heptafluorobutyl 2,2-bis(isopropoxycarbothioylsulfanyl)acetate as an amber colored liquid. $^1$H NMR (CDCl$_3$, 500 MHz) δ 6.18 (s, 1H), 5.72 (m, 2H), 4.66 (t, J=13.3 Hz, 2H), 1.42 (d, J=6.4 Hz, 6H), 1.40 (d, J=6.4, 6H).

Photoinitiator Example 7: tert-Butyl 2,2-bis(isopropoxycarbothioylsulfanyl)acetate

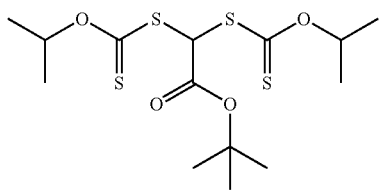 [SMILES: CC(C)OC(=S)SC(SC(=S)OC(C)C)C(=O)OC(C)(C)C]

A stirred solution of tert-butyl alcohol (3.30 grams, 44.6 mmol) in 50 mL of CH$_2$Cl$_2$ was treated with dichloroacetyl chloride (3.28 grams, 22.3 mmol, available from Thermo Fisher Scientific). The reaction mixture was refluxed under N$_2$ for 5 hours. The cooled reaction mixture was treated with 50 mL of 1N hydrochloric acid solution and the layers were separated. The aqueous portion was extracted with an additional 25 mL of CH$_2$Cl$_2$. The combined organic portions were washed successively with a saturated solution of NaHCO$_3$ and brine, dried over Na$_2$SO4 and concentrated under reduced pressure to give 1.85 grams of tert-butyl 2,2-dichloroacetate as a colorless liquid.

A solution of tert-butyl 2,2-dichloroacetate (1.85 grams, 10.0 mmol) dissolved in 50 mL of acetone was treated with potassium isopropyl xanthate (3.47 grams, 20.0 mmol) and the reaction mixture was stirred for 5 hours. The reaction mixture was filtered through a pad of silica gel topped with celite, rinsed with acetone, and the filtrate was concentrated to give a yellow oil. Purification by column chromatography (SiO$_2$, 10 volume percent CH$_2$Cl$_2$/hexanes to 50 volume percent CH$_2$Cl$_2$/hexanes) gave 1.77 grams of tert-butyl 2,2-bis(isopropoxycarbothioylsulfanypacetate as a yellow oil. $^1$H NMR (CDClhd 3, 500 MHz) δ 5.91 (s, 1H), 5.73 (m, 2H), 1.49 (s, 9H), 1.42 (d, J=6.0 Hz, 6H), 1.41 (d, J=6.0, 6H).

Photoinitiator Example 8: N,N-Dibutyl-2,2-bis(isopropoxycarbothioylsulfanyl)acetamide

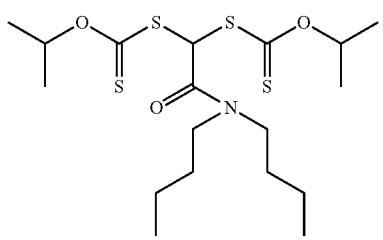 [SMILES: CCCCN(CCCC)C(=O)C(SC(=S)OC(C)C)SC(=S)OC(C)C]

A stirred solution of dibutylamine (8.77 grams, 68 mmol, available from Sigma-Aldrich Corporation) in 50 mL of CH$_2$Cl$_2$ was cooled to −20° C. Dichloroacetyl chloride (5.00 grams, 34 mmol) was added dropwise to the solution over a period of 30 minutes. The reaction mixture was allowed to warm to ambient temperature, concentrated under reduced pressure, and diluted with 100 mL of ethyl acetate. The mixture was washed with aqueous 0.1 M sulfuric acid. The organic phase was dried over MgSO$_4$, filtered, and concentrated under reduced pressure to give 7.08 grams of N,N-dibutyl-2,2-dichloroacetamide as a colorless liquid.

The N,N-dibutyl-2,2-dichloroacetamide (2.00 grams, 8.3 mmol) was dissolved in 75 mL of acetone and treated with potassium isopropyl xanthate (2.90 grams, 16.7 mmol). The mixture was stirred at room temperature for 56 hours, filtered, and concentrated under reduced pressure to give an oil. Purification by column chromatography (SiO$_2$, 9:1 hexanes/ethyl acetate) gave 1.11 grams of N,N-dibutyl-2,2-bis(isopropoxycarbothioylsulfanyl)acetamide as a yellow syrup. $^1$H NMR (CDCl$_3$, 500 MHz) δ 6.37 (s, 1H), 5.73 (m, 2H), 3.45-3.32 (m, 4H), 1.65-1.73 (m, 2H), 1.47-1.53 (m, 2H), 1.23-1.43 (m, 16H), 0.97-0.85 (m, 6H).

Photoinitiator Comparative Example A: Isopropyl [4-(isopropoxycarbothioylsulfanylmethyl)phenyl] methylsulfanyl-methanethioate (XDX)

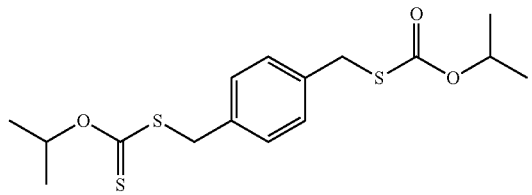 [SMILES: CC(C)OC(=O)SCc1ccc(CSC(=S)OC(C)C)cc1]

A solution of α,α'-dichloroxylene (3.50 grams, 20.0 mmol, available from Sigma-Aldrich Corporation) dissolved in 100 mL of acetone was treated with potassium isopropyl xanthate (6.96 grams, 40.0 mmol) and the reaction mixture was heated to 60° C. and stirred for 2 hours. The reaction mixture was filtered through a pad of silica gel topped with celite, rinsed with acetone, and the filtrate was concentrated to give a white solid. Crystallization from acetone gave 5.98 grams of O-isopropyl [4-(isopropoxycarbothioylsulfanylmethyl)phenyl]methylsulfanyl-methanethioate (XDX) as white crystals.

$^1$H NMR (CDCl$_3$, 500 MHz) δ 7.35 (s, 4H), 5.82 (m, 2H), 4.37 (s, 4H), 1.43 (d, J=6.3 Hz, 6H).

Photoinitiator Comparative Example B: 2-(2-Ethoxycarbothioylsulfanylacetyl)oxyethyl 2-ethoxycarbothioylsulfanylacetate

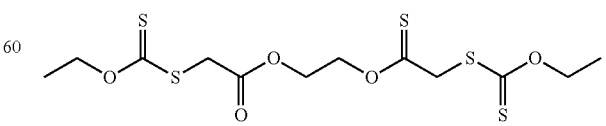

A solution of ethyleneglycol bis chloroacetate (4.01 grams, 18.6 mmol, available from TCI America) dissolved in 50 mL of acetone was treated with potassium ethyl xanthate (5.96 grams, 37.2 mmol, available from TCI America) and the reaction mixture was stirred for 30 minutes. The reaction mixture was filtered and the filtrate was concentrated to give a yellow oil. The yellow oil was dissolved in a small amount of $CH_2Cl_2$ and filtered through a pad of silica gel to give 5.79 grams of 2-(2-ethoxycarbothioylsulfanylacetyl)oxyethyl 2-ethoxycarbothioylsulfanylacetate as a light yellow liquid which solidified on standing. $^1$H NMR ($CDCl_3$, 500 MHz) δ 4.65 (q, J=7.1 Hz, 4H), 4.39 (s, 4H), 3.96 (s, 4H), 1.43 (t, J=7.1 Hz, 6H).

Photoinitiator Comparative Example C: Methyl 2-isopropoxycarbothioylsulfanylacetate

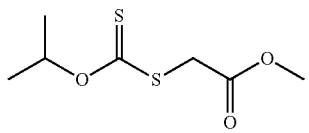

A solution of methyl chloroacetate (2.71 grams, 25.0 mmol, available from Sigma-Aldrich Corporation) dissolved in 20 mL of acetone was treated with potassium isopropyl xanthate (4.36 grams, 25.0 mmol) and the reaction mixture was stirred for 3 hours. The reaction mixture was filtered and the filtrate was concentrated to give 5.02 grams of methyl 2-isopropoxycarbothioylsulfanylacetate as a light yellow oil. $^1$H NMR ($CDCl_3$, 500 MHz) δ 5.73 (m, 1H), 4.90 (s, 2H), 3.77 (s, 3H), 1.39 (d, J=6.3 Hz, 6H).

Polymer Example 1 (Polymer EX 1)

A solution of 2-ethylhexyl acrylate (25.0 grams, 135 mmol, available from BASF Corporation, Charlotte, N.C.) and 0.137 grams (0.311 mmol) of 2-ethylhexyl 2,2-bis(isopropoxycarbothioylsulfanyl) acetate (Photoinitiator Example 4) in ethyl acetate (25 grams) was placed in a 250 mL 2-necked round bottom flask and degassed with a nitrogen stream for 15 minutes. The flask was then held under a positive pressure of nitrogen, stirred magnetically, and irradiated with a UV lamp (Sylvania F 15T8/BLB Blacklight Blue) placed 12.7 cm above the flask. The light intensity measured at a distance of 12.7 cm was 0.7 mW/cm2.

The probe of a ReactIR 15 in-situ infrared spectrometer (Mettler-Toledo Autochem, Redmond, Va.) was inserted into one neck of the flask and the tip of the IR probe was maintained below the surface of the reaction solution. The lamp was turned on and an infrared spectrum recorded every minute for the first hour, every 5 minutes for the next three hours, and 15 minutes thereafter. The percent monomer consumption was calculated by determining the peak height of the C=C stretching band at 1639 $cm^1$ defined from a two point baseline from 1650 $cm^{-1}$ to 1610 $cm^{-1}$. The weight percent monomer conversion was calculated as:

Wt % Monomer Conversion=100×(peak height/time zero peak height).

The times for conversion of 40 weight percent and 80 weight percent of the monomer to polymer are reported in Table 1. Physical samples were removed at intervals throughout the polymerization and molecular weights were determined by test method 1. In Table 2, the number average molecular weight ($M_n$), weight average molecular weight ($M_w$), and polydispersity index (PDI) for the polymer at different levels of monomer conversion (wt. %) are presented.

Polymer Comparative Example A (Polymer CEX A)

The same procedure as reported in Polymer Example 1 was followed with the exception that 0.117 grams (0.311 mmol) of XDX (Photoinitiator Comparative Example A) was used as the photoinitiator, instead of 2-ethylhexyl 2,2-bis(isopropoxycarbothioylsulfanyl)acetate (Photoinitiator Example 4). The results for time for conversion of 40 weight percent and 80 weight percent of the monomer to polymer are reported in Table 1. In Table 2, number average molecular weight ($M_n$), weight average molecular weight ($M_{wq}$), and polydispersity index (PDI) for the polymer at different levels of monomer conversion (wt. %) are presented.

TABLE 1

Time for Monomer Conversion (Polymers EX 1 and CEX A)

| | Time for 40 wt. % Monomer Conversion | Time for 80 wt. % Monomer Conversion |
|---|---|---|
| Polymer EX 1 | 0.3 hours | 1.2 hours |
| Polymer CEX A | 0.4 hours | 1.7 hours |

TABLE 2

Characterization of Polymers EX 1 and CEX A

| | Monomer Conversion (wt. %) | $M_n$ (g/mol) | $M_w$ (g/mol) | PDI |
|---|---|---|---|---|
| Polymer EX 1 | 10% | 11,000 | 21,600 | 2.0 |
| | 20% | 14,300 | 29,700 | 2.1 |
| | 40% | 25,200 | 54,600 | 2.2 |
| | 60% | 35,900 | 70,100 | 2.0 |
| | 95% | 50,200 | 92,300 | 1.8 |
| Polymer CEX A | 10% | 93,900 | 185,700 | 2.0 |
| | 20% | 88,000 | 175,400 | 2.0 |
| | 40% | 82,800 | 164,809 | 2.0 |
| | 60% | 76,500 | 133,100 | 1.7 |
| | 96% | 65,300 | 154,700 | 2.4 |

Polymer Example 2 (Polymer EX 2)

The same procedure as reported in Polymer Example 1 was followed with the exception that 0.146 grams (0.311 mmol) of 2-ethylhexyl 2,2-bis(diethylcarbamothioylsulfanyl)acetate (Photoinitiator Example 3) was used as the photoinitiator, instead of 2-ethylhexyl 2,2 bis(isopropoxycarbothioylsulfanyl)acetate (Photoinitiator Example 4). The results for time for conversion of 40 weight percent and 80 weight percent of the monomer to polymer are reported in Table 3. In Table 4, $M_n$, $M_w$, and PDI values for the polymer at different levels of monomer conversion (wt. %) are presented.

Polymer Comparative Example B (Polymer CEX B)

The same procedure as reported in Polymer Example 1 was followed with the exception that 0.125 grams (0.311 mmol) of p-xylenebis(N,N-diethyldithiocarbamate) (XDC, available from TCI America) was used as the photoinitiator, instead of 2-ethylhexyl 2,2-bis(isopropoxycarbothioylsulfanyl)acetate (Photoinitiator Example 4). The results for time for conversion of 40 weight percent and 80 weight percent of the monomer to polymer are reported in Table 3. In Table 4, $M_n$, $M_w$, and PDI values for the polymer at different levels of monomer conversion (wt. %) are presented.

TABLE 3

Time for Monomer Conversion (Polymers EX 2 and CEX B)

| | Time for 40 wt. % Monomer Conversion | Time for 80 wt. % Monomer Conversion |
|---|---|---|
| Polymer EX 2 | 1.8 hours | 8.2 hours |
| Polymer CEX B | 0.9 hours | 7.5 hours |

TABLE 4

Characterization of Polymers EX 2 and CEX B

| | Monomer Conversion (wt. %) | $M_n$ (g/mol) | $M_w$ (g/mol) | PDI |
|---|---|---|---|---|
| Polymer EX 2 | 10% | 52,400 | 102,000 | 1.9 |
| | 20% | 52,100 | 101,100 | 1.9 |
| | 40% | 50,700 | 97,900 | 1.9 |
| | 85% | 52,900 | 103,000 | 2.0 |
| Polymer CEX B | 10% | 224,000 | 498,100 | 2.2 |
| | 20% | 207,500 | 419,500 | 2.0 |
| | 40% | 124,600 | 302,100 | 2.4 |
| | 96% | 55,400 | 207,600 | 3.8 |

Polymer Example 3 (Polymer EX 3)

A solution of 2-ethylhexyl acrylate (25.0 grams, 135 mmol) and 0.137 grams (0.311 mmol) of 2-ethylhexyl 2,2-bis(isopropoxycarbothioylsulfanyl)acetate (Photoinitiator Example 4) in ethyl acetate (25 grams) was placed in a 250 mL 2-necked round bottom flask and degassed with a nitrogen stream for 15 minutes. The flask was then held under a positive pressure of nitrogen, stirred magnetically, and irradiated with a bank of water cooled LEDs (365 nm) placed 8.9 cm above the flask. The current was 4.5 amps corresponding to about 0.15 W/cm² output intensity.

The probe of a ReactIR 15 in-situ infrared spectrometer was inserted into one neck of the flask and the tip of the IR probe was maintained below the surface of the reaction solution. The flask was immersed in a water bath maintained at 10-12° C. The lamp was turned on and an infrared spectrum recorded every 30 seconds. The percent monomer consumption was calculated by determining the peak height of the C=C stretching band at 1639 cm$^{-1}$ defined from a two point baseline from 1650 cm$^{-1}$ to 1610 cm$^{-1}$. The weight percent monomer conversion was calculated as:

Wt % Monomer Conversion=100×(peak height/time zero peak height).

The times for conversion of 40 weight percent and 80 weight percent of the monomer to polymer are reported in Table 5. Physical samples were removed at intervals throughout the polymerization and molecular weights were determined by test method 1. In Table 6, the number average molecular weight ($M_n$), weight average molecular weight ($M_w$), and polydispersity index (PDI) for the polymer at different levels of monomer conversion (wt. %) are presented.

Polymer Example 4 (Polymer EX 4)

The same procedure as reported in Polymer Example 3 was followed with the exception that 0.108 grams (0.311 mmol) of methyl 2,2-bis(isopropoxycarbothioylsulfanyl)acetate (Photoinitiator Example 2) was used as the photoinitiator, instead of 2-ethylhexyl 2,2-bis(isopropoxycarbothioylsulfanyl)acetate (Photoinitiator Example 4). The results for time for conversion of 40 weight percent and 80 weight percent of the monomer to polymer are reported in Table 5. In Table 6, $M_n$, $M_w$, and PDI values for the polymer at different levels of monomer conversion (wt. %) are presented.

Polymer Example 5 (Polymer EX 5)

The same procedure as reported in Polymer Example 3 was followed with the exception that 0.153 grams (0.311 mmol) of 2,2,3,3,4,4,4-heptafluorobutyl 2,2-bis(isopropoxycarbothioylsulfanyl)acetate (Photoinitiator Example 6) was used as the photoinitiator, instead of 2-ethylhexyl 2,2-bis(isopropoxycarbothioylsulfanyl)acetate (Photoinitiator Example 4). The results for time for conversion of 40 weight percent and 80 weight percent of the monomer to polymer are reported in Table 5. In Table 6, $M_n$, $M_w$, and PDI values for the polymer at different levels of monomer conversion (wt. %) are presented.

Polymer Comparative Example C (Polymer CEX C)

The same procedure as reported in Polymer Example 3 was followed with the exception that 0.117 grams (0.311 mmol) of XDX (Photoinitiator Comparative Example A) was used as the photoinitiator, instead of 2-ethylhexyl 2,2-bis(isopropoxycarbothioylsulfanyl)acetate (Photoinitiator Example 4). The results for time for conversion of 40 weight percent and 80 weight percent of the monomer to polymer are reported in Table 5. In Table 7, $M_n$, $M_w$, and PDI values for the polymer at different levels of monomer conversion (wt. %) are presented.

Polymer Comparative Example D (Polymer CEX D)

The same procedure as reported in Polymer Example 3 was followed with the exception that 0.117 grams (0.311 mmol) of 2-(2-ethoxycarbothioylsulfanylacetyl)oxyethyl 2-ethoxycarbothioylsulfanylacetate (Photoinitiator Comparative Example B) was used as the photoinitiator, instead of 2-ethylhexyl 2,2-bis(isopropoxycarbothioylsulfanyl)acetate (Photoinitiator Example 4). The results for time for conversion of 40 weight percent and 80 weight percent of the monomer to polymer are reported in Table 5. In Table 7, $M_n$, $M_w$, and PDI values for the polymer at different levels of monomer conversion (wt. %) are presented.

Polymer Comparative Example E (Polymer CEX E)

The same procedure as reported in Polymer Example 3 was followed with the exception that 0.065 grams (0.311 mmol) of methyl 2-isopropoxycarbothioylsulfanylacetate (Photoinitiator Comparative Example C) was used as the photoinitiator, instead of 2-ethylhexyl 2,2-bis(isopropoxycarbothioylsulfanyl)acetate (Photoinitiator Example 4). The results for time for conversion of 40 weight percent and 80 weight percent of the monomer to polymer are reported in Table 5. In Table 7, $M_n$, $M_w$, and PDI values for the polymer at different levels of monomer conversion (wt. %) are presented.

TABLE 5

Time for Monomer Conversion (Polymers EX 3-5 and CEX C-E)

| | Time for 40 wt. % Monomer Conversion | Time for 80 wt. % Monomer Conversion |
|---|---|---|
| Polymer EX 3 | 2.7 minutes | 7.7 minutes |
| Polymer EX 4 | 2.5 minutes | 8.0 minutes |
| Polymer EX 5 | 2.5 minutes | 8.0 minutes |
| Polymer CEX C | 2.5 minutes | 11.0 minutes |
| Polymer CEX D | 3.0 minutes | 12.0 minutes |
| Polymer CEX E | 3.25 minutes | 16 minutes |

TABLE 6

Characterization of Polymers EX 3-5

| | Monomer Conversion (wt. %) | $M_n$ (g/mol) | $M_w$ (g/mol) | PDI |
|---|---|---|---|---|
| Polymer EX 3 | 20% | 12,700 | 25,000 | 2.0 |
| | 30% | 17,700 | 38,200 | 2.2 |
| | 48% | 26,000 | 53,100 | 2.0 |
| | 72% | 35,300 | 68,200 | 1.9 |
| | 83% | 36,100 | 73,400 | 2.0 |
| | 92% | 33,500 | 75,800 | 2.3 |
| | 94% | 31,200 | 75,700 | 2.4 |
| Polymer EX 4 | 23% | 9,800 | 20,200 | 2.1 |
| | 35% | 19,100 | 43,600 | 2.3 |
| | 54% | 26,000 | 58,200 | 2.2 |
| | 64% | 31,200 | 66,200 | 2.1 |
| | 80% | 35,300 | 75,400 | 2.1 |
| | 90% | 35,600 | 77,700 | 2.2 |
| | 94% | 32,000 | 77,600 | 2.4 |
| Polymer EX 5 | 22% | 12,100 | 24,700 | 2.1 |
| | 35% | 17,800 | 40,300 | 2.3 |
| | 45% | 25,800 | 57,700 | 2.2 |
| | 68% | 32,700 | 69,000 | 2.1 |
| | 81% | 37,100 | 77,200 | 2.1 |
| | 91% | 35,600 | 79,900 | 2.3 |
| | 95% | 32,000 | 79,700 | 2.5 |

TABLE 7

Characterization of Polymers CEX C to CEX E

| | Monomer Conversion (wt. %) | $M_n$ (g/mol) | $M_w$ (g/mol) | PDI |
|---|---|---|---|---|
| Polymer CEX C | 20% | 57,700 | 113,600 | 2.0 |
| | 40% | 55,400 | 108,100 | 2.0 |
| | 50% | 51,100 | 105,400 | 2.1 |
| | 60% | 46,100 | 102,200 | 2.2 |
| | 84% | 41,900 | 102,600 | 2.5 |
| | 95% | 32,700 | 100,200 | 3.1 |
| Polymer CEX D | 25% | 145,300 | 248,000 | 2.0 |
| | 55% | 99,300 | 244,200 | 2.5 |
| | 69% | 82,500 | 228,700 | 2.8 |
| | 80% | 59,800 | 203,300 | 3.9 |
| | 88% | 43,200 | 191,800 | 4.4 |
| Polymer CEX E | 23% | 228,500 | 454,400 | 2.0 |
| | 42% | 221,800 | 434,600 | 2.0 |
| | 58% | 181281 | 396,408 | 2.19 |
| | 90% | 64,056 | 264,459 | 4.13 |

Polymer Example 6 (Polymer EX 6)

The same procedure as reported in Polymer Example 3 was followed with the exception that 0.147 grams (0.311 mmol) of 2-ethylhexyl 2,2-bis(diethylcarbamothioylsulfanyl)acetate (Photoinitiator Example 3) was used as the photoinitiator, instead of 2-ethylhexyl 2,2-bis(isopropoxycarbothioylsulfanyl)acetate (Photoinitiator Example 4). The results for time for conversion of 40 weight percent and 80 weight percent of the monomer to polymer are reported in Table 8. In Table 9, $M_n$, $M_w$, and PDI values for the polymer at different levels of monomer conversion (wt. %) are presented.

Polymer Comparative Example F (Polymer CEX F)

The same procedure as reported in Polymer Example 3 was followed with the exception that 0.126 grams (0.311 mmol) of p-xylenebis(N,N-diethyldithiocarbamate) (XDC) was used as the photoinitiator, instead of 2-ethylhexyl 2,2-bis(isopropoxycarbothioylsulfanyl)acetate (Photoinitiator Example 4). The results for time for conversion of 40 weight percent and 80 weight percent of the monomer to polymer are reported in Table 8. In Table 9, $M_n$, $M_w$, and PDI values for the polymer at different levels of monomer conversion (wt. %) are presented.

TABLE 8

Time for Monomer Conversion (Polymers EX 6 and CEX F)

| | Time for 40 wt. % Monomer Conversion | Time for 80 wt. % Monomer Conversion |
|---|---|---|
| Polymer EX 6 | 7.5 minutes | 43 minutes |
| Polymer CEX F | 6.5 minutes | 48 minutes |

TABLE 9

Characterization of Polymers EX 6 and CEX F

| | Monomer Conversion (wt. %) | $M_n$ (g/mol) | $M_w$ (g/mol) | PDI |
|---|---|---|---|---|
| Polymer EX 6 | 21% | 21,700 | 42,300 | 2.0 |
| | 40% | 29,000 | 52,000 | 1.8 |
| | 60% | 40,200 | 64,500 | 1.6 |
| | 80% | 51,800 | 77,800 | 1.5 |
| | 94% | 62,700 | 93,300 | 1.5 |
| Polymer CEX F | 25% | 24,400 | 49,000 | 2.0 |
| | 40% | 31,800 | 56,400 | 1.8 |
| | 60% | 41,500 | 67,300 | 1.6 |
| | 80% | 53,800 | 79,400 | 1.5 |
| | 94% | 64,800 | 94,200 | 1.5 |

Polymer Example 7 (Polymer EX 7)

A solution of 2,2,3,3,4,4,4-heptafluorobutyl methacrylate (25.5 grams, 95 mmol, available from Sigma-Aldrich Corporation, St. Louis, Mo.) and 0.117 grams (0.229 mmol) of 2,2,3,3,4,4,4-heptafluorobutyl 2,2-bis(isopropoxycarbothioylsulfanyl)acetate (Photoinitiator Example 6) in ethyl acetate (18 grams) was placed in a 250 mL 2-necked round bottom flask and degassed with a nitrogen stream for 15 minutes. The flask was then held under a positive pressure of nitrogen, stirred magnetically, and irradiated with a blank of water cooled LEDs (365 nm) placed 8.9 cm above the flask. The output current was 4.5 amps corresponding to about 0.15 W/cm$^2$ output intensity.

The probe of a ReactIR 15 in-situ infrared spectrometer was inserted into one neck of the flask and the tip of the IR probe was maintained below the surface of the reaction solution. The flask was immersed in a water bath maintained at 10-12° C. The lamp was turned on and an infrared spectrum recorded every 30 seconds. The percent monomer consumption was calculated by determining the peak height of the C=C stretching band at 1639 cm$^{-1}$ defined from a two point baseline from 1650 cm$^{-1}$ to 1610 cm$^{-1}$. The weight percent monomer conversion was calculated as:

Wt % Monomer Conversion=100×(peak height/time zero peak height).

Physical samples were removed at intervals throughout the polymerization and molecular weights were determined test method 1. In Table 10, the number average molecular weight ($M_n$), weight average molecular weight ($M_w$), and polydispersity index (PDI) for the polymer at different levels of monomer conversion (wt. %) are presented.

TABLE 10

Characterization of Polymer EX 7

| | Monomer Conversion (wt. %) | $M_n$ (g/mol) | $M_w$ (g/mol) | PDI |
|---|---|---|---|---|
| Polymer EX 7 | 2% | 3,100 | 4,400 | 1.4 |
| | 10% | 4,700 | 7,200 | 1.5 |
| | 20% | 6,100 | 11,100 | 1.8 |

Polymer Example 8 (Polymer EX 8)

2-Ethylhexyl acrylate (22.5 grams, available from BASF Corporation), 2-(2-ethoxy)ethyl acrylate (2.5 grams, available from Polysciences Inc., Warrington, Pa.), ethyl acetate (25 grams) and 2-ethylhexyl 2,2-bis(isopropoxycarbothioylsulfanyl)acetate (0.125 grams, Photoinitiator Example 4) were added to a glass vial. A plastic cap, which was equipped with two needles to provide an inlet and an outlet, was attached to the vial. Nitrogen gas was added through the needle and bubbled through the mixture for 15 minutes. The needles were then removed and the holes in the cap were plugged. The vial was placed on a roller mixer and irradiated for 15 hours using a UV lamp (Sylvania F40/350BL black light) placed 10 cm above the vial. The light intensity measured at a distance of 10 cm was 1.25 mW/cm2.

A portion of the polymerization product mixture (7.2 grams) was removed from the vial and further purified by the following procedure. The polymerization product mixture sample was added with continued stirring to a flask containing methanol (100 mL). The methanol was then decanted from the polymer precipitate and the precipitate was washed with a 50 mL portion of methanol. The washed polymer was dissolved in ethyl acetate (15 mL) and re-precipitated by adding methanol (100 mL). After decanting the methanol, the polymer was washed two times with 50 mL portions of methanol. The polymer was then dried for about 15 hours at room temperature and under vacuum. The molecular weight ($M_w$) of the resulting purified polymer was determined with test method 1. The molecular weight and polydispersity values are reported in Table 11.

Polymer Example 9 (Polymer EX 9)

The same procedure for polymer formation as described in Polymer Example 8 was followed with the exception that the monomer 2-(2-ethoxy)ethyl acrylate (2.5 grams) was replaced with the monomer N-methyl-perfluorobutanesulfonylethyl acrylate (2.5 grams, CAS Number 67584-55-8, prepared according to the procedure described in Example 2 of U.S. Pat. No. 7,417,099). The molecular weight and polydispersity values for the purified polymer product are reported in Table 11.

Polymer Example 10 (Polymer EX 10)

The same procedure for polymer formation as described in Polymer Example 8 was followed with the exception that the monomer 2-(2-ethoxy)ethyl acrylate (2.5 grams) was replaced with the monomer 2-hydroxyethyl acrylate (2.5 grams, available from BASF Corporation). The molecular weight and polydispersity values for the purified polymer product are reported in Table 11.

Polymer Example 11 (Polymer EX 11)

The same procedure for polymer formation as described in Polymer Example 8 was followed with the exception that the monomer 2-(2-ethoxy)ethyl acrylate (2.5 grams) was replaced with the monomer N,N-dimethyl acrylamide (2.5 grams, available from Sigma-Aldrich Corporation). The molecular weight and polydispersity values for the purified polymer product are reported in Table 11.

Polymer Example 12 (Polymer EX 12)

The same procedure for polymer formation as described in Polymer Example 8 was followed with the exception that the monomer 2-(2-ethoxy)ethyl acrylate (2.5 grams) was replaced with the monomer 2-(dimethylamino)ethyl acrylate (2.5 grams, available from Thermo Fisher Scientific). The molecular weight and polydispersity values for the purified polymer product are reported in Table 11.

TABLE 11

Characterization of Polymers EX 8-12

| | $M_w$ (g/mol) | PDI |
|---|---|---|
| Polymer EX 8 | 141,700 | 2.0 |
| Polymer EX 9 | 111,800 | 1.8 |
| Polymer EX 10 | 133,100 | 1.8 |
| Polymer EX 11 | 124,000 | 1.7 |
| Polymer EX 12 | 96,100 | 1.9 |

Polymer Example 13 (Polymer EX 13)

A 10.0 gram portion of the polymerization product mixture from Example 8 (i.e. polymer product recovered before the reported purification procedure), isobornyl acrylate (5.0 grams, available from Sartomer, Exton, Pa.), and ethyl acetate (15.0 grams) were added to a glass vial. A plastic cap, which was equipped with two needles to provide an inlet and an outlet, was attached to the vial. Nitrogen gas was added through the needle and bubbled through the mixture for 15 minutes. The needles were then removed and the holes in the cap were plugged. The vial was placed on a roller mixer and irradiated for 15 hours using a UV lamp (Sylvania F40/350BL black light) placed 10 cm above the vial. The light intensity measured at a distance of 10 cm was 1.25 mW/cm2.

The molecular weight ($M_w$) of the resulting block copolymer (A-B-A) was determined with test method 1. The molecular weight and polydispersity values are reported in Table 12.

Polymer Example 14 (Polymer EX 14)

The same procedure for polymer formation as described in Polymer Example 13 was followed with the exception that a 10.0 gram portion of the polymerization product mixture from Example 9 (i.e. polymer product recovered before the reported purification procedure) was used as a reactant instead of the polymerization product of Example 8. The molecular weight and polydispersity values for the block copolymer (A-B-A) are reported in Table 12.

Polymer Example 15 (Polymer EX 15)

The same procedure for polymer formation as described in Polymer Example 13 was followed with the exception that a 10.0 gram portion of the polymerization product mixture from Example 10 (i.e. polymer product recovered before the reported purification procedure) was used as a reactant instead of the polymerization product of Example 8. The molecular weight and polydispersity values for the block copolymer (A-B-A) are reported in Table 12.

Polymer Example 16 (Polymer EX 16)

The same procedure for polymer formation as described in Polymer Example 13 was followed with the exception that a 10.0 gram portion of the polymerization product mixture from Example 11 (i.e. polymer product recovered before the reported purification procedure) was used as a reactant instead of the polymerization product of Example 8. The molecular weight and polydispersity values for the block copolymer (A-B-A) are reported in Table 12.

Polymer Example 17 (Polymer EX 17)

The same procedure for polymer formation as described in Polymer Example 13 was followed with the exception that a 10.0 gram portion of the polymerization product mixture from Example 12 (i.e. polymer product recovered before the reported purification procedure) was used as a reactant instead of the polymerization product of Example 8. The molecular weight and polydispersity values for the block copolymer (A-B-A) are reported in Table 12.

TABLE 12

Characterization of Polymers EX 13-17

|  | $M_w$ (g/mol) | PDI |
|---|---|---|
| Polymer EX 13 | 184,300 | 2.8 |
| Polymer EX 14 | 145,000 | 3.2 |
| Polymer EX 15 | 174,000 | 2.8 |
| Polymer EX 16 | 174,000 | 2.7 |
| Polymer EX 17 | 148,000 | 2.4 |

Polymer Example 18 (Polymer EX 18)

A 0.5 gram portion of the purified polymer from Example 8 (i.e. polymer product recovered after the reported purification procedure), isobornyl acrylate (2.0 grams), and ethyl acetate (8.0 grams) were added to a glass vial. A plastic cap, which was equipped with two needles to provide an inlet and an outlet, was attached to the vial. Nitrogen gas was added through the needle and bubbled through the mixture for 15 minutes. The needles were then removed and the holes in the cap were plugged. The vial was placed on a roller mixer and irradiated for 3 hours using a UV lamp (Sylvania F40/350BL black light) placed 10 cm above the vial. The light intensity measured at a distance of 10 cm was 1.25 mW/cm2.

The molecular weight ($M_w$) of the resulting block copolymer (A-B-A) was determined with test method 1. The molecular weight and polydispersity values are reported in Table 13.

Polymer Example 19 (Polymer EX 19)

The same procedure for polymer formation as described in Polymer Example 18 was followed with the exception that a 0.5 gram portion of the purified polymer from Example 9 (i.e. polymer product recovered after the reported purification procedure) was used as a reactant instead of the purified polymer of Example 8. The molecular weight and polydispersity values for the block copolymer (A-B-A) are reported in Table 13.

Polymer Example 20 (Polymer EX 20)

The same procedure for polymer formation as described in Polymer Example 18 was followed with the exception that a 0.5 gram portion of the purified polymer from Example 11 (i.e. polymer product recovered after the reported purification procedure) was used as a reactant instead of the purified polymer of Example 8. The molecular weight and polydispersity values for the block copolymer (A-B-A) are reported in Table 13.

TABLE 13

Characterization of Polymers EX 18-20

|  | $M_w$ (g/mol) | PDI |
|---|---|---|
| Polymer EX 18 | 367,800 | 2.4 |
| Polymer EX 19 | 340,900 | 2.3 |
| Polymer EX 20 | 348,000 | 2.4 |

Polymer Example 21 (Polymer EX 21)

A 10.0 gram portion of the polymerization product mixture from Example 11 (i.e. polymer product recovered before the reported purification procedure), acrylic acid (0.05 grams, available from Thermo Fisher Scientific), 2-ethylhexyl acrylate (4.96 grams) and ethyl acetate (15.0 grams) were added to a glass vial. A plastic cap, which was equipped with two needles to provide an inlet and an outlet, was attached to the vial. Nitrogen gas was added through the needle and bubbled through the mixture for 15 minutes. The needles were then removed and the holes in the cap were plugged. The vial was placed on a roller mixer and irradiated for 15 hours using a UV lamp (Sylvania F40/350BL black light) placed 10 cm above the vial. The light intensity measured at a distance of 10 cm was 1.25 mW.

The molecular weight ($M_w$) of the resulting block copolymer (A-B-A) was determined with test method 1. The molecular weight and polydispersity values are reported in Table 14.

Polymer Example 22 (Polymer EX 22)

A 9.0 gram portion of the polymerization product mixture from Example 12 (i.e. polymer product recovered before the reported purification procedure), acrylic acid (0.045 grams, available from Thermo Fisher Scientific), 2-ethylhexyl acrylate (4.46 grams) and ethyl acetate (13.5 grams) were added to a glass vial. A plastic cap, which was equipped with two needles to provide an inlet and an outlet, was attached to the vial. Nitrogen gas was added through the needle and bubbled through the mixture for 15 minutes. The needles were then removed and the holes in the cap were plugged. The vial was placed on a roller mixer and irradiated for 15 hours using a UV lamp (Sylvania F40/350BL black light) placed 10 cm above the vial. The light intensity measured at a distance of 10 cm was 1.25 mW/cm2.

The molecular weight ($M_w$) of the resulting block copolymer (A-B-A) was determined with test method 1. The molecular weight and polydispersity values are reported in Table 14.

TABLE 14

Characterization of Polymers EX 21-22

| | $M_w$ (g/mol) | PDI |
|---|---|---|
| Polymer EX 21 | 189,200 | 2.3 |
| Polymer EX 22 | 153,600 | 2.3 |

Polymer Example 23 (Polymer EX 23)

2-ethylhexyl acrylate (25.0 grams, available from BASF Corporation), ethyl acetate (25 grams) and 2-ethylhexyl 2,2-bis(isopropoxycarbothioylsulfanyl)acetate (0.126 grams, Photoinitiator Example 4) were added to a glass vial. A plastic cap, which was equipped with two needles to provide an inlet and an outlet, was attached to the vial. Nitrogen gas was added through the needle and bubbled through the mixture for 15 minutes. The needles were then removed and the holes in the cap were plugged. The vial was placed on a roller mixer and irradiated for 40 minutes using a UV lamp (Sylvania F40/350BL black light) placed 10 cm above the vial. The light intensity measured at a distance of 10 cm was 1.25 mW/cm2.

The molecular weight ($M_w$) of the resulting polymer was determined with test method 1. The molecular weight and polydispersity values are reported in Table 15.

Polymer Example 24 (Polymer EX 24)

A 10.0 gram portion of the polymerization product mixture from Example 23 and isobornyl acrylate (0.1 grams) were added to a glass vial. A plastic cap, which was equipped with two needles to provide an inlet and an outlet, was attached to the vial. Nitrogen gas was added through the needle and bubbled through the mixture for 15 minutes. The needles were then removed and the holes in the cap were plugged. The vial was placed on a roller mixer and irradiated for 2 hours using a UV lamp (Sylvania F40/350BL black light) placed 10 cm above the vial. The light intensity measured at a distance of 10 cm was 1.25 mW/cm2.

The molecular weight ($M_w$) of the resulting block copolymer (A-B-A) was determined with test method 1. The molecular weight and polydispersity values are reported in Table 15.

Polymer Example 25 (Polymer EX 25)

The same procedure for polymer formation as described in Polymer Example 24 was followed with the exception that the monomer isobornyl acrylate (0.1 grams) was replaced with the monomer 2-hydroxyethyl acrylate (0.10 grams). The molecular weight and polydispersity values for the block copolymer (A-B-A) are reported in Table 15.

Polymer Example 26 (Polymer EX 26)

The same procedure for polymer formation as described in Polymer Example 24 was followed with the exception that the monomer isobornyl acrylate (0.1 grams) was replaced with the monomer acrylic acid (0.11 grams). The molecular weight and polydispersity values for the block copolymer (A-B-A) are reported in Table 15.

Polymer Example 27 (Polymer EX 27)

The same procedure for polymer formation as described in Polymer Example 24 was followed with the exception that the monomer isobornyl acrylate (0.1 grams) was replaced with the monomer 4-hydroxybutyl acrylate glycidyl ether (0.11 grams, available from Nippon Kasei Chemical Company, Tokyo, Japan). The molecular weight and polydispersity values for the block copolymer (A-B-A) are reported in Table 15.

Polymer Example 28 (Polymer EX 28)

A 4.80 gram portion of the polymerization product mixture from Example 26 and isobornyl acrylate (2.51 grams) were added to a glass vial. A plastic cap, which was equipped with two needles to provide an inlet and an outlet, was attached to the vial. Nitrogen gas was added through the needle and bubbled through the mixture for 15 minutes. The needles were then removed and the holes in the cap were plugged. The vial was placed on a roller mixer and irradiated for 2 hours using a UV lamp (Sylvania F40/350BL black light) placed 10 cm above the vial. The light intensity measured at a distance of 10 cm was 1.25 mW/cm2.

The molecular weight ($M_w$) of the resulting block copolymer (C-A-B-A-C) was determined with test method 1. The molecular weight and polydispersity values are reported in Table 15.

TABLE 15

Characterization of Polymers EX 23-28

| | $M_w$ (g/mol) | PDI |
|---|---|---|
| Polymer EX 23 | 94,400 | 1.9 |
| Polymer EX 24 | 106,900 | 1.7 |
| Polymer EX 25 | 108,400 | 1.7 |
| Polymer EX 26 | 112,500 | 1.8 |
| Polymer EX 27 | 109,800 | 1.7 |
| Polymer EX 28 | 156,600 | 2.0 |

Polymer Example 29 (Polymer EX 29)

2-ethylhexyl acrylate (95 grams, available from BASF Corporation), acrylic acid (5 grams, available from Thermo Fisher Scientific), ethyl acetate (100 grams), and 2-ethylhexyl 2,2-bis(diethylcarbamothioylsulfanyl)acetate (0.78 grams, Photoinitiator Example 3) were added to a 500 mL glass bottle. A plastic cap with an inlet and an outlet port was attached to the vial. A plastic needle was inserted through the inlet port and into the mixture. Nitrogen gas was added through the needle and bubbled through the mixture for 15 minutes. The cap and needle assembly was then removed and replaced with a solid cap that sealed the bottle. The bottle was placed on a roller mixer and irradiated for 24 hours using a UV lamp (Sylvania F40/350BL black light) placed 10 cm above the vial. The light intensity measured at a distance of 10 cm was 1.25 mW/cm2.

An aliquot of the polymerization product was dried in an oven at 120° C. for 2 hours. The molecular weight ($M_w$) of the resulting polymer was determined with test method 1. The molecular weight and polydispersity values are reported in Table 16.

Polymer Example 30 (Polymer EX 30)

The same procedure for polymer formation as described in Polymer Example 29 was followed with the exception that only 0.47 grams of 2-ethylhexyl 2,2-bis(diethylcarbamothioylsulfanyl)acetate (Photoinitiator Example 3) was used. The molecular weight and polydispersity values for the polymer product are reported in Table 16.

Polymer Example 31 (Polymer EX 31)

The same procedure for polymer formation as described in Polymer Example 29 was followed with the exception that only 0.31 grams of 2-ethylhexyl 2,2-bis(diethylcarbamothioylsulfanyl)acetate (Photoinitiator Example 3) was used and the amount of ethyl acetate used was 150 grams. The molecular weight and polydispersity values for the polymer product are reported in Table 16.

TABLE 16

Characterization of Polymers EX 29-31

| | $M_w$ (g/mol) | PDI |
|---|---|---|
| Polymer Ex 29 | 54,000 | 1.7 |
| Polymer EX 30 | 74,000 | 1.8 |
| Polymer EX 31 | 114,000 | 1.6 |

Polymer Example 32 (Polymer EX 32)

A 40 gram portion of the polymerization product mixture from Example 29, methyl methacrylate (3 grams, available from Sigma-Aldrich Corporation), and ethyl acetate (3 grams) were added to a 100 mL glass bottle. A plastic cap with an inlet and an outlet port was attached to the vial. A plastic needle was inserted through the inlet port and into the mixture. Nitrogen gas was added through the needle and bubbled through the mixture for 15 minutes. The cap and needle assembly was then removed and replaced with a solid cap that sealed the bottle. The bottle was placed on a roller mixer and irradiated for 14 hours using a UV lamp (Sylvania F40/350BL black light) placed 10 cm above the vial. The light intensity measured at a distance of 10 cm was 1.25 mW/cm2.

An aliquot of the polymerization product was dried in an oven at 120° C. for 2 hours. The molecular weight ($M_w$) of the resulting block copolymer (A-B-A) was determined with test method 1. The molecular weight and polydispersity values are reported in Table 17.

Polymer Example 33 (Polymer EX 33)

The same procedure for polymer formation as described in Polymer Example 29 was followed with the exception that 6 grams of methyl methacrylate was used and the amount of ethyl acetate used was 6 grams. The molecular weight and polydispersity values for the block copolymer product (A-B-A) are reported in Table 17.

Polymer Example 34 (Polymer EX 34)

The same procedure for polymer formation as described in Polymer Example 29 was followed with the exception that 9 grams of methyl methacrylate was used and the amount of ethyl acetate used was 9 grams. The molecular weight and polydispersity values for the block copolymer product (A-B-A) are reported in Table 17.

Polymer Example 35 (Polymer EX 35)

The same procedure for polymer formation as described in Polymer Example 29 was followed with the exception that 12 grams of methyl methacrylate was used and the amount of ethyl acetate used was 12 grams. The molecular weight and polydispersity values for the block copolymer product (A-B-A) are reported in Table 17.

TABLE 17

Characterization of Polymers EX 29 and EX 32-35

| | $M_w$ (g/mol) | PDI |
|---|---|---|
| Polymer EX 29 | 54,000 | 1.7 |
| Polymer EX 32 | 57,000 | 1.9 |
| Polymer EX 33 | 59,000 | 1.8 |
| Polymer EX 34 | 60,500 | 1.8 |
| Polymer EX 35 | 63,000 | 1.8 |

Polymer Example 36 (Polymer EX 36)

A 40 gram portion of the polymerization product mixture from Example 30, methyl methacrylate (6 grams), and ethyl acetate (6 grams) were added to a 100 mL glass bottle. A plastic cap with an inlet and an outlet port was attached to the vial. A plastic needle was inserted through the inlet port and into the mixture. Nitrogen gas was added through the needle and bubbled through the mixture for 15 minutes. The cap and needle assembly was then removed and replaced with a solid cap that sealed the bottle. The bottle was placed on a roller mixer and irradiated for 14 hours using a UV lamp (Sylvania F40/350BL black light) placed 10 cm above the vial. The light intensity measured at a distance of 10 cm was 1.25 mW/cm2.

An aliquot of the polymerization product was dried in an oven at 120° C. for 2 hours. The molecular weight ($M_w$) of the resulting block copolymer (A-B-A) was determined with test method 1. The molecular weight and polydispersity values are reported in Table 18.

Polymer Example 37 (Polymer EX 37)

The same procedure for polymer formation as described in Polymer Example 36 was followed with the exception that 9 grams of methyl methacrylate was used and the amount of ethyl acetate used was 9 grams. The molecular weight and polydispersity values for the block copolymer product (A-B-A) are reported in Table 18.

Polymer Example 38 (Polymer EX 38)

The same procedure for polymer formation as described in Polymer Example 36 was followed with the exception that 12 grams of methyl methacrylate was used and the amount of ethyl acetate used was 12 grams. The molecular weight and polydispersity values for the block copolymer product (A-B-A) are reported in Table 18.

TABLE 18

Characterization of Polymers EX 30 and EX 36-38

| | $M_w$ (g/mol) | PDI |
|---|---|---|
| Polymer EX 30 | 74,000 | 1.8 |
| Polymer EX 36 | 80,000 | 1.8 |
| Polymer EX 37 | 86,000 | 1.7 |
| Polymer EX 38 | 103,000 | 1.8 |

Polymer Example 39 (Polymer EX 39)

A 40 gram portion of the polymerization product mixture from Example 31, methyl methacrylate (9 grams), and ethyl acetate (9 grams) were added to a 100 mL glass bottle. A plastic cap with an inlet and an outlet port was attached to the vial. A plastic needle was inserted through the inlet port and into the mixture. Nitrogen gas was added through the needle and bubbled through the mixture for 15 minutes. The cap and needle assembly was then removed and replaced with a solid cap that sealed the bottle. The bottle was placed on a roller mixer and irradiated for 14 hours using a UV lamp (Sylvania F40/350BL black light) placed 10 cm above the vial. The light intensity measured at a distance of 10 cm was 1.25 mW/cm2.

An aliquot of the polymerization product was dried in an oven at 120° C. for 2 hours. The molecular weight ($M_w$) of the resulting block copolymer (A-B-A) was determined with test method 1. The molecular weight and polydispersity values are reported in Table 19.

TABLE 19

Characterization of Polymers EX 31 and EX 39

| | $M_w$ (g/mol) | PDI |
|---|---|---|
| Polymer EX 31 | 114,000 | 1.6 |
| Polymer EX 39 | 122,000 | 1.7 |

Polymer Example 40 (Polymer EX 40)

A solution of 2-ethylhexyl acrylate (25.0 grams, 135 mmol) and 0.137 grams (0.311 mmol) of N,N-dibutyl-2,2-bis(isopropoxycarbothioylsulfanyl)acetamide (Photoinitiator Example 8) in ethyl acetate (25 grams) was placed in a 250 mL 2-necked round bottom flask and degassed with a nitrogen stream for 15 minutes. The flask was then held under a positive pressure of nitrogen, stirred magnetically, and irradiated with a blank of water cooled LEDs (365 nm) placed 8.9 cm above the flask. The output current was 4.5 amps corresponding to about 0.15 W/cm² output intensity.

The probe of a ReactIR 15 in-situ infrared spectrometer was inserted into one neck of the flask and the tip of the IR probe was maintained below the surface of the reaction solution. The flask was immersed in a water bath maintained at 10-12° C. The lamp was turned on and an infrared spectrum recorded every 15 seconds. The percent monomer consumption was calculated by determining the peak height of the C=C stretching band at 1639 cm$^{-1}$ defined from a two point baseline from 1650 cm$^{-1}$ to 1610 cm$^{-1}$. The weight percent monomer conversion was calculated as:

Wt % Monomer Conversion=100×(peak height/time zero peak height).

The times for conversion of 40 weight percent and 80 weight percent of the monomer to polymer are reported in Table 20. Physical samples were removed at intervals throughout the polymerization and molecular weights determined by test method 1. In Table 21, the number average molecular weight ($M_n$), weight average molecular weight ($M_w$), and polydispersity values for the polymer at different levels of monomer conversion (wt. %) are presented.

TABLE 20

Time for Monomer Conversion (Polymer EX 40)

| | Time for 40 wt. % Monomer Conversion | Time for 80 wt. % Monomer Conversion |
|---|---|---|
| Polymer EX 40 | 2.5 minutes | 9.0 minutes |

TABLE 21

Characterization of Polymer EX 40

| | Monomer Conversion (wt. %) | $M_n$ (g/mol) | $M_w$ (g/mol) | PDI |
|---|---|---|---|---|
| Polymer EX 40 | 12% | 10,300 | 18,300 | 1.8 |
| | 16% | 12,600 | 24,000 | 1.9 |
| | 50% | 27,800 | 59,300 | 2.1 |
| | 63% | 36,200 | 74,300 | 2.1 |
| | 77% | 43,100 | 83,800 | 1.9 |
| | 83% | 43,400 | 86,400 | 2.0 |
| | 92% | 41,500 | 90,100 | 2.2 |
| | 95% | 39,000 | 89,200 | 2.3 |

Polymer Comparative Example G (Polymer CEX G)

A solution of neat butyl acrylate (BA) (50.0 grams, 390mmol) and 0.570 grams (1.423 mmol) of p-xylene bis(N,N-diethyldithiocarbamate) (XDC, available from TCI America) was mixed then aliquoted into individual vials. The vials were purged with nitrogen and then sealed. The vials were irradiated with a UV lamp (Sylvania F15T8/BLB Blacklight Blue) placed 12.7 cm above the vials. The light intensity measured at a distance of 12.7 cm was 0.7 mW/cm2. Vials were removed at different times for analysis by Nuclear Magnetic Resonance (NMR) spectroscopy.

Approximately 50-100 milligrams of the polymer reaction was dissolved in approximately 1 mL of deuterated chloroform and NMR spectra were acquired on a Bruker AVANCE III 500 MHz spectrometer equipped with a broadband cryoprobe. Spectra were acquired with a low tip angle(15°) and a relaxation delay of 4 seconds for good quantitation. Two dimensional (2D) NMR experiments (gCOSY, TOCSY, gHSQC, and gHMBC) were acquired to assign the free initiator and different polymer end groups. As the reaction progressed, two different types of polymeric chains were observed as depicted in the schematic below.

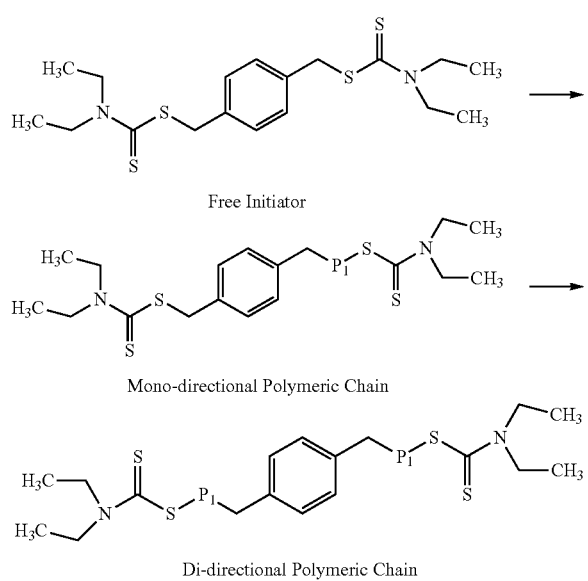

Free Initiator

Mono-directional Polymeric Chain

Di-directional Polymeric Chain

FIG. 1 shows the aromatic region of the $^1$H NMR spectrum for 93 percent conversion (i.e., polymerization) of the monomers. The peak assignments were confirmed from a 2D gHMBC experiment. In this experiment, the mono-directional polymeric chain has two aromatic resonances (7.28 and 7.10 ppm) that correlate to methylenes at 41.9 and 33.0 ppm in $^{13}$C, corresponding to the CH$_2$ attached to sulfur or the first polymer chain unit, respectively. As used herein, the term "mono-directional" refers to polymeric chains where a single radical group of formula R$_3$—(CS)—S* (which in this comparative example is the carbamate group (C$_2$H$_5$)$_2$N—(CS)—S*) has been cleaved to initiate polymeric chain growth in a single direction. The aromatic resonance at 7.03 ppm is a symmetric resonance for all four protons of the "bi-directional" phenyl group that has a methylene attached to polymer chain on both sides. This resonance also has a gHMBC correlation to 33.0 ppm, consistent with attachment to the polymer chain. As used herein, the term "bi-directional" refers to polymeric chains where two radical groups of formula R$_3$—(CS)—S* (which in this comparative example are both the carbamate groups (C$_2$H$_5$)$_2$N—(CS)—S*) have been cleaved to initiate polymeric chain growth in two directions and the resulting initiator fragment *—CH$_2$-Ph-CH$_2$—* is left in the middle of the polymer chain.

A variety of parameters where determined from the integrals in the $^1$H NMR spectra, including percent conversion, the number average molecular weight (M$_n$), the mole fraction of free initiator remaining, and the mole fraction of polymeric chains that are mono-directional. Percent conversion was calculated as the amount of poly(BA) (integral of resonance at 4.03 ppm divided by 2) divided by the sum of poly(BA) and unreacted monomer BA (integral of resonance at 6.40 ppm). The degree of polymerization (DP) was determined from the moles of polymer repeat unit (integral at 4.03 ppm divided by 2) divided by the moles of polymer chains. According to the reaction scheme above, there is one mono-directional or one bi-directional phenyl group per polymer chain. Therefore, the moles of polymer chain is the mono-directional resonance at 7.10 ppm divided by 2 plus the bi-directional resonance at 7.03 ppm divided by 4. From the calculated DP, the M. is calculated as DP*128.17 (the molecular weight of a BA repeat unit). The mole fraction of free initiator remaining was calculated from the moles of free initiator (phenyl integral at 7.33 ppm divided by 4) divided by the moles of total initiator species (moles free initiator plus moles mono-directional phenyl (7.10 ppm integral divided by 2) and bi-directional phenyl (7.03 ppm integral divided by 4)). The mole fraction of mono-directional polymeric chains was calculated by dividing the integral of mono-directional polymeric chains by the total polymeric chains (mono-directional and bi-directional).

The results for CEX G are presented in Table 22 below. The values for %conversion were similar to the results determined by ReactIR, and the M. values were similar to results obtained by GPC (see CEX B). The term "ND" means not determined.

TABLE 22

NMR Characterization of Polymer CEX G

| Monomer Conversion (wt. %) | M$_n$ (g/mol) | Mole Fraction Free Initiator | Mole Fraction Mono-directional Polymeric Chains |
|---|---|---|---|
| 4% | ND | 100% | ND |
| 12% | 230,000 | 98% | 100% |
| 17% | 183,000 | 97% | 100% |
| 20% | 186,000 | 96% | 100% |
| 33% | 129,000 | 91% | 98% |
| 41% | 110,000 | 86% | 96% |
| 58% | 127,000 | 84% | 96% |
| 73% | 108,000 | 76% | 94% |
| 83% | 82,900 | 67% | 91% |
| 88% | 89,000 | 64% | 90% |
| 92% | 67,900 | 50% | 85% |

XDC has poor efficiency of initiation with half of the initiator unreacted at 92% conversion. In addition, the second cleavage event to produce bi-directional polymeric chains is also inefficient with the majority of polymeric chains still mono-directional at 92% conversion. Correspondingly, the M$_n$ profile is non-ideal for living radical behavior with non-linear growth and high initial values of M$_n$ that decreases with percent conversion.

Polymer Comparative Example H (Polymer CEX H)

The same procedure for polymer formation and NMR analysis as described in Polymer Comparative Example G was followed with exception that the initiator O-Isopropyl [4-(isopropoxycarbothioylsulfanylmethyl)phenyl]methyl-sulfanyl-methanethioate (XDX) (Photoinitiator Example A) was used instead (0.6601 grams (1.905 mmol)). The NMR analysis and assignments were very similar to Polymer CEX G and quantitative values determined are presented in Table 23 below. The relevant integrals for the XDX phenyl group are 7.33 ppm (free initiator), 7.13 ppm (mono-directional), and 7.07 ppm (bi-directional).

Compared to CEX G, CEX H has slightly improved reaction kinetics, but still overall non-optimum characteristics of high unreacted initiator and a significant percentage of mono-directional polymer chains at high conversion.

TABLE 23

NMR Characterization of Polymer CEX H

| Monomer Conversion (wt. %) | $M_n$ (g/mol) | Mole Fraction Free Initiator | Mole Fraction Mono-directional Polymeric Chains |
|---|---|---|---|
| 6% | 37,800 | 96% | 100% |
| 32% | 38,500 | 78% | 95% |
| 39% | 37,900 | 71% | 94% |
| 45% | 37,700 | 66% | 92% |
| 69% | 35,900 | 47% | 86% |
| 93% | 33,100 | 24% | 74% |

Polymer Example 41 (Polymer EX 41)

The same procedure for polymer formation and NMR analysis as described in Polymer Comparative Example G was followed with exception that the initiator methyl 2,2-bis(isopropoxycarbothioylsulfanyl) acetate (Photoinitiator Example 2) was used instead (0.587 grams (1.716 mmol)). As the reaction progressed, two different types of polymeric chains were observed as depicted in the schematic below.

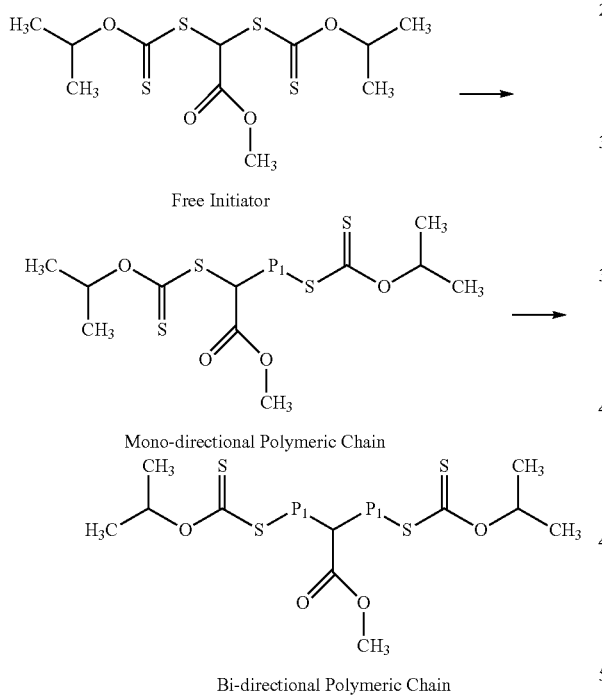

Figure 2:
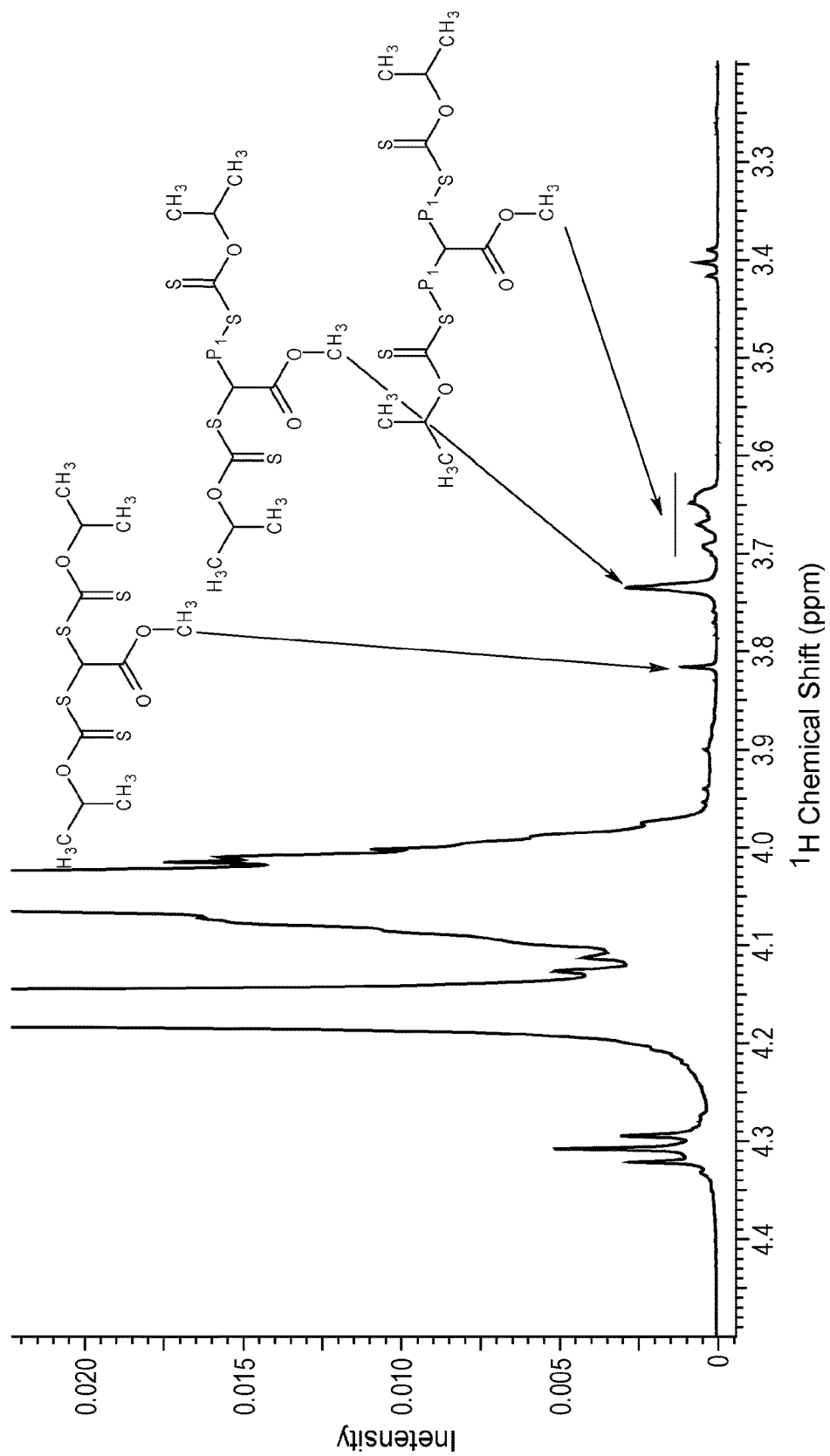
FIG. 2 shows the ester region of the $^1$H NMR spectrum for Example 41 after 25 percent conversion of the monomer.

The $^1$H NMR spectrum is shown in FIG. 2. Two different types of polymeric chains were observed in NMR spectra as indicated by the changes in methyl ester chemical shift. The methyl ester of the free initiator is a sharp singlet at 3.82 ppm. The singlet at 3.73 ppm was assigned to mono-directional polymer chain via gHMBC correlations to a carbonyl at 171 ppm that a S—CH methine also has correlations with. There is a broad set of multiple resonances between 3.66-3.71 ppm that were assigned to bi-directional polymer chains. They have gHMBC correlations to 175 ppm that are characteristic of acrylate groups (a similar functionality). The multiple resonances are believed to be from sequence effects of low molecular weight oligomers. The resonance shifts to a single peak at 3.66 ppm at higher molecular weight. Quantitative results were determined in a similar manner to CEX G with the following integrals calculations used: free initiator (3.82 ppm divided by 3), mono-directional polymer chain (3.73 ppm divided by 3), and bi-directional polymer chain (3.66-3.71 ppm divided by 3).

Compared to the Polymer CEX G and CEX H reactions, this photoinitiator is consumed much more quickly. The quantitative results given below in Table 24 show that the photoinitiator is fully consumed by about 50 percent conversion and there is very little mono-directional polymeric chains at 93% conversion. Furthermore, the growth of $M_n$ as function of percent conversion exhibits ideal living radical polymerization behavior (linear).

TABLE 24

NMR Characterization of Polymer EX 41

| Monomer Conversion (wt. %) | $M_n$ (g/mol) | Mole Fraction Free Initiator | Mole Fraction Mono-directional Polymeric chains |
|---|---|---|---|
| 1% | 3,000 | 88% | 67% |
| 4% | 3,300 | 64% | 68% |
| 7% | 3,700 | 49% | 64% |
| 13% | 4,950 | 25% | 59% |
| 25% | 7,660 | 7% | 49% |
| 30% | 9,330 | 3% | 43% |
| 48% | 14,280 | 0% | 27% |
| 83% | 24,000 | 0% | 8% |
| 91% | 26,900 | 0% | 6% |
| 93% | 27,200 | 0% | 5% |

We claim:

1. A polymeric material of Formula (I-5)

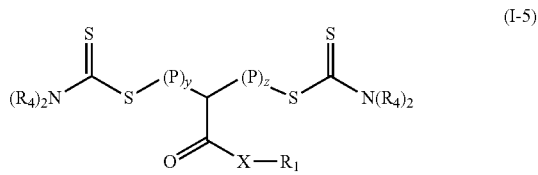

(I-5)

wherein $R_1$ is hydrogen, alkyl, fluorinated alkyl, aryl, aralkyl, or substituted aryl, wherein the substituted aryl is an aryl substituted with at least one alkyl and/or alkoxy;

X is oxy or —$NR_2$—;

$R_2$ is hydrogen, alkyl, fluorinated alkyl, aryl, aralkyl, or substituted aryl, wherein the substituted aryl is an aryl substituted with at least one alkyl and/or alkoxy;

each $R_4$ is an alkyl or fluorinated alkyl, or two adjacent $R_4$ groups are combined together with the nitrogen to which they are both attached to form a first heterocyclic ring having 1 to 3 heteroatoms selected from nitrogen, oxygen, and sulfur, the first heterocyclic ring being saturated or unsaturated and optionally fused to one or more second rings that are carbocyclic or heterocyclic;

P is a polymeric block comprising a polymerized product of a monomer composition comprising at least one monomer having a single ethylenically unsaturated group; and y is an integer in a range of 1 to 10; and z is an integer in a range of 0 to y.

2. The polymeric material of claim 1, wherein y is equal to z.

3. The polymeric material of claim 1, wherein the polymeric material of Formula (I-5) is of Formula (II-1)

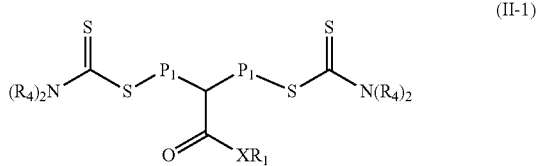

(II-1)

wherein
- $P_1$ is a first polymeric block, the first polymeric block being a polymerized product of a first monomer composition comprising at least one monomer having a single ethylenically unsaturated group.

4. The polymeric material of claim 1, wherein the polymeric material of Formula (I-5) is of Formula (III-1)

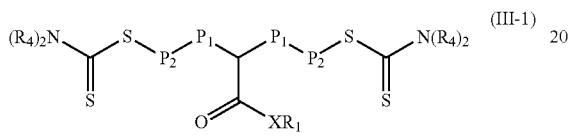

(III-1)

wherein
- $P_1$ is a first polymeric block, the first polymeric block being a polymerized product of a first monomer composition comprising at least one monomer having a single ethylenically unsaturated group; and
- $P_2$ is a second polymeric block different from the first polymeric block, the second polymeric block being a polymerized product of a second monomer composition comprising at least one monomer having a single ethylenically unsaturated group.

5. The polymeric material of claim 1, wherein the polymeric material of Formula (I-5) is of Formula (IV-1)

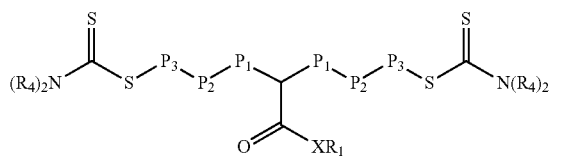

(IV-1)

wherein
- $P_1$ is a first polymeric block, the first polymeric block being a polymerized product of a first monomer composition comprising at least one monomer having a single ethylenically unsaturated group; and
- $P_2$ is a second polymeric block different than the first polymeric block, the second polymeric block being a polymerized product of a second monomer composition comprising at least one monomer having a single ethylenically unsaturated group; and
- $P_3$ is a third polymeric block different from than the second polymeric block, the third polymeric block being a polymerized product of a third monomer composition comprising at least one monomer having a single ethylenically unsaturated group.

6. The polymeric material of claim 1, wherein the polymeric material is not crosslinked.

7. A method of making a polymeric material, the method comprising:

a) providing a photoinitiator of Formula (V-3)

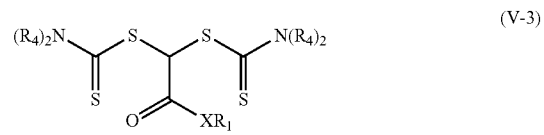

(V-3)

wherein
- $R_1$ is hydrogen, alkyl, fluorinated alkyl, aryl, aralkyl, or substituted aryl, wherein the substituted aryl is an aryl substituted with at least one alkyl and/or alkoxy;
- X is oxy or $-NR_2-$;
- $R_2$ is hydrogen, alkyl, fluorinated alkyl, aryl, aralkyl, or substituted aryl, wherein the substituted aryl is an aryl substituted with at least one alkyl and/or alkoxy; and
- each $R_4$ is an alkyl or fluorinated alkyl, or two adjacent $R_4$ groups are combined together with the nitrogen to which they are both attached to form a first heterocyclic ring having 1 to 3 heteroatoms selected from nitrogen, oxygen, and sulfur, the first heterocyclic ring being saturated or unsaturated and optionally fused to one or more second rings that are carbocyclic or heterocyclic; and b) preparing a first reaction mixture comprising the photoinitiator of Formula (V) and a first monomer composition comprising at least one monomer having a single ethylenically unsaturated group;

c) forming a first polymeric material of Formula (II-1)

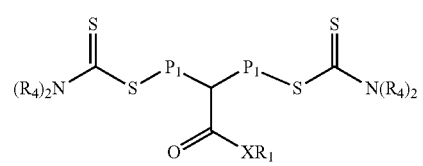

(II-1)

wherein
- $P_1$ is a first polymeric block, the first polymeric block being a polymerized product of the first monomer composition.

8. The method of claim 7, further comprising:

d) preparing a second reaction mixture comprising the first polymeric material of Formula (II-1) and a second monomer composition different than the first monomer composition, the second monomer composition comprising at least one monomer having a single ethylenically unsaturated group; and e) forming a second polymeric material of Formula (III-1)

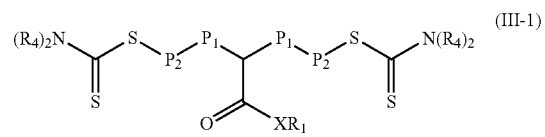

(III-1)

wherein
- P2 is a second polymeric block different from the first polymeric block, the second polymeric block being a polymerized product of a second monomer composition comprising at least one monomer having a single ethylenically unsaturated group.

9. The method of claim 8, further comprising:

f) preparing a third reaction mixture comprising the second polymeric material of Formula (III-1) and a third monomer composition different than the second monomer composition, the third monomer composition comprising at least one monomer having a single ethylenically unsaturated group; and g) forming a third polymeric material of Formula (IV-1)

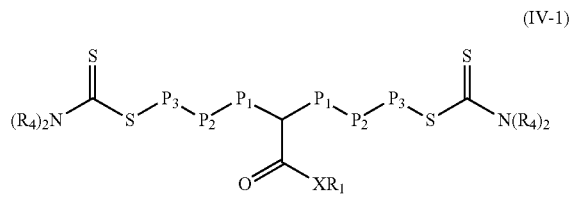

(IV-1)

wherein $P_3$ is a third polymeric block different from than the second polymeric block, the third polymeric block being a polymerized product of a third monomer composition comprising at least one monomer having a single ethylenically unsaturated group.

10. The method of claim 7, wherein the first polymeric material, the second polymeric material, the third polymeric material, or a combination thereof are not crosslinked.

11. A first reaction mixture comprising:

a) a photoinitiator of Formula (V-3)

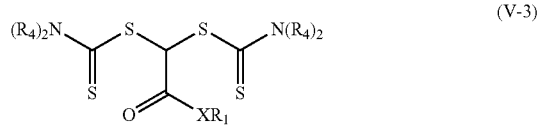

(V-3)

wherein $R_1$ is hydrogen, alkyl, fluorinated alkyl, aryl, aralkyl, or substituted aryl, wherein the substituted aryl is an aryl substituted with at least one alkyl and/or alkoxy;

X is oxy or $-NR_2-$;

$R_2$ is hydrogen, alkyl, fluorinated alkyl, aryl, aralkyl, or substituted aryl, wherein the substituted aryl is an aryl substituted with at least one alkyl and/or alkoxy;

each $R_4$ is an alkyl or fluorinated alkyl, or two adjacent $R_4$ groups are combined together with the nitrogen to which they are both attached to form a first heterocyclic ring having 1 to 3 heteroatoms selected from nitrogen, oxygen, and sulfur, the first heterocyclic ring being saturated or unsaturated and optionally fused to one or more second rings that are carbocyclic or heterocyclic; and b) a first monomer composition comprising at least one monomer having a single ethylenically unsaturated group.

12. The first reaction mixture of claim 11, wherein the first monomer composition is free of a monomer having more than one ethylenically unsaturated group.

13. A second reaction mixture comprising:

a) a polymeric material of Formula (II-1)

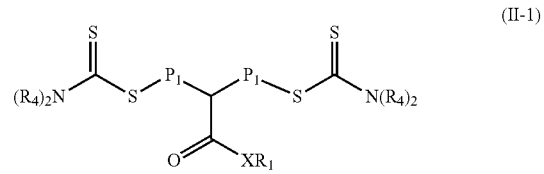

(II-1)

wherein $P_1$ is a first polymeric block, the first polymeric block being a polymerized product of the first monomer composition;

$R_1$ is hydrogen, alkyl, fluorinated alkyl, aryl, aralkyl, or substituted aryl, wherein the substituted aryl is an aryl substituted with at least one alkyl and/or alkoxy;

X is oxy or $-NR_2-$;

$R_2$ is hydrogen, alkyl, fluorinated alkyl, aryl, aralkyl, or substituted aryl, wherein the substituted aryl is an aryl substituted with at least one alkyl and/or alkoxy;

each $R_4$ is an alkyl or fluorinated alkyl, or two adjacent R4 groups are combined together with the nitrogen to which they are both attached to form a first heterocyclic ring having 1 to 3 heteroatoms selected from nitrogen, oxygen, and sulfur, the first heterocyclic ring being saturated or unsaturated and optionally fused to one or more second rings that are carbocyclic or heterocyclic; and $P_1$ is a first polymeric block, the first polymeric block being a polymerized product of a first monomer composition comprising at least one monomer having a single ethylenically unsaturated group; and b) a second monomer composition that is different than the first monomer composition, wherein the second monomer composition comprises at least one monomer having a single ethylenically unsaturated group.

14. The second reaction mixture of claim 13, wherein the second monomer and the second monomer compositions are free of a monomer having more than one ethylenically unsaturated group.

15. A third reaction mixture comprising:

a) a polymeric material of Formula (III-1)

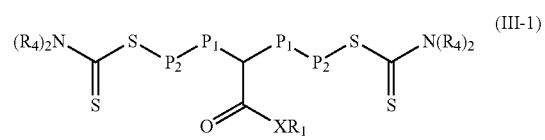

(III-1)

wherein $R_1$ is hydrogen, alkyl, fluorinated alkyl, aryl, aralkyl, or substituted aryl, wherein the substituted aryl is an aryl substituted with at least one alkyl and/or alkoxy;

X is oxy or $-NR_2-$;

$R_2$ is hydrogen, alkyl, fluorinated alkyl, aryl, aralkyl, or substituted aryl, wherein the substituted aryl is an aryl substituted with at least one alkyl and/or alkoxy;

each $R_4$ is an alkyl or fluorinated alkyl, or two adjacent $R_4$ groups are combined together with the nitrogen to which they are both attached to form a first heterocyclic ring having 1 to 3 heteroatoms selected from nitrogen, oxygen, and sulfur, the first heterocyclic ring being saturated or unsaturated and optionally fused to one or more second rings that are carbocyclic or heterocyclic; and $P_1$ is a first polymeric block, the first polymeric block being a polymerized product of a first monomer composition comprising at least one monomer having a single ethylenically unsaturated group;

$P_2$ is a second polymeric block different from the first polymeric block, the second polymeric block being a polymerized product of a second monomer composition comprising at least one monomer having a single ethylenically unsaturated group; and b) a third monomer composition that is different than the second monomer composition, wherein the third monomer composition comprises at least one monomer having a single ethylenically unsaturated group.

* * * * *

UNITED STATES PATENT AND TRADEMARK OFFICE
CERTIFICATE OF CORRECTION

PATENT NO. : 10,400,055 B2
APPLICATION NO. : 16/314760
DATED : September 3, 2019
INVENTOR(S) : George W. Griesgraber It is certified that error appears in the above-identified patent and that said Letters Patent is hereby corrected as shown below:

In the Drawings

Sheet 1
FIG. 1, Line 1 (Y-axis), Delete "Inetensity" and insert -- Intensity --, therefor.

Sheet 2
FIG. 2, Line 1 (Y-axis), Delete "Inetensity" and insert -- Intensity --, therefor.

In the Specification

Column 3
Line 66, Delete "photoinitator" and insert -- photoinitiator --, therefor.

Column 7

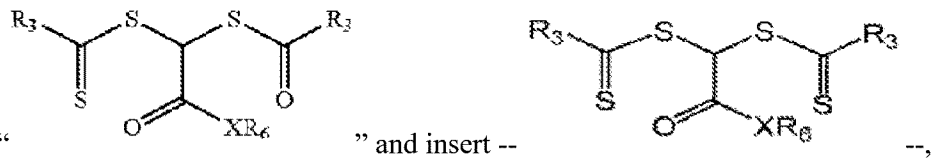

Line 28, Delete " " and insert -- --, therefor.

Column 9
Line 45, Delete "thereof" and insert -- thereof. --, therefor.

Column 10
Line 34, Delete "an a" and insert -- a --, therefor.

Column 19
Line 24, Delete "tetralkyl" and insert -- tetraalkyl --, therefor.

Signed and Sealed this
Nineteenth Day of November, 2019

Andrei Iancu
*Director of the United States Patent and Trademark Office*

Column 20
Line 35, Delete "(dimethylcarbamothioylsulfanypacetate," and insert
-- (dimethylcarbamothioylsulfanyl)acetate, --, therefor.
Line 36, Delete "-l-" and insert -- -1- --, therefor.

Column 21
Line 13, Delete "(isopropoxycarbothioylsulfanypacetate," and insert
-- (isopropoxycarbothioylsulfanyl)acetate, --, therefor.

Column 25
Line 41, Delete "photoinitator" and insert -- photoinitiator --, therefor.
Line 65, Delete "Formula (I) where the variables z and y are both equal to 1. While exposure to actinic radiation (e.g., ultraviolet radiation) continues, photolysis of compound (16) can occur and additional monomeric units can be added. When exposure to actinic radiation (e.g., ultraviolet radiation) is terminated, no further photolysis of compound (16) can occur and no additional monomeric units can be added." and insert the same on Column 25, Line 64, as a continuation of the same paragraph.

Column 28
Line 44, Delete "dialkylaminoalky" and insert -- dialkylaminoalkyl --, therefor.
Line 45, Delete "N,N-dialkylaminoalky" and insert -- N,N-dialkylaminoalkyl --,therefor.

Column 32
Line 33, Delete "photoinitator" and insert -- photoinitiator --, therefor.

Column 33
Line 49, Delete "calorimetry." and insert -- Calorimetry. --, therefor.

Column 34
Line 34, Delete "photoinitator" and insert -- photoinitiator --, therefor.

Column 35
Line 7, Delete "calorimetry." and insert -- Calorimetry. --, therefor.

Column 37
Line 67, Delete "eans" and insert -- means --, therefor.

Column 40
Line 55, Delete "from than" and insert -- than --, therefor.

Column 41
Line 28, Delete "(meth)acrylolyl" and insert -- (meth)acryloyl --, therefor.

Column 50
Line 49, Delete "from than" and insert -- than --, therefor.

CERTIFICATE OF CORRECTION (continued)
U.S. Pat. No. 10,400,055 B2

Column 52
Line 9, Delete "—N(R₄)₂ ." and insert -- —N(R₄)₂. --, therefor.

Column 53
Line 55, Delete "(diethylcarbamothioylsulfanypacetate" and insert -- (diethylcarbamothioylsulfanyl)acetate --, therefor.

Column 56
Line 28, Delete "CH₂C₁₂)" and insert -- CH₂Cl₂) --, therefor.

Column 57
Line 36, Delete "Na₂SO4" and insert -- Na₂SO₄ --, therefor.
Line 48, Delete "(isopropoxycarbothioylsulfanypacetate" and insert -- (isopropoxycarbothioylsulfanyl)acetate --, therefor.
Line 49, Delete "(CDClhd 3," and insert -- (CDCl₃, --, therefor.

Column 58
Line 25, Delete "Isopropyl" and insert -- O-Isopropyl --, therefor.

Column 59
Line 44, Delete "F 15T8/" and insert -- F15T8/ --, therefor.

Column 60
Line 17, Delete "(M$_{wq}$)," and insert -- (M$_w$), --, therefor.

Column 61
Line 45, Delete "ReactlR" and insert -- ReactIR --, therefor.

Column 69
Line 1, Delete "Thermo Fisher Scientific), 2-ethylhexyl acrylate (4.46 grams) and ethyl acetate (13.5 grams) were added to a glass vial. A plastic cap, which was equipped with two needles to provide an inlet and an outlet, was attached to the vial. Nitrogen gas was added through the needle and bubbled through the mixture for 15 minutes. The needles were then removed and the holes in the cap were plugged. The vial was placed on a roller mixer and irradiated for 15 hours using a UV lamp (Sylvania F40/350BL black light) placed 10 cm above the vial. The light intensity measured at a distance of 10 cm was 1.25 mW/cm2." and insert the same on Column 68, Line 67 as the continuation of the same paragraph.

Column 74
Line 47, Delete "390mmo1)" and insert -- 390 mmol) --, therefor.

Column 76
Line 13, Delete "ReactlR," and insert -- ReactIR, --, therefor.

CERTIFICATE OF CORRECTION (continued)
U.S. Pat. No. 10,400,055 B2

In the Claims

Column 79
Line 59, In Claim 5, delete "from than" and insert -- than --, therefor.

Column 80
Line 63, In Claim 8, delete "P2" and insert -- $P_2$ --, therefor.

Column 81
Line 23, In Claim 9, delete "from than" and insert -- than --, therefor.

Column 82
Line 23, In Claim 13, delete "R4" and insert -- $R_4$ --, therefor.